US012730914B2

(12) United States Patent
Jhaveri et al.

(10) Patent No.: US 12,730,914 B2
(45) Date of Patent: Sep. 8, 2026

(54) MULTI-TENANCY IN DATABASE-AS-A-SERVICE

(71) Applicant: Nutanix, Inc., San Jose, CA (US)

(72) Inventors: Krunal Jhaveri, San Jose, CA (US); Matthew Findlay, San Jose, CA (US); Anil Madan, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 57 days.

(21) Appl. No.: 17/977,291

(22) Filed: Oct. 31, 2022

(65) Prior Publication Data

US 2023/0409723 A1 Dec. 21, 2023

Related U.S. Application Data

(60) Provisional application No. 63/353,205, filed on Jun. 17, 2022.

(51) Int. Cl.
*G06F 21/62* (2013.01)

(52) U.S. Cl.
CPC .. *G06F 21/6218* (2013.01); *G06F 2221/2113* (2013.01); *G06F 2221/2141* (2013.01)

(58) Field of Classification Search
CPC ......... G06F 21/6218; G06F 2221/2113; G06F 2221/2141
See application file for complete search history.

(56) References Cited

U.S. PATENT DOCUMENTS 625,315 A 5/1899 Bradford
749,117 A 1/1904 Wagner
4,742,482 A 5/1988 Inskeep et al.
5,594,859 A 1/1997 Palmer et al.
6,064,975 A 5/2000 Moon et al.
6,243,715 B1 6/2001 Bogantz et al.
(Continued)

FOREIGN PATENT DOCUMENTS

CN 104408071 A 3/2015
CN 105446828 A 3/2016
(Continued)

OTHER PUBLICATIONS

AWS. "Working with SSM Agent" AWS Systems Manager. May 4, 2022. Retrieved from https://docs.aws.amazon.com/systems-manager/latest/userguide/ssm-agent.html (accessed Oct. 9, 2023).
(Continued)

*Primary Examiner* — Ryan J Jakovac
(74) *Attorney, Agent, or Firm* — Foley & Lardner LLP

(57) ABSTRACT

A system may include a memory having computer-readable instructions stored thereon and a processor that executes the computer-readable instructions to receive, from a user, a first login credential associated with an organization on a database management service. The system may receive, from the user, a selection of the first cloud account, retrieve a second login credential for the first cloud account based on the selection, automatically log in to the first cloud account using the second login credential, receive, from the user, input to perform an operation on data in the first database on the first cloud, and transmit, to the first cloud, using the second login credential for the first cloud account, a signal to perform the operation based on the input.

25 Claims, 11 Drawing Sheets

(56) References Cited

U.S. PATENT DOCUMENTS 6,542,893 B1 4/2003 Quernemoen
6,766,477 B2 7/2004 Grucci et al.
D508,248 S 8/2005 Ording
D521,521 S 5/2006 Jewitt et al.
7,046,134 B2 5/2006 Hansen
7,136,865 B1 11/2006 Ra et al.
7,225,189 B1 5/2007 McCormack et al.
7,331,000 B2 2/2008 Ohno et al.
7,389,300 B1 6/2008 Shah et al.
7,634,679 B2 12/2009 Quintiliano
7,725,671 B2 5/2010 Prahlad et al.
D625,315 S 10/2010 Jewitt et al.
7,814,057 B2 10/2010 Kathuria et al.
7,840,533 B2 11/2010 Prahlad et al.
7,873,610 B2 1/2011 Poulsen
7,873,684 B2 1/2011 Souder et al.
7,941,470 B2 5/2011 Le et al.
7,953,764 B2 5/2011 Baffier et al.
7,971,094 B1 6/2011 Benn et al.
8,117,165 B1 2/2012 Winckelmann et al.
8,146,080 B2 3/2012 Carter et al.
D656,948 S 4/2012 Kundsen et al.
8,150,808 B2 4/2012 Zha et al.
8,250,033 B1 8/2012 De Souter et al.
8,291,409 B2 10/2012 Winner et al.
8,335,765 B2 12/2012 Sivasubramanian et al.
8,364,648 B1 1/2013 Sim-Tang
8,429,630 B2 4/2013 Nickolov et al.
8,447,728 B2 5/2013 Prahlad et al.
8,448,170 B2 5/2013 Wipfel et al.
D684,160 S 6/2013 Truelove et al.
D684,161 S 6/2013 Truelove et al.
8,468,174 B1 6/2013 Yueh et al.
8,549,518 B1 10/2013 Aron et al.
8,572,031 B2 10/2013 Merriman et al.
8,601,473 B1 12/2013 Aron et al.
8,612,396 B1 12/2013 Mcalister et al.
8,635,421 B2 1/2014 Gupta et al.
8,656,123 B2 2/2014 Lee
8,656,303 B2 2/2014 Hughes
8,677,085 B2 3/2014 Vaghani et al.
8,713,060 B2 4/2014 Sivasubramanian et al.
8,762,335 B2 6/2014 Prahlad et al.
8,769,537 B1 7/2014 Ruggiero et al.
8,775,438 B1 7/2014 Brooker et al.
8,832,028 B2 9/2014 Susairaj et al.
8,843,441 B1 9/2014 Rath et al.
8,849,850 B2 9/2014 Baffier et al.
8,850,130 B1 9/2014 Aron et al.
8,863,124 B1 10/2014 Aron
8,874,749 B1 10/2014 Vittal et al.
8,914,567 B2 12/2014 Miroshnichenko et al.
8,924,974 B1 12/2014 Ruggiero et al.
8,972,347 B1 3/2015 Sim-Tang
9,009,106 B1 4/2015 Aron et al.
9,069,708 B2 6/2015 Gill et al.
D733,745 S 7/2015 Huang
9,116,737 B2 8/2015 Aswathanarayana et al.
9,116,803 B1 8/2015 Agrawal et al.
9,116,862 B1 8/2015 Rath et al.
9,213,727 B1 12/2015 Esposito
9,244,717 B2 1/2016 Pissay et al.
D749,117 S 2/2016 Huang
9,256,383 B2 2/2016 De Spiegeleer et al.
9,268,610 B2 2/2016 Hegdal et al.
9,270,521 B2 2/2016 Tompkins
D753,135 S 4/2016 Vazquez
D753,140 S 4/2016 Kouvas et al.
9,305,068 B1 4/2016 Esposito
9,311,330 B1 4/2016 Chockalingam et al.
9,336,060 B2 5/2016 Nori et al.
9,336,132 B1 5/2016 Aron et al.
9,372,758 B2 6/2016 Ashutosh et al.
D761,288 S 7/2016 Cianflone et al.
9,384,254 B2 7/2016 Tekade et al.
9,389,962 B1 7/2016 Yueh et al.
D763,890 S 8/2016 Pan
9,405,634 B1 8/2016 Ambastha et al.
9,413,810 B2 8/2016 Rezvani et al.
9,436,556 B2 9/2016 Siden et al.
D771,102 S 11/2016 Protzman et al.
9,495,435 B2 11/2016 Zhang et al.
9,507,579 B2 11/2016 Gambardella et al.
9,529,551 B2 12/2016 Kesavan et al.
9,529,808 B1 12/2016 Sudarsanam et al.
D777,747 S 1/2017 Derby et al.
D778,296 S 2/2017 Belkin et al.
D779,514 S 2/2017 Baris et al.
9,582,297 B2 2/2017 Jin et al.
D781,887 S 3/2017 Dziuba et al.
9,600,193 B2 3/2017 Ahrens et al.
9,639,429 B2 5/2017 Stewart et al.
9,652,265 B1 5/2017 Narayanasamy et al.
9,659,080 B1 5/2017 Drobychev et al.
9,665,437 B2 5/2017 Bhargava et al.
D794,666 S 8/2017 Havaldar et al.
D794,667 S 8/2017 Havaldar et al.
9,733,958 B2 8/2017 Cui et al.
9,740,472 B1 8/2017 Sohi et al.
9,740,723 B2 8/2017 Prahlad et al.
9,747,287 B1 8/2017 Bhardwaj et al.
D797,116 S 9/2017 Chapman et al.
9,753,713 B2 9/2017 Mani et al.
9,760,396 B2 9/2017 Apte et al.
9,772,866 B1 9/2017 Aron et al.
9,778,992 B1 10/2017 Yueh et al.
D802,608 S 11/2017 Hicks et al.
D803,231 S 11/2017 Guinness et al.
9,830,082 B1 11/2017 Srinivasan et al.
D807,902 S 1/2018 Cong et al.
9,858,155 B2 1/2018 Ashutosh et al.
9,881,168 B2 1/2018 Chari et al.
D809,530 S 2/2018 Matheson et al.
D815,652 S 4/2018 Protzman et al.
9,934,107 B1 4/2018 Chikkanayakanahally et al.
D817,976 S 5/2018 Shilwant et al.
9,960,963 B2 5/2018 Selvaraj et al.
10,013,313 B2 7/2018 Zhang et al.
10,033,833 B2 7/2018 Fu et al.
10,055,300 B2 8/2018 Zhang et al.
10,057,279 B1 8/2018 Balduzzi et al.
10,078,465 B1 9/2018 Wu et al.
10,108,496 B2 10/2018 Hoobler et al.
10,108,685 B2 10/2018 Amdur et al.
10,146,848 B2 12/2018 Narayanan et al.
10,162,715 B1 12/2018 Mcalister et al.
D838,288 S 1/2019 Sunshine et al.
10,185,627 B2 1/2019 Wong et al.
D839,913 S 2/2019 Chen et al.
10,206,092 B1 2/2019 Mellquist et al.
10,210,048 B2 2/2019 Sancheti
10,212,195 B2 2/2019 Maskalik et al.
D843,388 S 3/2019 Protzman et al.
10,235,250 B1 3/2019 Ambastha et al.
10,248,657 B2 4/2019 Prahlad et al.
10,261,867 B1 4/2019 Terry et al.
10,268,551 B1 4/2019 Wong
10,275,267 B1 4/2019 De Kadt et al.
10,282,201 B2 5/2019 Tekade et al.
10,339,110 B2 7/2019 Marinov et al.
10,346,431 B1 7/2019 Broda et al.
10,372,329 B1 8/2019 Ahrens et al.
10,379,957 B2 8/2019 Ngo
10,379,963 B2 8/2019 Bhargava et al.
D862,512 S 10/2019 Schubart
10,445,298 B2 10/2019 Ramu et al.
10,447,806 B1 10/2019 Sahay et al.
10,476,955 B2 11/2019 Mutalik et al.
D870,762 S 12/2019 Mendoza Corominas et al.
10,496,302 B1 12/2019 Gaurav et al.
10,503,612 B1 12/2019 Wang et al.
10,509,798 B2 12/2019 Chow et al.
D875,108 S 2/2020 Chitalia et al.
10,572,292 B2 2/2020 Bhandari et al.

(56) References Cited

U.S. PATENT DOCUMENTS

D877,753 S 3/2020 Chitalia et al.
10,579,364 B2 3/2020 Doshi et al.
10,599,423 B2 3/2020 Coleman et al.
10,606,578 B2 3/2020 Kruglikov et al.
10,613,938 B2 4/2020 Blumenau et al.
10,637,914 B2 4/2020 Basavaiah et al.
10,700,991 B2 6/2020 Khinvasara et al.
10,705,755 B2 7/2020 Wang et al.
10,719,407 B1 7/2020 Chockalingam et al.
10,725,866 B1 7/2020 Palaiah et al.
10,728,255 B2 7/2020 Jindal et al.
10,757,036 B2 8/2020 Tung et al.
10,776,329 B2 9/2020 Ramohalli Gopala Rao et al.
10,778,750 B2 9/2020 Ringdahl
10,785,029 B2 9/2020 Gupta et al.
10,785,255 B1 9/2020 Otvagin et al.
10,812,582 B2 10/2020 Spillane et al.
10,817,157 B2 10/2020 Kuchibhotla et al.
10,824,522 B2 11/2020 Sadavarte et al.
10,824,956 B1 11/2020 Natanzon et al.
10,855,554 B2 12/2020 Freeman et al.
D911,356 S 2/2021 Varghese et al.
10,922,957 B2 2/2021 Rhoads et al.
10,938,924 B1 3/2021 Jensen et al.
10,949,309 B2 3/2021 Hajare et al.
10,951,496 B2 3/2021 Baker et al.
10,959,098 B2 3/2021 Cidon et al.
10,984,041 B2 4/2021 Bedadala et al.
10,999,165 B2 5/2021 Cidon et al.
11,010,336 B2 5/2021 Kuchibhotla et al.
11,010,487 B2 5/2021 Noe et al.
11,036,696 B2 6/2021 Higginson et al.
D926,200 S 7/2021 Murphy et al.
11,055,352 B1 7/2021 Beitchman et al.
11,061,709 B2 7/2021 Cao et al.
D927,507 S 8/2021 Norman
11,099,956 B1 8/2021 Polimera et al.
11,108,629 B1 8/2021 Cahyadi et al.
11,120,011 B2 9/2021 Priebe et al.
11,126,426 B2 9/2021 Zhu et al.
11,169,887 B2 11/2021 Bajaj et al.
11,182,372 B1 11/2021 Jain et al.
11,243,703 B2 2/2022 Watkins
11,243,971 B2 2/2022 Geigel
D947,216 S 3/2022 Leininger
D947,239 S 3/2022 Rubin et al.
D947,240 S 3/2022 Rubin et al.
11,275,573 B1 3/2022 Javadekar
11,308,114 B1 4/2022 Moghe
11,320,978 B2 5/2022 Kuchibhotla et al.
11,372,820 B1 6/2022 Harjono et al.
11,386,058 B2 7/2022 Hung et al.
11,561,864 B1 1/2023 Brahmadesam et al.
11,604,705 B2 3/2023 Mehta et al.
11,604,806 B2 3/2023 Mankad et al.
11,609,828 B2 3/2023 Khandkar et al.
11,640,340 B2 5/2023 Sontakke et al.
11,741,380 B2 8/2023 Khawas et al.
11,816,066 B2 11/2023 Kuchibhotla et al.
11,860,818 B2 1/2024 Kuchibhotla et al.
11,892,918 B2 2/2024 Rayaraddi et al.
11,907,507 B2 2/2024 Kibo
12,010,227 B1 6/2024 Chhabra et al.
12,019,523 B2 6/2024 Mehta et al.
12,093,715 B2 9/2024 Zhao et al.
12,153,499 B2 11/2024 Sontakke et al.
2001/0014867 A1 8/2001 Conmy
2002/0019920 A1 2/2002 Reuter et al.
2002/0038554 A1 4/2002 Monk et al.
2002/0073089 A1 6/2002 Schwartz et al.
2002/0082858 A1 6/2002 Heddaya et al.
2002/0104376 A1 8/2002 Danyluk et al.
2002/0174098 A1 11/2002 Wu et al.
2003/0046353 A1 3/2003 Chung et al.
2003/0147309 A1 8/2003 Weisberg
2004/0059878 A1 3/2004 Madany
2005/0027661 A1 2/2005 Lober et al.
2005/0149757 A1 7/2005 Corbett et al.
2006/0029096 A1 2/2006 Babbar et al.
2006/0107006 A1 5/2006 Green et al.
2006/0143412 A1 6/2006 Armangau
2006/0161444 A1 7/2006 Lubrecht et al.
2006/0161462 A1 7/2006 Sharma
2006/0161879 A1 7/2006 Lubrecht et al.
2006/0242189 A1 10/2006 Leetaru et al.
2006/0253472 A1 11/2006 Wasserman et al.
2007/0022065 A1 1/2007 Hatano et al.
2007/0100793 A1 5/2007 Brown et al.
2007/0183224 A1 8/2007 Erofeev
2007/0185852 A1 8/2007 Erofeev
2007/0185922 A1 8/2007 Kapoor et al.
2007/0185937 A1 8/2007 Prahlad et al.
2007/0234115 A1 10/2007 Saika
2007/0300221 A1 12/2007 Hartz et al.
2008/0059894 A1 3/2008 Cisler et al.
2008/0126945 A1 5/2008 Munkvold et al.
2008/0239985 A1 10/2008 Karve et al.
2008/0256311 A1 10/2008 Lee
2009/0022285 A1 1/2009 Swanburg et al.
2009/0028082 A1 1/2009 Wynn et al.
2009/0037914 A1 2/2009 Chagoly et al.
2009/0112881 A1 4/2009 Kodama
2009/0125858 A1 5/2009 Vishweshwara et al.
2009/0132543 A1 5/2009 Chatley et al.
2009/0228669 A1 9/2009 Slesarev et al.
2009/0276771 A1 11/2009 Nickolov et al.
2009/0276833 A1 11/2009 Paul et al.
2009/0319582 A1 12/2009 Simek et al.
2010/0017801 A1 1/2010 Kundapur
2010/0023564 A1 1/2010 Yerneni et al.
2010/0198791 A1 8/2010 Wu et al.
2010/0251242 A1 9/2010 Sivasubramanian et al.
2011/0004586 A1 1/2011 Cherryholmes et al.
2011/0022882 A1 1/2011 Jaehde et al.
2011/0071981 A1 3/2011 Ghosh et al.
2011/0093435 A1 4/2011 Zha et al.
2011/0099420 A1 4/2011 Macdonald Mcalister et al.
2011/0138383 A1 6/2011 Le
2011/0252420 A1 10/2011 Tung et al.
2012/0011378 A1 1/2012 Dalton et al.
2012/0123999 A1 5/2012 Ashutosh et al.
2012/0271797 A1 10/2012 Patil
2012/0290714 A1 11/2012 Cohen
2013/0019015 A1 1/2013 Devarakonda et al.
2013/0091285 A1 4/2013 Devarakonda et al.
2013/0110779 A1 5/2013 Taylor et al.
2013/0117441 A1 5/2013 Kuchibhotla et al.
2013/0232470 A1 9/2013 Yung
2013/0232497 A1 9/2013 Jalagam et al.
2013/0238331 A1 9/2013 Mikan et al.
2013/0263119 A1 10/2013 Pissay et al.
2013/0290180 A1 10/2013 Baffier et al.
2013/0332251 A1 12/2013 Ioannidis et al.
2014/0006350 A1 1/2014 Fukui et al.
2014/0018947 A1 1/2014 Ales
2014/0059226 A1 2/2014 Messerli et al.
2014/0101117 A1 4/2014 Uzzaman
2014/0108339 A1 4/2014 Marsden
2014/0108352 A1 4/2014 Ahrens et al.
2014/0189685 A1 7/2014 Kripalani
2014/0201171 A1 7/2014 Vijayan et al.
2014/0229698 A1 8/2014 Sivasubramanian et al.
2014/0250081 A1 9/2014 Stewart et al.
2014/0282256 A1 9/2014 Fish et al.
2014/0337844 A1 11/2014 Jin et al.
2014/0359058 A1 12/2014 Karnawat et al.
2015/0019495 A1 1/2015 Siden et al.
2015/0033223 A1 1/2015 Chari et al.
2015/0039837 A1 2/2015 Quan et al.
2015/0052108 A1 2/2015 Volk et al.
2015/0074054 A1 3/2015 Antony
2015/0121453 A1 4/2015 Gupta
2015/0142610 A1 5/2015 Manoharan et al.
2015/0143064 A1 5/2015 Bhargava et al.

(56) References Cited

U.S. PATENT DOCUMENTS

2015/0188775 A1 7/2015 Van Der Walt
2015/0188789 A1 7/2015 Jayaprakash
2015/0195347 A1 7/2015 Luft
2015/0207682 A1 7/2015 Moraes Nichele et al.
2015/0207683 A1 7/2015 Adogla
2015/0207703 A1 7/2015 Gallagher et al.
2015/0227435 A1 8/2015 Ashutosh et al.
2015/0227602 A1 8/2015 Ramu et al.
2015/0301814 A1 10/2015 Chen et al.
2015/0331923 A1 11/2015 Kim
2015/0347987 A1 12/2015 Ali
2015/0358417 A1 12/2015 Patil et al.
2015/0370641 A1 12/2015 Susairaj et al.
2016/0041997 A1 2/2016 Gokhale et al.
2016/0048408 A1 2/2016 Madhu et al.
2016/0057077 A1 2/2016 Gomatam et al.
2016/0066201 A1 3/2016 Kerpez et al.
2016/0077923 A1 3/2016 Zhang et al.
2016/0077925 A1 3/2016 Tekade et al.
2016/0078104 A1 3/2016 Clifford et al.
2016/0092535 A1 3/2016 Kuchibhotla et al.
2016/0094401 A1 3/2016 Anwar et al.
2016/0094410 A1 3/2016 Anwar et al.
2016/0094647 A1 3/2016 Mordani et al.
2016/0125059 A1 5/2016 Jain et al.
2016/0127307 A1 5/2016 Jain et al.
2016/0162845 A1 6/2016 Carroll et al.
2016/0182328 A1 6/2016 Bhasin et al.
2016/0188421 A1 6/2016 Karinta et al.
2016/0197835 A1 7/2016 Luft
2016/0224259 A1 8/2016 Ahrens et al.
2016/0239637 A1 8/2016 Miller et al.
2016/0246503 A1 8/2016 Phelan et al.
2016/0248629 A1 8/2016 Erdmann et al.
2016/0266913 A1 9/2016 Achillopoulos
2016/0267105 A1 9/2016 Sun et al.
2016/0274981 A1 9/2016 Wilkinson
2016/0292358 A1 10/2016 Heger
2016/0306840 A1 10/2016 Deshmukh et al.
2016/0321339 A1 11/2016 Tekade et al.
2016/0335369 A1 11/2016 Picard et al.
2016/0337473 A1 11/2016 Rao
2016/0344582 A1 11/2016 Shivanna et al.
2016/0378361 A1 12/2016 Uriel
2016/0378622 A1 12/2016 Ren et al.
2016/0380809 A1 12/2016 Hou et al.
2017/0031775 A1 2/2017 Arumugham et al.
2017/0039236 A1 2/2017 Li et al.
2017/0060699 A1 3/2017 Hohl et al.
2017/0068469 A1 3/2017 Shankar et al.
2017/0091231 A1 3/2017 Difranco et al.
2017/0115978 A1 4/2017 Modi et al.
2017/0199753 A1 7/2017 Gong
2017/0220777 A1 8/2017 Wang et al.
2017/0228227 A1 8/2017 Winterfeldt et al.
2017/0235563 A1 8/2017 Bafna et al.
2017/0235758 A1 8/2017 Gopalapura Venkatesh et al.
2017/0235950 A1 8/2017 Gopalapura Venkatesh et al.
2017/0243275 A1 8/2017 Goens et al.
2017/0262232 A1 9/2017 Zhao et al.
2017/0264684 A1 9/2017 Spillane et al.
2017/0272359 A1 9/2017 Behringer et al.
2017/0286517 A1 10/2017 Horowitz et al.
2017/0286518 A1 10/2017 Horowitz et al.
2017/0315877 A1 11/2017 Kaplingat et al.
2017/0322827 A1 11/2017 Little et al.
2017/0344618 A1 11/2017 Horowitz et al.
2017/0351584 A1 12/2017 Griffith et al.
2017/0351716 A1 12/2017 Higginson et al.
2017/0357667 A1 12/2017 Auch et al.
2017/0371547 A1 12/2017 Fruchtman et al.
2017/0374136 A1 12/2017 Ringdahl
2018/0025007 A1 1/2018 Dai
2018/0060119 A1 3/2018 Zamir
2018/0063088 A1 3/2018 Hardy
2018/0121239 A1 5/2018 Sawhney et al.
2018/0121494 A1 5/2018 Antonopoulos et al.
2018/0121521 A1 5/2018 Bivol
2018/0157561 A1 6/2018 Venkatesh et al.
2018/0173452 A1 6/2018 Hu et al.
2018/0181469 A1 6/2018 Yueh et al.
2018/0203771 A1 7/2018 Heidel et al.
2018/0232142 A1 8/2018 Shekar et al.
2018/0253676 A1 9/2018 Sheth et al.
2018/0270219 A1* 9/2018 Li ......................... H04L 63/083
2018/0275881 A1 9/2018 Ashraf et al.
2018/0285201 A1 10/2018 Bangalore et al.
2018/0285353 A1 10/2018 Ramohalli Gopala Rao et al.
2018/0293397 A1* 10/2018 DeMember ............. H04L 63/10
2018/0300203 A1 10/2018 Kathpal et al.
2018/0307728 A1 10/2018 Crupi et al.
2018/0324279 A1 11/2018 Barton et al.
2019/0005407 A1 1/2019 Harris et al.
2019/0018738 A1 1/2019 Chen
2019/0034240 A1 1/2019 Nabi et al.
2019/0065322 A1 2/2019 Chakankar et al.
2019/0075031 A1 3/2019 Skelton et al.
2019/0087279 A1 3/2019 Kumar et al.
2019/0089597 A1 3/2019 Pathak et al.
2019/0102257 A1 4/2019 Zhou et al.
2019/0102411 A1 4/2019 Hung et al.
2019/0116237 A1 4/2019 Gibson
2019/0121671 A1 4/2019 Guim Bernat
2019/0125828 A1 5/2019 Bortz
2019/0129799 A1 5/2019 Kumarasamy
2019/0138631 A1 5/2019 Crane
2019/0155699 A1 5/2019 Luo et al.
2019/0155936 A1 5/2019 Du et al.
2019/0158605 A1 5/2019 Markuze et al.
2019/0179711 A1 6/2019 Luo et al.
2019/0182213 A1 6/2019 Saavedra et al.
2019/0230156 A1 7/2019 Mclarty et al.
2019/0235904 A1 8/2019 Epping et al.
2019/0238412 A1 8/2019 Vohra et al.
2019/0238520 A1 8/2019 Espinosa et al.
2019/0245704 A1 8/2019 Pala
2019/0266268 A1 8/2019 Polinati
2019/0310926 A1 10/2019 Hashimoto et al.
2019/0324865 A1 10/2019 Weissman et al.
2019/0332582 A1 10/2019 Kumar et al.
2019/0339870 A1 11/2019 Meiri et al.
2019/0340091 A1 11/2019 Chandrasekaran et al.
2019/0349194 A1 11/2019 Fan
2019/0362004 A1 11/2019 Oks et al.
2019/0370146 A1 12/2019 Babu et al.
2019/0384496 A1 12/2019 Abdul Rasheed et al.
2019/0391880 A1 12/2019 Wang et al.
2019/0394093 A1 12/2019 Kulkarni et al.
2020/0028932 A1 1/2020 Yang et al.
2020/0034178 A1 1/2020 Gupta et al.
2020/0034245 A1 1/2020 Kohler
2020/0050522 A1 2/2020 Coleman et al.
2020/0059411 A1 2/2020 Olmsted-Thompson et al.
2020/0081704 A1 3/2020 Bafna et al.
2020/0097177 A1 3/2020 Ashokkumar et al.
2020/0099692 A1 3/2020 Jindal et al.
2020/0104375 A1 4/2020 Earnesty et al.
2020/0104376 A1 4/2020 Earnesty et al.
2020/0104377 A1 4/2020 Earnesty et al.
2020/0106737 A1 4/2020 Beedu et al.
2020/0110675 A1 4/2020 Wang et al.
2020/0137157 A1 4/2020 Joseph et al.
2020/0153898 A1 5/2020 Sabath et al.
2020/0193388 A1 6/2020 Tran-Kiem et al.
2020/0201526 A1 6/2020 Kuchibhotla et al.
2020/0210378 A1 7/2020 Kuchibhotla et al.
2020/0210379 A1 7/2020 Kuchibhotla et al.
2020/0250046 A1 8/2020 Wong et al.
2020/0250059 A1 8/2020 Bothello et al.
2020/0285608 A1 9/2020 Chakankar et al.
2020/0285652 A1 9/2020 Wang et al.
2020/0314173 A1 10/2020 Pahwa et al.
2020/0322425 A1 10/2020 Sharma et al.
2020/0349018 A1 11/2020 Meadowcroft et al.

(56) References Cited

U.S. PATENT DOCUMENTS

| | | | | |
|---|---|---|---|---|
| 2020/0366661 | A1 | 11/2020 | Mehta et al. | |
| 2020/0379793 | A1 | 12/2020 | Parihar et al. | |
| 2021/0034471 | A1 | 2/2021 | Khandkar et al. | |
| 2021/0064512 | A1 | 3/2021 | Sirov et al. | |
| 2021/0117293 | A1 | 4/2021 | Luo et al. | |
| 2021/0133031 | A1 | 5/2021 | Moldvai et al. | |
| 2021/0141921 | A1* | 5/2021 | Toplak | G06F 16/9027 |
| 2021/0141923 | A1* | 5/2021 | Wu | G06F 21/6236 |
| 2021/0144060 | A1 | 5/2021 | Cencini et al. | |
| 2021/0200643 | A1 | 7/2021 | Luo et al. | |
| 2021/0218598 | A1 | 7/2021 | Ganapathy et al. | |
| 2021/0328979 | A1 | 10/2021 | M | |
| 2021/0391999 | A1* | 12/2021 | Chilamakuri | G06F 21/41 |
| 2021/0406717 | A1 | 12/2021 | Tauheed et al. | |
| 2022/0066993 | A1 | 3/2022 | Khanuja et al. | |
| 2022/0351169 | A1 | 11/2022 | Kim et al. | |
| 2023/0065444 | A1 | 3/2023 | Pyla et al. | |
| 2023/0095814 | A1 | 3/2023 | Sarkar | |
| 2023/0096071 | A1 | 3/2023 | Sarkar | |
| 2023/0115093 | A1 | 4/2023 | Zhou | |
| 2023/0185823 | A1 | 6/2023 | Chu et al. | |
| 2023/0195529 | A1 | 6/2023 | Luthra et al. | |
| 2023/0231912 | A1 | 7/2023 | Vohra et al. | |
| 2023/0247087 | A1* | 8/2023 | Nagaraja | H04L 9/3213 709/201 |
| 2023/0251938 | A1 | 8/2023 | Sontakke et al. | |
| 2024/0045585 | A1 | 2/2024 | Kuchibhotla et al. | |
| 2024/0045834 | A1 | 2/2024 | Kuchibhotla et al. | |
| 2024/0126777 | A1 | 4/2024 | Tylik et al. | |
| 2024/0134824 | A1 | 4/2024 | Khanuja et al. | |
| 2024/0161006 | A1 | 5/2024 | Dey et al. | |

FOREIGN PATENT DOCUMENTS

| | | | |
|---|---|---|---|
| CN | 108664660 | A | 10/2018 |
| CN | 113010599 | A | 6/2021 |
| EP | 1 654 683 | B1 | 5/2006 |
| EP | 2 980 707 | A1 | 2/2016 |
| GB | 2 451 943 | A | 2/2009 |
| LU | 102236 | B1 | 11/2020 |
| TW | 201600970 | A1 | 1/2016 |
| WO | WO-2010/106578 | | 9/2010 |
| WO | WO-2016/069029 | A1 | 5/2016 |
| WO | WO-2020/026476 | | 2/2020 |
| WO | WO-2020/072338 | A1 | 4/2020 |
| WO | WO-2021/108075 | A1 | 6/2021 |

OTHER PUBLICATIONS

Bailey, Chris, et al. "IBM joins the Crossplane community" IBM Developer Blog. Dec. 15, 2020. Retrieved from https://developer.ibm.com/blogs/ibm-joins-the-crossplane-community/ (accessed Sep. 28, 2023).

Baird, Colin. "MongoDB Atlas Security" Medium. Oct. 28, 2021. Retrieved from https://medium.com/@colinbaird_51123/mongodb-atlas-security-46996fb214e (accessed Sep. 28, 2023).

Foreign Search Report on PCT DTD Sep. 7, 2023.

FreeCodeCamp. "MongoDB Atlas Tutorial—How to Get Started" FreeCodeCamp. Feb. 4, 2021. Retrieved from https://www.freecodecamp.org/news/get-started-with-mongodb-atlas/ (accessed Sep. 28, 2023).

GITHUB. "Multi-tenancy & Row-level Security" Tableau Embedding Playbook. Jul. 7, 2020. Retrieved from https:/tableau.github.io/embedding-playbook/pages/04_multitenancy_and_rls (accessed Sep. 28, 2023).

Kubernetes. "Access Clusters Using the Kubernetes API" Kubernetes Documentation. Apr. 11, 2019. Retrieved from https://kubernetes.io/docs/tasks/administer-cluster/access-cluster-api/ (accessed Oct. 11, 2023).

Kubernetes. "Accessing the Kubernetes API from a Pod" Kubernetes Documentation. May 30, 2022. Retrieved from https://kubernetes.io/docs/tasks/run-application/access-api-from-pod/ (accessed Oct. 9, 2023).

Kubernetes. "Authenticating" Kubernetes Documentation. Jul. 12, 2018. Retrieved from https://kubernetes.io/docs/reference/access-authn-authz/authentication/ (accessed Oct. 11, 2023).

Kubernetes. "Communication between Nodes and the Control Plane" Kubernetes Documentation. May 1, 2020. Retrieved from https://kubernetes.io/docs/concepts/architecture/control-plane-node-communication/ (accessed Oct. 9, 2023).

Kubernetes. "Kubelet Configuration (v1beta1)" Kubernetes Documentation. May 30, 2022. Retrieved from https://kubernetes.io/docs/reference/config-api/kubelet-config.v1beta1/ (accessed Oct. 9, 2023).

Kubernetes. "kubelet" Kubernetes Documentation. May 4, 2022. Retrieved from https://kubernetes.io/docs/reference/command-line-tools-reference/kubelet/ (accessed Oct. 9, 2023).

Kubernetes. "Kubernetes Components" Kubernetes Documentation. May 20, 2022. Retrieved from https://kubernetes.io/docs/concepts/overview/components/ (accessed Oct. 9, 2023).

Kubernetes. "Nodes" Kubernetes Documentation. Jul. 14, 2017. Retrieved from https://kubernetes.io/docs/concepts/architecture/nodes/ (accessed Oct. 11, 2023).

Kubernetes. "Operating etcd clusters for Kubernetes" Kubernetes Documentation. Sep. 27, 2018. Retrieved from https://kubernetes.io/docs/tasks/administer-cluster/configure-upgrade-etcd/ (accessed Oct. 11, 2023).

Kubernetes. "PKI certificates and requirements" Kubernetes Documentation. Jun. 16, 2019. Retrieved from https://kubernetes.io/docs/setup/best-practices/certificates/ (accessed Oct. 11, 2023).

Kubernetes. "Pod v1 core" Kubernetes Documentation. Mar. 30, 2022. Retrieved from https://kubernetes.io/docs/reference/generated/kubernetes-api/v1.23/#pod-v1-core (accessed Oct. 9, 2023).

Kubernetes. "Reconfiguring a kubeadm cluster" Kubernetes Documentation. May 16, 2022. Retrieved from https://kubernetes.io/docs/tasks/administer-cluster/kubeadm/kubeadm-reconfigure/ (accessed Oct. 9, 2023).

Kubernetes. "The Kubernetes API" Kubernetes Documentation. May 3, 2022. Retrieved from https://kubernetes.io/docs/concepts/overview/kubernetes-api/ (accessed Oct. 9, 2023).

Magerramov, Joe. "Avoiding overload in distributed systems by putting the smaller service in control" Amazon Builder's Library. May 18, 2022. Retrieved from https://aws.amazon.com/builders-library/avoiding-overload-in-distributed-systems-by-putting-the-smaller-service-in-control/ (accessed Oct. 9, 2023).

Melo, Gilson. "Overview of the Interconnect Between Oracle and Microsoft" Oracle Cloud Infrastructure Blog. Jun. 5, 2019 Retrieved from https://blogs.oracle.com/cloud-infrastructure/post/overview-of-the-interconnect-between-oracle-and-microsoft (accessed Sep. 28, 2023).

Microsoft. "How Project schedules tasks: Behind the scenes" Project Desktop. Nov. 12, 2020. Retrieved from https://support.microsoft.com/en-us/office/how-project-schedules-tasks-behind-the-scenes-df3431ab-8d8a-4047-afc6-a87b547dbac0 (accessed Sep. 28, 2023).

MongoDB. "Multi-cloud Management" MongoDB. Jan. 21, 2022. Retrieved from https://www.mongodb.com/multicloud/management (accessed Sep. 28, 2023).

MongoDB. "What is Multi-Cloud?" MongoDB. May 26, 2022. Retrieved from https://www.mongodb.com/basics/multicloud (accessed Sep. 28, 2023).

Oracle. "Exadata Database Service on Cloud@Customer Security Controls" Oracle Gen 2 Exadata Database Service on Cloud@Customer Security Controls. Oct. 26, 2020. Retrieved from https://www.oracle.com/a/ocom/docs/engineered-systems/exadata/exadata-cloud-at-customer-security-controls.pdf (accessed Oct. 9, 2023).

Oracle. "Exadata Database Service on Dedicated Infrastructure Security Controls" Oracle OCI Exadata Database Service on Dedicated Infrastructure Security Controls. Jan. 23, 2022. Retrieved from https://www.oracle.com/a/ocom/docs/engineered-systems/exadata/exadata-cloud-service-security.pdf (accessed Oct. 11, 2023).

Progress. "Multi-tenant database architecture" Progress Documentation. Sep. 5, 2021. Retrieved fromhttps://docs.progress.com/bundle/openedge-database-management-117/page/Multi-tenant-database-architecture.html (accessed Sep. 28, 2023).

(56) References Cited

OTHER PUBLICATIONS

Progress. "Multi-tenant features" Progress Documentation. Apr. 12, 2017. Retrieved from https://docs.progress.com/bundle/openedge-database-management-117/page/Multi-tenant-features.html (accessed Sep. 28, 2023).
Progress. "Simple tenancy" Progress Documentation. Apr. 12, 2017. Retrieved from https://docs.progress.com/bundle/openedge-database-management-117/page/Simple-tenancy.html (accessed Sep. 28, 2023).
Progress. "Table partitioning details" Progress Documentation. Sep. 6, 2021. Retrieved from https://docs.progress.com/bundle/openedge-database-management-117/page/Table-partitioning-details.html (accessed Sep. 28, 2023).
Progress. "Tenant ID" Progress Documentation. Apr. 12, 2017. Retrieved from https://docs.progress.com/bundle/openedge-database-multitenancy-117/page/Tenant-ID.html (accessed Sep. 28, 2023).
Progress. "Tenant-ID() method" Progress Documentation. Jun. 2011. Retrieved from https://docs.progress.com/bundle/abl-reference/page/TENANT-ID-method.html# (accessed Sep. 28, 2023).
Progress. "What is multi-tenancy?" Progress Documentation. Apr. 12, 2017. Retrieved from https://docs.progress.com/bundle/openedge-database-multitenancy-117/page/What-is-multi-tenancy.html (accessed Sep. 28, 2023).
SalesForce. "Row-Level Security Example based on Role Hierarchy and Record Ownership" SalesForce Help. Apr. 2021. Retrieved from https://help.salesforce.com/s/articleView?language=en_US&id=sf.bi_security_rowlevel_example_role hierarchy.htm&type=5 (accessed Sep. 28, 2023).
Sathaye, Praseeda. "Using IAM database authentication with workloads running on Amazon EKS" AWS Blog. May 27, 2022. Retrieved from https://aws.amazon.com/blogs/containers/using-iam-database-authentication-with-workloads-running-on-amazon-eks/ (accessed Oct. 11, 2023).
Tabbara, Bassam, et al. "Introducing Crossplane—An Open Source Multi-Cloud Control-Plane" Dec. 4, 2018. Retrieved from https://docs.google.com/document/d/1whncqdUeU2cATGEJhHvzXWC9xdK29Er45NJeoemxebo/mobilebasic (accessed Sep. 28, 2023).
Ten Six. "How to Assign a Task Calendar in Microsoft Project" Ten Six Consulting. Feb. 27, 2018. Retrieved from https://tensix.com/how-to-assign-a-task-calendar-in-microsoft-project/ (accessed Sep. 28, 2023).
Viveros, P., et al. "Optimal grouping and scheduling of preventive maintenance activities" Research Publishing, Singapore. Nov. 1, 2020. Retrieved from https://re.public.polimi.it/retrieve/handle/11311/1181262/685019/ (accessed Sep. 28, 2023).
YouTube Video screenshots for Progress User Assistance. "Creating tenants, domains, and users in a Progress OpenEdge multi tenant database" YouTube. May 23, 2016. Retrieved from https://youtu.be/3kGL2afVV_E [youtube.com] (accessed Sep. 28, 2023).
YouTube Video screenshots for Progress. "Data Management: Table Partitioning and Multi-tenancy" YouTube. Oct. 8, 2018. Retrieved from https://www.youtube.com/watch?v=NbEuNmSazh8 [youtube.com] (accessed Sep. 28, 2023).
YouTube Video screenshots for Progress. "Evolving Your OpenEdge Architecture" YouTube. Apr. 26, 2019. Retrieved from https://youtu.be/-7r7xISRe3U [youtube.com] (accessed Sep. 28, 2023).
Nutanix. "Nutanix Calm Overview" Nutanix Support and Insights. Jul. 2021. Retrieved from https://portal.nutanix.com/page/documents/solutions/details?targetId=RA-2093-Nutanix-Calm:top-nutanix-calm-overview.html (accessed Jul. 26, 2023).
Final Office Action on U.S. Appl. No. 17/182,511 DTD Dec. 6, 2022.
Final Office Action on U.S. Appl. No. 17/337,197 DTD Dec. 15, 2022.
Notice of Allowance on U.S. Appl. No. 17/237,599 DTD Dec. 5, 2022.
Oracle Cloud, "Using Oracle Autonomous Database on Shared Exadata Infrastructure" published Dec. 2022.
Arslan, Erman, "Delphix—Notes vol 1, my new toy for the upcoming months," Erman Arslan's Oracle Blog, published Aug. 8, 2016, retrieved on Jan. 2, 2023 from http://ermanarslan.blogspot.com/2016/08/delphix-notes-vol-1-my-new-toy-for.html.
Delphix Corp., "Delphix Engine User Guide," Delphix, published Dec. 2017, retrieved Jan. 2, 2023 from https://docs.delphix.com/docs52/files/83053093/83053098/2/1512670775673/Delphix Engine User Guide.pdf.
Delphix Corp., "Delphix Engine User Guide," Delphix, published Nov. 2018, retrieved Jan. 2, 2023 from https://docs.delphix.com/docs531/files/98113199/98116076/2/1542301179433/User Guide.pdf.
Delphix Corp., "Delphix Engine User Guide," Delphix, published Oct. 2017, retrieved Jan. 2, 2023 from https://docs.delphix.com/docs-old/files/74711255/74715951/5/1509647013871/Delphix Engine User Guide.pdf.
Delphix Corp., "FAQ: SnapShot and SnapSync (KBA1014)," Delphix, published Mar. 4, 2022, retrieved Jan. 2, 2023 from https://support.delphix.com/Continuous_Data_Engine_(formerly_Virtualization_Engine)/Delphix_Admin/FAQ%3A_SnapShot_and_SnapSync_(KBA1014).
Delphix Corp., "Linking to a Database," Database Linking Overview, published Dec. 2017, retrieved on Jan. 2, 2023 from https://docs.delphix.com/docs52/introduction/database-virtualization-with-delphix/database-linking-overview.
Delphix Corp., "Understanding Timelines," Understanding Timelines and How to Preserve Data in a Point in Time, published Jun. 2018, retrieved Jan. 2, 2023 from https://docs.delphix.com/docs526/delphix-self-service/delphix-self-service-data-user-guide/understanding-timelines-and-how-to-preserve-data-in-a-point-in-time.
Delphix Corp., "What Does the Delphix Engine Do?," Delphix Engine Overview, published Dec. 2017, retrieved on Jan. 2, 2023 from https://docs.delphix.com/docs52/introduction/database-virtualization-with-delphix/delphix-engine-overview.
Delphix Corp., "What's New Guide for 5.2," Delphix, published Dec. 2017, retrieved on Jan. 2, 2023 from https://docs.delphix.com/docs52/files/83053093/83056028/2/1513184739765/What%27s New Guide for 5.2.pdf.
Murugan, Palani, "Delphix Dynamic Data Platform on VMware vSAN," VMware Virtual Blocks Blog, published Nov. 20, 2017, retrieved on Jan. 2, 2023 from https://blogs.vmware.com/virtualblocks/2017/11/20/delphix-vsan/.
Rubrik, "Exploring the Depth of Simplicity: Protecting Microsoft SQL Server with Rubrik," Technical White Paper, published Mar. 2017, retrieved on Jan. 2, 2023 from https://www.rubrik.com/content/dam/rubrik/en/resources/white-paper/Protecting-Microsoft-SQLServer-with-Rubrik.pdf.
Rubrik, "Hyperconverged Infrastructure with the Simplest Data Protection," published Jan. 2016, retrieved on Jan. 2, 2023 from https://web.archive.org/web/20210117100439/https://www.rubrik.com/wp-content/uploads/2015/12/Joint-Solution-Brief-Nutanix-and-Rubrik.pdf.
YouTube Video for Delphix Corp., "How To Create Database Copies with Delphix," YouTube, Apr. 3, 2018, https://www.youtube.com/watch?v=1EjR-k4EJ68 [youtube.com].
YouTube Video for Rubrik, "Item-level Recovery with Rubrik SQL Server Live Mount," YouTube, Jul. 12, 2018, https://www.youtube.com/watch?app=desktop&v=Upp4Ume03P0&feature=youtu.be [youtube.com].
AWS. "Amazon RDS Backup & Restore Using AWS Backup How-To Guide" Getting Started Resource Center. Jun. 14, 2021. Retrieved from https://aws.amazon.com/getting-started/hands-on/amazon-rds-backup-restore-using-aws-backup/ (accessed Dec. 7, 2023).
AWS. "Amazon RDS Backup and Restore" AWS. Sep. 18, 2020. Retrieved from https://aws.amazon.com/rds/features/backup/ (accessed Dec. 7, 2023).
AWS. "Backup with AWS" AWS. Jun. 2019. Retrieved from https://pages.awscloud.com/rs/112-TZM-766/images/AWS004%20B%26R%20eBook%20R4i.pdf (accessed Dec. 7, 2023).
AWS. "Getting started 3: Create a scheduled backup" AWS Backup. Oct. 21, 2019. Retrieved from https://docs.aws.amazon.com/aws-backup/latest/devguide/create-a-scheduled-backup.html (accessed Dec. 7, 2023).

(56) References Cited

OTHER PUBLICATIONS

AWS. "Tagging Amazon RDS resources" Amazon Relational Database Service. Jan. 16, 2013. Retrieved from https://docs.aws.amazon.com/AmazonRDS/latest/UserGuide/USER_Tagging.html (accessed Dec. 7, 2023).
AWS. "Working with backups" Amazon Relational Database Service. Jan. 16, 2013. Retrieved from https://docs.aws.amazon.com/AmazonRDS/latest/UserGuide/USER_WorkingWithAutomatedBackups.html (accessed Dec. 7, 2023).
Husemoller, John. "Automate AWS Backups with AWS Service Catalog" AWS Cloud Operations & Migrations Blog. Jan. 31, 2021. Retrieved from https://aws.amazon.com/blogs/mt/automate-aws-backups-with-aws-service-catalog/ (accessed Dec. 7, 2023).
Hussain, Sadequl. "Running SQL Server Databases in the Amazon Cloud—RDS Backup and Restore (Part 3)" MSSQL Tips. Jul. 2014. Retrieved from https://www.mssqltips.com/sqlservertip/3290/running-sql-server-databases-in-the-amazon-cloud-rds-backup-and-restore-part-3/ (accessed Dec. 7, 2023).
Sommer, Chris. "Beware the automated backup window when running native SQL Server backups in RDS" SQL Server Central. Aug. 4, 2017. Retrieved from https://www.sqlservercentral.com/blogs/beware-the-automated-backup-window-when-running-native-sql-server-backups-in-rds (accessed Dec. 7, 2023).
Actifio Enablement Team, "https:/Awww.youtube.com/watch?v=7mCcJTXxFM3|", "Oracle Advanced Data Protection and Workflows", May 15, 2018 ) (Year: 2018).
Adobe. "Creating and configuring the database" Experience League. Dec. 2021. Retrieved from https://experienceleague.adobe.com/docs/campaign-classic/using/installing-campaign-classic/initial-configuration/creating-and-configuring-the-database.html?lang=en (accessed Jul. 26, 2023).
AWS. "Amazon EC2 M5 Instances" Amazon DocumentDB. Amazon EC2. Nov. 2017. Retrieved from https://aws.amazon.com/ec2/instance-types/m5/ (accessed Apr. 6, 2023).
AWS. "Amazon ECS clusters" Amazon Elastic Container Service. Dec. 2019. Retrieved from https://docs.aws.amazon.com/AmazonECS/latest/developerguide/clusters.html (accessed Apr. 6, 2023).
AWS. "AWS glossary" AWS General Reference Guide. Jan. 2013. Retrieved from https://docs.aws.amazon.com/general/latest/gr/glos-chap.html (accessed Apr. 6, 2023).
AWS. "Copy a snapshot" Amazon Elastic Compute Cloud. Dec. 2012. Retrieved from https://docs.aws.amazon.com/AWSEC2/latest/UserGuide/ebs-copy-snapshot.html#ebs-snapshot-copy (accessed Apr. 6, 2023).
AWS. "CopySnapshot" Amazon Elastic Compute Cloud. Dec. 2014. Retrieved from https://docs.aws.amazon.com/AWSEC2/latest/APIReference/API_CopySnapshot.html (accessed Apr. 6, 2023).
AWS. "Create a DB instance" Amazon Relational Database Service. Jan. 2016. Retrieved from https://docs.aws.amazon.com/AmazonRDS/latest/UserGuide/CHAP_Tutorials.WebServerDB.CreateDBInstance.html (accessed Jul. 26, 2023).
AWS. "CreateDBInstanceReadReplica" Amazon Relational Database Service. Jan. 16, 2013. Retrieved from https://docs.aws.amazon.com/AmazonRDS/latest/APIReference/API_CreateDBInstanceReadReplica.html (accessed Apr. 25, 2023).
AWS. "Creating an Amazon RDS DB instance" Amazon Relational Database Service. 2020. Retrieved from https://docs.aws.amazon.com/AmazonRDS/latest/UserGuide/USER_CreateDBInstance.html (accessed Jul. 26, 2023).
AWS. "Creating and connecting to a MySQL DB instance" Amazon Relational Database Service. May 2014. Retrieved from https://docs.aws.amazon.com/AmazonRDS/latest/UserGuide/CHAP_GettingStarted.CreatingConnecting.MySQL.html (accessed Jul. 26, 2023).
AWS. "Introducing Five New Amazon EC2 Bare Metal Instances" Amazon Web Services. Feb. 13, 2019. Feb. 2019. Retrieved from https://aws.amazon.com/about-aws/whats-new/2019/02/introducing-five-new-amazon-ec2-bare-metal-instances/ (accessed Apr. 6, 2023).
AWS. "Kubernetes on AWS" Amazon Web Services. Jun. 2018. Retrieved from https://aws.amazon.com/kubernetes/#:~:text=Kubernetes%20manages%20clusters%20of%20Amazon,premises%20and%20in%20the%20cloud (accessed Apr. 6, 2023).
AWS. "Regions and Availability Zones" About AWS. Apr. 2019. Retrieved from https://aws.amazon.com/about-aws/global-infrastructure/regions_az/?p=ngi&loc=2 (accessed Jul. 26, 2023).
AWS. "Storage" Amazon Elastic Compute Cloud. Sep. 14, 2014. Retrieved from https://docs.aws.amazon.com/AWSEC2/latest/WindowsGuide/Storage.html (accessed Apr. 6, 2023).
AWS. "Use EBS direct APIs to access the contents of an EBS snapshot" Amazon Elastic Compute Cloud. Apr. 27, 2020. Retrieved from https://docs.aws.amazon.com/AWSEC2/latest/UserGuide/ebs-accessing-snapshot.html (accessed Apr. 6, 2023).
AWS. "Working with DB instance read replicas" Amazon Relational Database Service. Jan. 18, 2013. Retrieved from https://docs.aws.amazon.com/AmazonRDS/latest/UserGuide/USER_ReadRepl.html (accessed Apr. 25, 2023).
AWS. "Working with read replicas for Microsoft SQL Server in Amazon RDS" Amazon Relational Database Service. Nov. 30, 2020. Retrieved from https://docs.aws.amazon.com/AmazonRDS/latest/UserGuide/SQLServer.ReadReplicas.html (accessed Apr. 25, 2023).
Barr, Jeff. "Amazon EC2 Bare Metal Instances with Direct Access to Hardware" AWS News Blog. Nov. 28, 2017. Retrieved from https://aws.amazon.com/blogs/aws/new-amazon-ec2-bare-metal-instances-with-direct-access-to-hardware/ (accessed Apr. 6, 2023).
Barr, Jeff. "New—Cross-Account Copying of Encrypted EBS Snapshots" AWS News Blog. Jun. 21, 2016. Retrieved from https://aws.amazon.com/blogs/aws/new-cross-account-copying-of-encrypted-ebs-snapshots/ (accessed Apr. 6, 2023).
DbInsight. "Turn your Database into a Service " A dbInsight white paper for Nutanix. Feb. 2020. Retrieved from https://nutanix.com/content/dam/nutanix/resources/white-papers/wp-turn-your-database-into-a-service.pdf (accessed Jul. 26, 2023).
Featonby, Malcolm. "Amazon ECS availability best practices" Containers. Nov. 8, 2019. Retrieved from https://aws.amazon.com/blogs/containers/amazon-ecs-availability-best-practices/ (accessed Apr. 6, 2023).
Final Office Action on U.S. Appl. No. 16/805,581 DTD Jul. 6, 2022.
Flexera. "How can I copy an EBS snapshot between different EC2 regions?" Flexera CMP Docs. Dec. 19, 2015. Retrieved from https://docs.rightscale.com/faq/clouds/aws/How_can_I_copy_an_EBS_snapshot_between_different_EC2_regions.html (accessed Apr. 6, 2023).
Google. "Create a MySQL database hosted in Google Cloud" AppSheet Help. 2020. Retrieved from https://support.google.com/appsheet/answer/10107301?hl=en&ref_topic=10102124&sjid=7557016717740597161-AP (accessed Jul. 26, 2023).
Jain, Viral. "How To Create SQL Database In AWS" C-Sharp Corner. May 4, 2018. Retrieved from https://www.c-sharpcorner.com/article/how-to-create-sql-database-in-aws/ (accessed Jul. 26, 2023).
Launier, Jeremy et al. "Introducing A New Era in Database Management" Nutanix. Oct. 6, 2020. Retrieved from https://www.nutanix.com/blog/introducing-new-era-in-database-management (accessed Jul. 26, 2023).
Non-Final Office Action on U.S. Appl. No. 16/805,581 DTD Jan. 14, 2022.
Non-Final Office Action on U.S. Appl. No. 16/805,581 DTD Oct. 12, 2022.
Nutanix Inc., "Prism 5.5, Prism Central Guide" (Jul. 7, 2020) pp. 1-618.
Nutanix, Inc. "Prism Central Guide", Acropolis 5.0, (Oct. 18, 2018), pp. 1-374.
Nutanix, Inc., "Acropolis Advance Administration Guide" Acropolis 5.0 Feb. 9, 2018, pp. 1-60.
Nutanix, Inc., "Acropolis Advanced Administration Guide" Acropolis 5.1, Jul. 11, 2018, pp. 1-63.
Nutanix, Inc., "Prism Central Guide", Acropolis 5.1, (Oct. 18, 2018), pp. 1-410.
Nutanix, Inc., "Prism Web Console Guide" Prism 5.8, (Mar. 19, 2019), pp. 1-808.
Nutanix. "Clone Management" Nutanix Support and Insights. Jan. 2022. Retrieved from https://portal.nutanix.com/page/documents/

(56) References Cited

OTHER PUBLICATIONS details?targetId=Nutanix-Era-User-Guide-v2_4:top-clone-database-management-c.html (accessed Jul. 26, 2023).
Nutanix. "Era Overview" Nutanix Support and Insights. Jan. 2022. Retrieved from https://portal.nutanix.com/page/documents/details?targetId=Nutanix-Era-User-Guide-v2_4:top-era-overview-c.html (accessed Jul. 26, 2023).
Nutanix. "Era Profiles" Nutanix Support and Insights. Jan. 2022. Retrieved from https://portal.nutanix.com/page/documents/details?targetId=Nutanix-Era-User-Guide-v2_4:top-era-getting-started-profiles-c.html (accessed Jul. 26, 2023).
Nutanix. "Era Terminology Reference" Nutanix Support and Insights. Jan. 2022. Retrieved from https://portal.nutanix.com/page/documents/details?targetId=Nutanix-Era-User-Guide-v2_4:top-era-terminology-reference-r.html (accessed Jul. 26, 2023).
Nutanix. "Era Time Machine Management" Nutanix Support and Insights. Jan. 2022. Retrieved from https://portal.nutanix.com/page/documents/details?targetId=Nutanix-Era-User-Guide-v2_4:top-era-time-machine-management-c.html (accessed Jul. 26, 2023).
Nutanix. "Get Started with Era" Nutanix Support and Insights. Jan. 2022. Retrieved from https://portal.nutanix.com/page/documents/details?targetId=Nutanix-Era-User-Guide-v2_4:top-era-getting-started-c.html (accessed Jul. 26, 2023).
Nutanix. "Multi-Cluster Management" Nutanix Support and Insights. Oct. 2020. Retrieved from https://portal.nutanix.com/page/documents/details?targetId=Nutanix-Era-User-Guide-v2_0:era-era-multicluster-management-c.html (accessed Jul. 26, 2023).
Nutanix. "Nutanix Cluster Management" Nutanix Support and Insights. Jan. 2022. Retrieved from https://portal.nutanix.com/page/documents/details?targetId=Nutanix-Era-User-Guide-v2_4:top-era-multicluster-management-c.html (accessed Jul. 26, 2023).
Nutanix. "Provisioning a MongoDB Replica Set" Nutanix Support and Insights. Sep. 2021. Retrieved from https://portal.nutanix.com/page/documents/details?targetId=Nutanix-Era-User-Guide-v2_3:top-era-provision-mongodb-replica-t.html (accessed Jul. 26, 2023).
Nutanix. "Provisioning a PostgreSQL Instance" Nutanix Support and Insights. Jan. 2021. Retrieved from https://portal.nutanix.com/page/documents/details?targetId=Nutanix-Era-User-Guide-v2_3:top-era-provisioning-a-postgresql-database-t.html (accessed Jul. 26, 2023).
PlanetScale. "PlanetScale is the world's most advanced serverless MySQL platform" PlanetScale. Retrieved from https://planetscale.com/ (accessed Apr. 6, 2023).
Polovyi, Ivan. "AWS ECS Cluster using the EC2 Launch Type" AWS in Plain English. Jul. 25, 2021. Retrieved from https://aws.plainenglish.io/aws-ecs-cluster-using-the-ec2-launch-type-cb5ae2347b46 (accessed Apr. 6, 2023).
Sereno Cloud Solution. "Nutanix 1 Click Database Service by ERA" Medium Enterprise Clouds. Jan. 2021. Retrieved from https://www.serenoclouds.com/medium-enterprise-clouds/private-hybrid-clouds/nutanix-enterprise-cloud-solution/nutanix-1-click-database-service-by-era/ (accessed Jul. 26, 2023).
Sharma, Madhurkant. "Cloud Computing Platforms and Technologies" Geeks for Geeks. Sep. 8, 2018. Retrieved from https://www.geeksforgeeks.org/cloud-computing-platforms-and-technologies/ (accessed Jul. 26, 2023).
Singh, Deepak. "Cluster Management with Amazon ECS" AWS Compute Blog. Feb. 6, 2015. Retrieved from https://aws.amazon.com/blogs/compute/cluster-management-with-amazon-ecs/ (accessed Apr. 6, 2023).
Tahir, Saqlain. "Field Notes: SQL Server Deployment Options on AWS Using Amazon EC2" AWS Architecture Blog. Jun. 18, 2021. Retrieved from https://aws.amazon.com/blogs/architecture/field-notes-sql-server-deployment-options-on-aws-using-amazon-ec2/ (accessed Apr. 6, 2023).
Tessell. "Multi-AZ High Availability for Oracle Standard Edition 2" Tessell. Jun. 2022. Retrieved from https://query.prod.cms.rt.microsoft.com/cms/api/am/binary/RW10vv8 (accessed Apr. 13, 2023).
Tessell. "Tessell for Oracle on Azure" LinkedIn. Jun. 2022. Retrieved from https://www.linkedin.com/posts/tessell-inc_tessell-for-oracle-on-azure-activity-7069795242467557376-1Guw/?utm_source=share&utm_medium=member_desktop (accessed Jul. 26, 2023).
Tessell. "Tessell" LinkedIn. 2021. Retrieved from https://www.linkedin.com/company/tessell-inc/posts/?feedView=all (accessed Jul. 26, 2023).
Tessell. "The Tessell platform provides unparalleled security for your data and users" Tessell. Jun. 2022. Retrieved from https://query.prod.cms.rt.microsoft.com/cms/api/am/binary/RW13XNU (accessed Apr. 6, 2023).
Vogels, Werner. "Under the Hood of Amazon EC2 Container Service" All Things Distributed. Jul. 20, 2015. Retrieved from https://www.allthingsdistributed.com/2015/07/under-the-hood-of-the-amazon-ec2-container-service.html (accessed Apr. 6, 2023).
Westermann, Daniel. "pg_auto_failover: Failover and switchover scenarios" Application Integration & Middleware. Nov. 11, 2020. Retrieved from https://www.dbi-services.com/blog/pg_auto_failover-failover-and-switchover-scenarios/ (accessed Jul. 26, 2023).
YouTube Video screenshots for Alibaba Cloud. "How-to | Launch a MySQL Instance on Alibaba Cloud ApsaraDB for Relational Database Service" YouTube. Feb. 27, 2017. https://youtu.be/E5wGoIVFBuU [youtube.com].
YouTube Video screenshots for Alibaba Cloud. "How-to | Set Up a Multi tier WordPress Site on Alibaba Cloud" YouTube. Jun. 25, 2018. https://youtu.be/yWXhibylW6M [youtube.com].
YouTube Video screenshots for Amazon Web Services. "Amazon ECS: Core Concepts" YouTube. Aug. 31, 2017. https://www.youtube.com/watch?app=desktop&v=eq4wL2MiNqo&feature=youtu.be [youtube.com].
YouTube Video screenshots for Nutanix University. "How To Provision a PostgreSQL cluster using Nutanix Era | Nutanix University" YouTube. Aug. 8, 2019. https://youtube.com/watch?v=FoDGtORWNnU [youtube.com].
YouTube Video screenshots for Nutanix University. "Multicloud Database Provisioning with Nutanix Era Part 1 | Tech Bytes | Nutanix University" YouTube. Oct. 28, 2021. https://youtu.be/q3KOcdyM7PY [youtube.com].
YouTube Video screenshots for Nutanix University. "Nutanix Era: Provision a database from a backup file | Nutanix University" YouTube. Jul. 1, 2021. https://youtu.be/SfpGqaqXsbo [youtube.com].
YouTube Video screenshots for Nutanix. "Zero Byte Clone Data Management | Build it Better: DBaaS with Nutanix Era | Part 2%" YouTube. Mar. 17, 2021. https://youtube.com/watch?v=XIGtTA2dM80 [youtube.com].
Amudala, Rajasekhar. "Add Targets Manually on EM Cloud Control 13c" Oracle DBA—Tips and Techniques. Jul. 13, 2020. Retrieved from http://www.br8dba.com/add-targets-manually-on-em-cloud-control-13c/ (accessed Aug. 30, 2023).
AWS. "Amazon CloudFormation" Amazon CloudFormation. Oct. 25, 2021. Retrieved from https://web.archive.org/web/20211025042539/https://www.amazonaws.cn/en/cloudformation/ (accessed Sep. 14, 2023).
AWS. "Amazon RDS Custom architecture" Amazon Relational Database Service. May 24, 2022. Retrieved from https://docs.aws.amazon.com/AmazonRDS/latest/UserGuide/custom-concept.html (accessed Aug. 30, 2023).
AWS. "Amazon Relational Database Service (RDS)" Amazon Relational Database Service. Dec. 24, 2017. Retrieved from https://web.archive.org/web/20171224182936/https:/aws.amazon.com/rds/#features (accessed Sep. 6, 2023).
AWS. "Amazon VPC FAQs" Amazon VPC. Dec. 14, 2021. Retrieved from https://aws.amazon.com/vpc/faqs/ (accessed Sep. 6, 2023).
AWS. "Announcing Amazon RDS Custom for Oracle" Amazon Relational Database Service. Oct. 26, 2021. Retrieved from https://aws.amazon.com/about-aws/whats-new/2021/10/amazon-rds-custom-oracle/ (accessed Aug. 30, 2023).
AWS. "AWS CloudFormation concepts" AWS CloudFormation. Oct. 22, 2021. Retrieved from https://docs.aws.amazon.com/AWSCloudFormation/latest/UserGuide/cfn-whatis-concepts.html (accessed Sep. 6, 2023).
AWS. "AWS Rule Functions" AWS CloudFormation. Sep. 24, 2021. Retrieved from https://web.archive.org/web/20210924041142/

(56) References Cited

OTHER PUBLICATIONS https:/docs.aws.amazon.com/AWSCloudFormation/latest/UserGuide/intrinsic-function-reference-rules.html (accessed Sep. 6, 2023).
AWS. "AWS::EC2::Subnet" AWS CloudFormation. Oct. 2021. Retrieved from https://docs.aws.amazon.com/AWSCloudFormation/latest/UserGuide/aws-resource-ec2-subnet.html (accessed Sep. 6, 2023).
AWS. "Configuring a DB instance for Amazon RDS Custom for Oracle" Amazon Relational Database Service. Dec. 3, 2021. Retrieved from https://docs.aws.amazon.com/AmazonRDS/latest/UserGuide/custom-creating.html (accessed Aug. 30, 2023).
AWS. "Create a custom Windows AMI" Amazon Elastic Compute Cloud. Jan. 15, 2013. Retrieved from https://docs.aws.amazon.com/AWSEC2/latest/WindowsGuide/Creating_EBSbacked_WinAMI.html (accessed Aug. 30, 2023).
AWS. "Creating a MySQL DB Instance and Connecting to a Database on a MySQL DB Instance" Amazon Relational Database Service. Dec. 22, 2017. Retrieved from https://web.archive.org/web/20171222204154/https:/docs.aws.amazon.com/AmazonRDS/latest/UserGuide/CHAP_GettingStarted.CreatingConnecting.MySQL.html (accessed Sep. 6, 2023).
AWS. "Creating an Amazon RDS DB instance" Amazon Relational Database Service. May 13, 2020. Retrieved from https://docs.aws.amazon.com/AmazonRDS/latest/UserGuide/USER_CreateDBInstance.html#USER_CreateDBInstance.Settings (accessed Aug. 30, 2023).
AWS. "Creating and connecting to an Oracle DB instance" Amazon Relational Database Service. Jun. 6, 2014. Retrieved from https://docs.aws.amazon.com/AmazonRDS/latest/UserGuide/CHAP_GettingStarted.CreatingConnecting.Oracle.html (accessed Aug. 30, 2023).
AWS. "How Amazon VPC works" Amazon VPC. Oct. 26, 2021. Retrieved from https://docs.aws.amazon.com/vpc/latest/userguide/how-it-works.html (accessed Sep. 6, 2023).
AWS. "Maintaining a DB instance" Amazon Relational Database Service. Sep. 5, 2015. Retrieved from https://docs.aws.amazon.com/AmazonRDS/latest/UserGuide/USER_UpgradeDBInstance.Maintenance.html#OS_Updates (accessed Aug. 30, 2023).
AWS. "Regions and Availability Zones" Amazon Relational Database Service. Dec. 22, 2017. Retrieved from https://web.archive.org/web/20171222195304/http:/docs.aws.amazon.com/AmazonRDS/latest/UserGuide/Concepts.RegionsAndAvailabilityZones.html (accessed Sep. 6, 2023).
AWS. "Rules" AWS CloudFormation. Feb. 9, 2021. Retrieved from https://docs.aws.amazon.com/AWSCloudFormation/latest/UserGuide/Welcome.html (accessed Sep. 6, 2023).
AWS. "What is AWS CloudFormation?" AWS CloudFormation. Feb. 18, 2020. Retrieved from https://docs.aws.amazon.com/AWSCloudFormation/latest/UserGuide/Welcome.html (accessed Sep. 6, 2023).
AWS. "Working with Amazon RDS Custom" Amazon Relational Database Service. Nov. 27, 2021. Retrieved from https://docs.aws.amazon.com/AmazonRDS/latest/UserGuide/rds-custom.html (accessed Aug. 30, 2023).
AWS. "Working with custom engine versions for Amazon RDS Custom for Oracle" Amazon Relational Database Service. Dec. 3, 2021. Retrieved from https://docs.aws.amazon.com/AmazonRDS/latest/UserGuide/custom-cev.html (accessed Aug. 30, 2023).
Berger, Martin. "AWS Custom Engine Versions for Amazon RDS Custom for Oracle—Sightseeing Tour Part 1/3—Setup" Martinberger.com. May 15, 2022. Retrieved from https://www.martinberger.com/2022/05/aws-custom-engine-versions-for-amazon-rds-custom-for-oracle-sightseeing-tour-part-1-3-setup/ (accessed Aug. 30, 2023).
Bhrara, Raminder. "Oracle Cloud Infrastructure OCI Gen-2 Cloud Security—Part II (Identity and Access Management)" RedThunder. Blog. Dec. 31, 2018. Retrieved from https://redthunder.blog/2018/12/31/oracle-cloud-infrastructure-oci-gen-2-cloud-security-part-ii-identity-and-access-management/ (accessed Sep. 14, 2023).
BugSnag. "Install using CloudFormation" SmartBear BugSnag Docs. Jul. 28, 2021. Retrieved from https://web.archive.org/web/20210728140402/https://docs.bugsnag.com/on-premise/clustered/cloudformation-installation/ (accessed Sep. 14, 2023).
CloudThat. "Virtualization in Amazon Web Services" CloudThat. Oct. 16, 2014. Retrieved from https://www.cloudthat.com/resources/blog/virtualization-in-amazon-web-services (accessed Aug. 30, 2023).
Commvault. "Adding a Database Group for Alibaba Cloud ApsaraDB RDS for MySQL" Essential. Sep. 22, 2020. Retrieved from https://documentation.commvault.com/v11/essential/122970_adding_database_group_for_alibaba_cloud_apsaradb_rds_for_mysql.html (accessed Aug. 30, 2023).
Commvault. "Creating a Server Backup Plan" Essential. Nov. 6, 2020. Retrieved from https://documentation.commvault.com/v11/essential/130962_creating_server_backup_plan.html (accessed Aug. 30, 2023).
Commvault. "Creating a Server Plan" Essential. Oct. 27, 2021. Retrieved from https://documentation.commvault.com/2023e/essential/86648_creating_server_plan.html (accessed Aug. 30, 2023).
Commvault. "Restoring a Database Group for Alibaba Cloud ApsaraDB RDS for MySQL" Essential. Feb. 18, 2021. Retrieved from https://documentation.commvault.com/2023e/essential/122176_restoring_database_group_for_alibaba_cloud_apsaradb_rds_for_mysql.html (accessed Aug. 30, 2023).
Donchovski, Igor. "Maintenance for MongoDB Replica Sets" SlideShare. Oct. 2, 2019. Retrieved from https://www.slideshare.net/IgorLE/maintenance-for-mongodb-replica-sets (accessed Aug. 30, 2023).
Duvuri, Aditya. "Policies in Oracle Cloud Infrastructure (OCI) Data Integration" Oracle Cloud Infrastructure Blog. Aug. 17, 2020. Retrieved from https://blogs.oracle.com/dataintegration/post/policies-in-oracle-cloud-infrastructure-oci-data-integration (accessed Sep. 14, 2023).
Erwin, Danyelle. "What's New in SAP HANA Cockpit 2.0 SP 12" SAP Community. Jun. 22, 2020. Retrieved from https://blogs.sap.com/2020/06/22/whats-new-in-sap-hana-cockpit-2.0-sp-12/ (accessed Aug. 30, 2023).
Google Cloud. "Configurations Overview" Cloud Deployment Manager. Oct. 16, 2021. Retrieved from https://web.archive.org/web/20211016075925/https:/cloud.google.com/deployment-manager/docs/configuration/ (accessed Sep. 6, 2023).
Google Cloud. "Creating Instances" Database Products. Sep. 18, 2018. Retrieved from https://web.archive.org/web/20180918103721/https:/cloud.google.com/sql/docs/mysql/create-instance (accessed Sep. 6, 2023).
Google Cloud. "Deployment Manager Fundamentals" Cloud Deployment Manager. Feb. 27, 2021. Retrieved from https://web.archive.org/web/20210227173536/https:/cloud.google.com/deployment-manager/docs/fundamentals (accessed Sep. 6, 2023).
Google Cloud. "Google Cloud Deployment Manager Documentation" Cloud Deployment Manager. Dec. 14, 2021. Retrieved from https://web.archive.org/web/20211214023957/https://cloud.google.com/deployment-manager/docs (accessed Sep. 14, 2023).
Google Cloud. "REST Resource: networks" Compute Engine. Nov. 5, 2021. Retrieved from https://cloud.google.com/compute/docs/reference/rest/beta/networks (accessed Sep. 6, 2023).
Google Cloud. "REST Resource: subnetworks" Compute Engine. Jul. 1, 2019. Retrieved from https://cloud.google.com/compute/docs/reference/rest/beta/subnetworks (accessed Sep. 6, 2023).
Google Cloud. "Supported resource types" Cloud Deployment Manager. Sep. 16, 2021. Retrieved from https://web.archive.org/web/20210916123002/https:/cloud.google.com/deployment-manager/docs/configuration/supported-resource-types (accessed Sep. 6, 2023).
Google Cloud. "VPC networks" Virtual Private Cloud. Oct. 29, 2021. Retrieved from https://cloud.google.com/vpc/docs/vpc (accessed Sep. 6, 2023).
Havewala, Porus. "Back Up a Thousand Databases Using Enterprise Manager Cloud Control 12c" Technical Article. Jan. 2014. Retrieved from https://www.oracle.com/technical-resources/articles/enterprise-manager/havewala-rman-em12c.html (accessed Aug. 30, 2023).
Hinker, Stefan. "A Patch Train Solution for OCI OS Management" A-Team Chronicles. Jul. 17, 2020. Retrieved from https://www.ateam-oracle.com/post/a-patch-train-solution-for-oci-os-management (accessed Aug. 30, 2023).

(56) References Cited

OTHER PUBLICATIONS

Kolasa, Konrad, "Date Picker." Dribbble, published Feb. 28, 2017 (Retrieved from the Internet Apr. 7, 2020). Internet URL: <https://dribbble.com/shots/3326020-Date-Picker> (Year: 2017).
Lei, Joanne. "Cross-tenancy access: AssumeRole in OCI" Oracle Cloud Infrastructure Blog. Mar. 1, 2022. Retrieved from https://blogs.oracle.com/cloud-infrastructure/post/cross-tenancy-access-assumerole-in-oci (accessed Sep. 14, 2023).
Mathew, Prince. "Custom Database Software Images now available on Gen2 Exadata Cloud@Customer" Oracle Database Insider. Jun. 10, 2021. Retrieved from https://blogs.oracle.com/database/post/custom-database-software-images-now-available-on-gen2-exadata-cloudcustomer (accessed Aug. 30, 23).
Matijaca, Ante, "Dashboard" Dribbble, published Dec. 21, 2015, retrieved Feb. 11, 2022 from <https://dribbble.com/shots/2417233-Dashboard> (Year: 2015).
Melo, Gilson. "Overview of the Interconnect Between Oracle and Microsoft" Oracle Cloud Infrastructure Blog. Jun. 5, 2019. Retrieved from https://blogs.oracle.com/cloud-infrastructure/post/overview-of-the-interconnect-between-oracle-and-microsoft (accessed Sep. 14, 2023).
MongoDB. "mongo Shell Methods" Reference. Aug. 2019. Retrieved from https://www.mongodb.com/docs/v4.2/reference/method/ (accessed Aug. 30, 2023).
MongoDB. "mongodb" GitHub. Mar. 2015. Retrieved from https://github.com/mongodb/docs/blob/v4.2/source/core/replica-set-priority-0-member.txt (accessed Aug. 30, 2023).
MongoDB. "Priority 0 Replica Set Members" MongoDB Manual. Aug. 2019. Retrieved from https://www.mongodb.com/docs/manual/core/replica-set-priority-0-member/ (accessed Aug. 30, 2023).
MongoDB. "Replica Set Elections" MongoDB Manual. Aug. 2019. Retrieved from https://www.mongodb.com/docs/manual/core/replica-set-elections/ (accessed Aug. 30, 2023).
MongoDB. "Replica Set Members" Replication. Aug. 2019. Retrieved from https://www.mongodb.com/docs/v4.2/core/replica-set-members/#replica-set-secondary-members (accessed Aug. 30, 2023).
MongoDB. "The mongo Shell" MongoDB. Aug. 2019. Retrieved from https://www.mongodb.com/docs/v4.2/mongo/ (accessed Aug. 30, 2023).
MongoDB. "Troubleshoot Replica Sets" MongoDB Manual. Aug. 2019. Retrieved from https://www.mongodb.com/docs/manual/tutorial/troubleshoot-replica-sets/ (accessed Aug. 30, 2023).
MongoDB. "Upgrade a Replica Set to 4.2" Replication. Aug. 2019. Retrieved from https://www.mongodb.com/docs/v4.2/release-notes/4.2-upgrade-replica-set/ (accessed Aug. 30, 2023).
MySQL. "Creating a MySQL Server Deployment" Documentation. Mar. 13, 2017. Retrieved from https://web.archive.org/web/20170313043247/http:/docs.oracle.com/cloud/latest/mysql-cloud/UOMCS/GUID-D03FE523-AD8D-4C53-935C-D5D6513D2A24.htm#GUID-D03FE523-AD8D-4C53-935C-D5D6513D2A24 (accessed Sep. 6, 2023).
Non-Final Office Action on U.S. Appl. No. 17/694,964 DTD Aug. 9, 2023.
Non-Final Office Action on U.S. Appl. No. 17/951,632 DTD Sep. 14, 2023.
Nutanix "Nutanix announces Flow, Era and Beam and .NEXT 2018" (published May 9, 2018) Nutanix Youtube, from https://www.youtube.com/watch?v=w40asaGtrkU (accessed Dec. 19, 2019).
Oracle, "Webinar: Automate your database provisioning to increase efficiency and standardization" (published Jul. 14, 2020) Oracle Youtube, from https://www.youtube.com/watch?v=nUMdekXyqr4 (accessed Jun. 28, 2021).
Oracle. "About Managed Targets" Enterprise Manager Cloud Control Extensibility Programmer's Guide. May 2014. Retrieved from https://docs.oracle.com/cd/E24628_01/doc.121/e25159/managed_targets.htm#EMPRG140 (accessed Aug. 30, 2023).
Oracle. "Accessing Object Storage Resources Across Tenancies" Oracle Cloud Infrastructure Documentation. Sep. 21, 2021. Retrieved from https://web.archive.org/web/20210921123150/https://docs.oracle.com/en-us/iaas/Content/Object/Concepts/accessingresourcesacrosstenancies.htm (accessed Sep. 14, 2023).
Oracle. "Create Oracle Database Homes on an Exadata Cloud Infrastructure System" Oracle Cloud Infrastructure Documentation. May 16, 2022. Retrieved from https://docs.oracle.com/en-us/iaas/exadatacloud/exacs/creating-database-homes-exacc.html (accessed Aug. 30, 2023).
Oracle. "Managing Groups" Enterprise Manager Cloud Control Administrator's Guide. Feb. 2016. Retrieved from https://docs.oracle.com/cd/E24628_01/doc.121/e24473/group_management.htm#EMADM9216 (accessed Aug. 30, 2023).
Oracle. "Managing Software Sources" Oracle Cloud Infrastructure Documentation. Sep. 17, 2021. Retrieved from https://docs.oracle.com/en-us/iaas/os-management/osms/osms-software-sources.htm (accessed Aug. 30, 2023).
Oracle. "Overview of Identity and Access Management" Oracle Cloud Infrastructure Documentation. May 5, 2022. Retrieved from https://web.archive.org/web/20220505171702/https://docs.oracle.com/en-us/iaas/Content/Identity/Concepts/overview.htm (accessed Sep. 14, 2023).
Oracle. "Securing Object Storage" Oracle Cloud Infrastructure Documentation. Apr. 2021. Retrieved from https://docs.public.oneportal.content.oci.oraclecloud.com/en-us/iaas/Content/Security/Reference/objectstorage_security.htm (accessed Sep. 14, 2023).
Oracle. "Update Your Database Homes and Grid Infrastructure Via the OCI Web Console on the Exadata Cloud Service" Oracle Database Insider. May 2, 2020. Retrieved from https://blogs.oracle.com/database/post/update-your-database-homes-and-grid-infrastructure-via-the-oci-web-console-on-the-exadata-cloud-service (accessed Aug. 30, 23).
Oracle. "User Credentials" Oracle Cloud Infrastructure Documentation. May 19, 2022. Retrieved from https://web.archive.org/web/20220519195404/https:docs.oracle.com/en-us/iaas/Content/Identity/Concepts/usercredentials.htm (accessed Sep. 14, 2023).
Oracle. "User Guide" Oracle Cloud Infrastructure. Nov. 26, 2019. Retrieved from https://docs.oracle.com/cd/E97706_01/pdf/ug/OCI_User_Guide.pdf (accessed Aug. 30, 2023).
Oracle. "Using DBMS_ROLLING to Perform a Rolling Upgrade" Concepts and Administration. Sep. 2020. Retrieved from https://docs.oracle.com/en/database/oracle/oracle-database/19/sbydb/using-DBMS_ROLLING-to-perform-rolling-upgrade.html#GUID-70C09F5B-90BE-4C8C-96A5-45A52E05D380 (accessed Aug. 30, 2023).
Oracle. "Using Pre-Authenticated Requests" Oracle Cloud Infrastructure Documentation. Apr. 2021. Retrieved from https://docs.public.oneportal.content.oci.oraclecloud.com/en-us/iaas/Content/Object/Tasks/usingpreauthenticatedrequests.htm#Using_PreAuthenticated_Requests (accessed Sep. 14, 2023).
Palmer, Brent, "Date Range." Dribbble, published Oct. 21, 2015 (Retrieved from the Internet Apr. 7, 2020). Internet URL: <https://dribbble.com/shots/2306949-Date-Range> (Year: 2015).
Pederson, Jenna. "Provisioning an RDS Database With Cloudformation (Part 2)" Jenna Pederson. Jun. 28, 2021. Retrieved from https://jennapederson.com/blog/2021/6/28/provisioning-an-rds-database-with-cloudformation-part-2/ (accessed Sep. 6, 2023).
Quest. "Creating custom User-defined Database Groups" Support. Aug. 16, 2017. Retrieved from https://support.quest.com/kb/4229519/creating-custom-user-defined-database-groups (accessed Aug. 30, 2023).
Reinero, Bryan. "Your Ultimate Guide to Rolling Upgrades" MongoDB. May 1, 2018. Retrieved from https://www.mongodb.com/blog/post/your-ultimate-guide-to-rolling-upgrades (accessed Aug. 30, 2023).
Shah, Manish. "Gen 2 Exadata Cloud at Customer New Features: Shared ORACLE_HOME" Exadata Database Machine. Jun. 2, 2020. Retrieved from https://blogs.oracle.com/exadata/post/gen-2-exadata-cloud-at-customer-new-features-shared-oracle-home (accessed Aug. 30, 2023).
Steven Tom, Idaho National Laboratory, "Recommended Practice for Patch Management of Control Systems", Dec. 2008, Cybersecurity Infrastructure Security Agency (CISA), U.S. Department of Homeland Security. (Year: 2008).

(56) References Cited

OTHER PUBLICATIONS

Tudip Digital. "What is Deployment Manager?" Tudip. Jun. 24, 2019. Retrieved from https://tudip.com/blog-post/what-is-deployment-manager/ (accessed Sep. 6, 2023).
Wong, Julie. "OS Management with Oracle Cloud Infrastructure" Oracle Cloud Infrastructure Blog. Mar. 11, 2020. Retrieved from https://blogs.oracle.com/cloud-infrastructure/post/os-management-with-oracle-cloud-infrastructure (accessed Aug. 30, 2023).
YouTube Video screenshots for "Nutanix Business Critical Applications & Databases—.NEXT Europe 2019," YouTube, Oct. 16, 2019, https://www.youtube.com/watch?v=KI7IEmm6j60 [youtube.com].
YouTube Video screenshots for "Nutanix Era .NEXT 2019 Demo," YouTube, May 10, 2019, https://www.youtube.com/watch?v=8hbpfrOSw0U [youtube.com].
YouTube Video screenshots for Alibaba Cloud. "How-to | Set Up a Multi tier WordPress Site on Alibaba Cloud" YouTube. Jun. 25, 2018. https://youtu.be/yWXhibyIW6M [youtube.com].
YouTube Video screenshots for AOS Note. "How to Create an RDS Database Using CloudFormation" YouTube. Feb. 17, 2021. https://youtu.be/h73xPAwffec [youtube.com].
YouTube Video screenshots for Cloud Advocate. "Google Cloud Deployment Manager—Getting Started" YouTube. Aug. 28, 2020. https://youtu.be/qVKp7W1bfrE [youtube.com].
YouTube Video screenshots for Nutanix , "Unify Private and Public Clouds with Nutanix Clusters", YouTube, Jul. 31, 2020, https://www.youtube.com/watch?v=xuw4F4wBDoc [youtube.com].
Yun, Channy. "Amazon RDS Custom for Oracle—New Control Capabilities in Database Environment" AWS News Blog. Oct. 26, 2021. Retrieved from https://aws.amazon.com/blogs/aws/amazon-rds-custom-for-oracle-new-control-capabilities-in-database-environment/ (accessed Aug. 30, 2023).
Zhou, Siyuan, et al. "Fault-Tolerant Replication with Pull-Based Consensus in MongoDB" Usenix. Mar. 10, 2021. Retrieved from https://www.usenix.org/system/files/nsdi21-zhou.pdf (accessed Aug. 30, 2023).
"Amazon RDS Now Supports Setting Up Connectivity Between Your RDS Database and EC2 Compute Instance in 1-Click", Amazon Web Services, https://aws.amazon.com/rds.
"Azure Arc extends the Azure control plane", https://infohub.delltechnologies.com/l/techbook-dell-emc-integrated-system-for-microsoft-azure-stack-hci-2/azure-arc-extends-the-azure-control-plane-14.
"Configure cross-tenant access settings for B2B collaboration", Azure AD, Microsoft Entra, May 24, 2022, 21pp.
"Connected Machine Agent Prerequisites", Sep. 27, 2022, https://learn.microsoft.com/en-us/azure/azure-arc/servers/prerequisites.
"Control Plane", https://docs.controlplane.com.
"Exadata Database Service onCloud@Customer Administrator'sGuide", https://docs.oracle.com/en/engineered-systems/exadata-cloud-at-customer/ecccm/ecc-network-requirements.html#GUID-F06BD75B-E971-48ED-8699-E1004D4B4AC1.
Features and Capabilities of Azure Arcenabled SQL Managed Instance:, Aug. 13, 2022, https://learn.microsoft.com/en-us/azure/azure-arc/data/managed-instance-features.
"Managing Cloud-Native Workloads with Anthos", https://authors.packtpub.com/wp-content/uploads/2021/10/Chapter-8-Professional-Cloud-Architect-1.pdf.
"Oracle Exadata Cloud@Customer X9M", Version 1.17, 2022, https://www.oracle.com/dk/a/ocom/docs/engineered-systems/exadata/exacc-x9m-ds.pdf.
"Overview of Azure Connected Machine Agent", Sep. 4, 2022, https://learn.microsoft.com/en-us/azure/azure-arc/servers/agent-overview.
"Row-Level Security", Sep. 17, 2022, https://learn.microsoft.com/en-us/sql/relational-databases/security/row-level-security?view=sql-server-ver16.
"Use Azure Private Link to Securely Connect Servers to Azure Arc", Jul. 28, 2022, https://learn.microsoft.com/en-us/azure/azure-arc/servers/private-link-security.
Alhamazani, et al, "Cross-Layer Multi-Cloud Real-Time Application QoS Monitoring and Benchmarking As-a-Service Framework", https://arxiv.org/ftp/arxiv/papers/1502/1502.00206.pdf.
Aluciani. "Provisioning PostgreSQL to be Highly Available and Resilient on Nutanix" Nutanix Community Blog. 2019. Retrieved from https://next.nutanix.com/community-blog-154/provisioning-postgresql-to-be-highly-available-and-resilient-on-nutanix-33726 (Year: 2019).
Amazon Web Services, "Amazon RDS Now Supports Setting up Connectivity Between You RDS Database and EC2 Compute Instance in 1-Click", https://aws.amazon.com/about-aws/whats-new/2022/08/amazon-rds-setting-up-connectivity-rds-database-ec2-compute-instance-1-click/.
Amazon Web Services, "Amazon RDS on Outposts", https://aws.amazon.com/rds/outposts/?pg=In&sec=hiw.
Amazon Web Services, "Configuring and Using Oracle Connection Manager on Amazon EC2 for Amazon RDS for Oracle", Jan. 12, 2021, https://aws.amazon.com/blogs/database/configuring-and-using-oracle-connection-manager-on-amazon-ec2-for-amazon-rds-for-oracle.
Amazon Web Services, "SaaS Tenant Isolation Strategies. Isolating Resources in a Multi-Tenant Environment", (Aug. 2020).
Amazon, "Amazon Aurora User Guide for Aurora: Overview of multi-master clusters" Amazon Aurora User Guide from https://docs.aws.amazon.com/AmazonRDS/latest/AuroraUserGuide/aurora-ug.pdf#aurora-multi-master (accessed Jun. 28, 2021).
Anjum, Maaz, "Database Provisioning in EM12c: Provision me a Database Now!" Slideshare, (Dec. 12, 2013) from https://www.slideshare.net/MaazAnjum/maaz-anjum-gouser-database-provisioning-in-em12c-provision-me-a-database-now (accessed Jun. 28, 2021).
Anthos Technical Overview, https://cloud.google.com/anthos/docs/concepts/overview.
ApexSQL, "Automated database provisioning using ApexSQL DevOps toolkit" ApexSQL Knowledgebase (2020) from https://knowledgebase.apexsql.com/automated-database-provisioning-using-apexsql-devops-toolkit/ (accessed Jun. 28, 2021).
Asanka, Dinesh, "Point in Time Recovery with SQL Server" SQL Shack, published Dec. 19, 2016, retrieved Feb. 11, 2022 from <https://www.sqlshack.com/point-in-time-recovery-with-sql-server/> (Year: 2016).
AWS Database Blog, "Configuring and Using Oracle Connection Manager on Amazon for EC2 for Amazon RDS for Oracle", Jan. 12, 2021, https://aws.amazon.com/blogs/database/configuring-and-using-oracle-connection-manager-on-amazon-ec2-for-amazon-rds-for-oracle/.
AWS Prescriptive Guidance, "PostgreSQL Pool Model", https://docs.aws.amazon.com/prescriptive-guidance/latest/saas-multitenant-managed-postgresql/pool.html.
AWS Prescriptive Guidance, "Row-Level Security Recommendations", https://docs.aws.amazon.com/prescriptive-guidance/latest/saas-multitenant-managed-postgresql/rls.html.
AWS Serverless SaaS Workshop—Lab4 : Isolating tenant data in a pooled model—Adding the missing code.
AWS Serverless SaaS Workshop—Lab4 : Isolating tenant data in a pooled model—Revisiting Authentication, Authorization, & Tenant Isolation.
AWS, "Working with Aurora multi-master clusters" User Guide for Aurora. 2020. Received from https://docs.aws.amazon.com/AmazonRDS/latest/AuroraUserGuide/aurora-multi-master.html (Year: 2020).
Ay, Neslisah. "How to Set Up a High Available PostgreSQL Cluster Using Patroni" Neslisah Ay Medium Page. Mar. 18, 2019. Retrieved from https://medium.com/@neslisah.demirci/how-to-set-up-a-high-available-postgresql-cluster-using-patroni-d7044a754d2f (Year: 2019).
BackupAssist, "https://backupassist.com/support/en/backupassist/manage/calendar.htm", Jul. 1, 2017 (Year: 2017).
Balasubramanian, Sudhir, "Virtual Volumes for Database Backup and Recovery" VMware Virtualize Applications (Nov. 5, 2015) from https://blogs.vmware.com/apps/2015/11/virtual-volumes-for-database-backup-and-recovery-2.html (accessed Jun. 2, 2021).

(56) References Cited

OTHER PUBLICATIONS

Bolton, Dean et al. "Database-as-a-Service (DBaaS) Reference Architecture with VMware and Tintri" VMware Tintri VLSS (2015) from https://blogs.vmware.com/apps/files/2015/10/vRA_DBAAS_VLSS_Tintri.pdf (Jun. 2, 2021).
Brooks, Aaron, "19 Best A/B Testing Tools in 2021" (published Aug. 12, 2020) Venture Harbour, from https://www.ventureharbour.com/best-a-b-testing-tools/ (accessed Sep. 14, 2021).
Brull, Jim, "Oracle Cloud Database vs On-Premises—Understanding the Differences" Centroid—OCI, Oracle Cloud. 2020. Received from https://www.centroid.com/blog/oracle-cloud-database-vs-on-premises/ (Year: 2020).
Brummitt, Karis et al., "Database provisioning just got a lot easier—and a lot smarter" RealWire (Feb. 27, 2017) from https://www.realwire.com/releases/Database-provisioning-just-got-a-lot-easier-and-a-lot-smarter (accessed Jun. 28, 2021).
Bucur, et al., "Multi-Cloud Resource Management Techniques for Cyber-Physical Systems", MDPI, Dec. 15, 2021, https://www.ncbi.nlm.nih.gov/pmc/articles/PMC8706026/.
Cano, Ignacio, et al. "Curator: Self-Managing Storage for Enterprise Clusters" (Mar. 27, 2017), from https://www.usenix.org/conference/nsdi17/.
Cisco Public "Hyperconvergence for Databases" (2019) from https://www.cisco.com/c/dam/en/us/products/collateral/hyperconverged-infrastructure/hyperflex-hx-series/le-60303-hxsql-aag.pdf (accessed Dec. 18, 2019).
Cisco Public, "Cisco HyperFlex All-Flash Systems for Oracle Database Deployments" (Jun. 2017) from https://www.cisco.com/c/en/us/products/collateral/hyperconverged-infrastructure/hyperflex-hx-series/whitepaper_c11-739237.pdf (accessed Dec. 18, 2019).
Cisco Public, "Cisco HyperFlex All-NVMe Systems for Oracle Database: Reference Architecture" (2019) from https://www.cisco.com/c/en/us/products/collateral/hyperconverged-infrastructure/hyperflex-hx-series/hx-oracle-wp.html (accessed Dec. 18, 2019).
Cisco Public, "Cisco HyperFlex HX Data Platform" (2018) from https://www.cisco.com/c/dam/en/us/products/collateral/hyperconverged-infrastructure/hyperflex-hx-series/white-paper-c11-736814.pdf (accessed Dec. 18, 2019).
Cormac, "Virtual Volumes (VVols) and Replication/DR" cormachogan.com (Apr. 13, 2015) from https://cormachogan.com/2015/04/13/virtual-volumes-vvols-and-replicationdr/ (accessed Jun. 2, 2021).
Cunnhingham, "Introducing PlanetScale Managed Cloud", Nov. 3, 2021, https://planetscale.com/blog/introducing-planetscale-managed-cloud.
Delphix "Backup and Recovery Strategies for the Delphix Engine" (published 2017) Delphix Corp., from https://docs.delphix.com/docs/data-backup-and-recovery-solutions/backup-and-recovery-strategies-for-the-delphix-engine (accessed Dec. 19, 2019).
Delphix "Database Provisioning Overview" (published 2017) Delphix Corp., from https://docs.delphix.com/docs/introduction/database-virtualization-with-delphix/database-provisioning-overview (accessed Dec. 19, 2019).
Delphix "Quick Start Guides" (published 2017) Delphix Corp., from https://docs.delphix.com/docs52/quick-start-guides (accessed Dec. 19, 2019).
Delphix "Replication" (Published 2017) Delphix Corp., from https://docs.delphix.com/docs52/data-backup-and-recovery-solutions/replication (accessed Dec. 19, 2019).
Delphix, "Provisioning and Managing Virtual Databases" Delphix Engine 6.0.8.0 Documentation (2020) from https://docs.delphix.com/docs/datasets/getting-started/provisioning-and-managing-virtual-databases (accessed Jun. 28, 2021).
Delphix, "Understanding SnapSync and LogSync for Oracle" (May 5, 2013) from https://www.delphix.com/blog/data-virtualization/understanding-snapsync-and-logsync-oracle (accessed Jan. 7, 2020).
Drake, Sam et al. "Architecture of Highly Available Databases" International Service Availability Symposium, pp. 1-16. Springer, Berlin, Heidelberg, 2004. (Year: 2004).
Dremio, "Multiple AWS Clusters" Dremio. 2020. Received from https://docs.dremio.com/deployment/provisioning-ec2.html (Year: 2020).
Fenton, Tom, "How To Create VMware Virtual Volumes" Virtualization & Cloud Review (Feb. 26, 2015) from https://virtualizationreview.com/articles/2015/02/26/how-to-create-vmware-virtual-volumes.aspx (accessed Jun. 2, 2021).
Flecha, Pete, "Whats New in Virtual Volumes (vVols) 2.0" VMware vSAN Virtual Blocks Blog (Oct. 18, 2016) from https://blogs.vmware.com/virtualblocks/2016/10/18/whats-new-in-virtual-volumes-2-0/ (accessed Jun. 2, 2021).
Friedman, Vitaly, "Designing the Perfect Date and Time Picker." Smashing Magazine, published Jul. 2017 (Retrieved from the Internet Apr. 7, 2020). Internet URL: <https://www.smashingmagazine.com/2017 /07 /designing-perfect-date-time-picker/> (Year: 2017).
Fritchey, Grant, "SQL Server Database Provisioning" Redgate, (Nov. 4, 2016) from https://www.red-gate.com/simple-talk/devops/database-devops/sql-server-database-provisioning/ (accessed Jun. 28, 2021).
Geek University, "VM snapshot files," VMware ESXi course, retrieved Sep. 11, 2022 from https://geek-university.com/vm-snapshot-files/.
Geier, Eric, "Using Static IP Addresses on Your Network" Cisco Press. Sep. 14, 2009. Received from https://www.ciscopress.com/articles/article.asp?p=1393495. (Year: 2009).
Google Cloud, "Architectures for high availability of PostgreSQL clusters on Compute Engine" Google Cloud Architecture Center, (Jan. 21, 2021) from https://cloud.google.com/architecture/architectures-high-availability-postgresql-clusters-compute-engine (accessed Dec. 14, 2021).
Grace, Cato, "What's New in SRM and vSphere Replication 8.3" VMware vSAN Virtual Blocks Blog (Mar. 10, 2020) from https://blogs.vmware.com/virtualblocks/2020/03/10/whats-new-srm-vr-83/ (accessed Jun. 2, 2021).
Guevara, Introducing PlanetScale Insights: Advanced query monitoring, May 26, 2022, https://planetscale.com/blog/introducing-planetscale-insights-advanced-query-monitoring.
Gui, Huan et al. "Network A/B Testing: From Sampling to Estimation" Proceedings of the 24th International Conference on World Wide Web (WWW 15), pp. 399-409, May 18, 2015. DOI: 10.1145/2736277.2741081 (Year: 2015).
Hammerspace, "Simplify Database Deployment Across Kubernetes Clusters" Hammerspace Solution Brief. 2020. Received from https://hammerspace.com/wp-content/uploads/2019/03/HS0107-USEN-Multi-Cluster-Database-Deployments.pdf (Year: 2020).
Hosterman, Cody, "Introducing vSphere Virtual Volumes on the FlashArray" Pure Storage (Jun. 13, 2017) from https://blog.purestorage.com/purely-technical/introducing-vsphere-virtual-volumes-on-the-flasharray/ (accessed Jun. 2, 2021).
Hosterman, Cody, "Introducing vSphere Virtual vols. on the FlashArray" PureStorage, (Jun. 13, 2017) from https://blog.purestorage.com/purely-technical/introducing-vsphere-virtual-volumes-on-the-flasharray/ (accessed Jun. 28, 2021).
Hosterman, Cody, "Virtual Volumes and Array Snapshots Part I: Managed Snapshots" codyhosterman.com (Jul. 30, 2018) from https://www.codyhosterman.com/2018/07/virtual-volumes-and-array-snapshots-part-i-managed-snapshots/ (accessed Jun. 2, 2021).
Hosterman, Cody, "What's New in vSphere 7.0 Storage Part I: vVols are all over the place!" codyhosterman.com (Mar. 10, 2021) from https://www.codyhosterman.com/2020/03/whats-new-in-vsphere-7-0-storage-part-i-vvols-are-all-over-the-place/ (accessed Jun. 2, 2021).
Hu et al. "Architecture of Highly Available Databases" Lecture Notes in Computer Science (LCNS). vol. 3335, pp. 1-16. May 2004. DOI: 10.1007/978-3-540-30225-4_1. (Year: 2004).
IBM, "Creating a database deployment on the cluster" IBM Cloud Paks 2.1.0 (2021) from https://www.ibm.com/docs/en/cloud-paks/cp-data/2.1.0?topic=database-creating-deployment (accessed Jun. 28, 2021).
Katz, Jonathan S. "Multi-Kubernetes Cluster PostgreSQL Deployments" Crunchy Data. May, 7, 2020. Received from https://info.crunchydata.com/blog/multi-kubernetes-cluster-postgresql-deployments (Year: 2020).
Kohavi, Ron et al., "Online Controlled Experiments and A/B Testing" Encyclopedia of Machine Learning and Data Mining, vol. 7, No. 8, pp. 922-929. Jan. 2017. DOI: 10.1007/978-1-4899-7502-7 891-1 (Year: 2017).

(56) References Cited

OTHER PUBLICATIONS

Kubernetes "Configure Access to Multiple Clusters" Kubernetes Documentation. Oct. 22, 2020. Retrieved from https://kubernetes.io/docs/tasks/access-application-cluster/configure-access-multiple-clusters/ (Year: 2020).
Kubernetes, "Configure Access to Multiple Clusters" Kubernetes Documentation. Oct. 22, 2020. Received from https://kubernetes.io/docs/tasks/access-application-cluster/configure-access-multiple-clusters/ (Year: 2020).
Kumar, Madan. "Managing High Availability in PostgreSQL—Part III: Patroni" ScaleGrid. Aug. 22, 2019. Retrieved from https://scalegrid.io/blog/managing-high-availability-in-postgresql-part-3/ (Year: 2019).
Lctree, "Lctree," Linked Clone Tree Visualizer for vCloud Director, published (Nov. 28, 2012).
Lee, Brandon, "VMware vSphere 7 vVols New Features" VirtualiztaionHowto (Jun. 3, 2020) from https://www.virtualizationhowto.com/2020/06/vmware-vsphere-7-vvols-new-features/ (accessed Jun. 2, 2021).
M. A. Metawai et al. "Load balancing in distributed multi-agent computing systems" Ain Shams Engineering Journal. ASEJ. May 23, 2012. p. 237-249. (Year: 2012).
Matijaca, Ante, "Dashboard" Dribble, published Dec. 21, 2015, retrieved Feb. 11, 2022 from <https://dribbble.com/shots/2417233-Dashboard> (Year: 2015).
Meadowcroft, Ben, "Virtual Volumes: First Year In Review" VMware vSAN Virtual Blocks Blog (Mar. 14, 2016) from https://blogs.vmware.com/virtualblocks/2016/03/14/virtual-volumes-first-year-in-review/ (accessed Jun. 28, 2021).
Mehta, Siddharth, "Analytics with Bower BI Desktop Dynamic Line References" MSSQL Tips, published Oct. 2, 2017, retrieved Feb. 11, 2022 from <https://www.mssqltips.com/sqlservertip/5084/analytics-with-power-bi-desktop-dynamic-line-references/? (Year: 2017).
Mellor, Chris "Beam, Flow and Era: Not a yoga class, silly, Nutanix's move into copy data management" (published May 10, 2019) The Register, from https://www.theregister.co.uk/2018/05/10/nutanix_beam_flow_era/ (accessed Dec. 18, 2019).
Mellor, Chris "Delphix sends database virtualization sailing up the Amazon" (published Dec. 1, 2017) The Register, from https://www.theregister.co.uk/2017/12/01/delphix_database_virtualization_comes_to_aws/ (accessed Dec. 18, 2019).
Microsoft Docs, "Always On availability groups: a high-availability and disaster-recovery solution" Microsoft SQL Docs, Apr. 23, 2019 (2019), https://docs.microsoft.com/en-us/sql/database-engine/availability-groups/windows/always-on-availability-groups-sql-server?view=sql-server-ver15.
Microsoft Docs, "What is an Always On availability group?" Microsoft SQL Docs, Apr. 29, 2020 (2020) https://docs.microsoft.com/en-us/sql/database-engine/availability-groups/windows/overview-of-always-on-availability-groups-sql-server?view=sql-server-ver15.
Microsoft SQL, "Upgrading Always On Availability Group Replica Instances" Microsoft SQL Docs, Jan. 10, 2018, retrieved from https://docs.microsoft.com/en-us/sql/database-engine/availability-groups/windows/upgrading-always-on-availability-group-replica-instances?view=sql-server-ver15 (retrieved Feb. 15, 2021).
Microsoft, "Use a template to create an Access desktop database," Microsoft Office Support, retrieved Sep. 29, 2022 from https://support.microsoft.com/en-us/office/use-a-template-to-create-an-access-desktop-database-d9354d47-e4ce-4efb-878b-c48f3650fb73.
Microsoft, "Database Engine Instances (SQL Server)" Oct. 2, 2020, from https://docs.microsoft.com/en-us/sql/database-engine/configure-windows/database-engine-instances-sql-server?view=sql-server-ver15 (retrieved Jan. 25, 2022).
Mulford, Juan, "vSphere 7—Describe Instant Clone Architecture And Use Cases," Mulcas Cloudy Infrastructures, published Dec. 28, 2021, retrieved Sep. 11, 2022 from https://mulcas.com/vsphere-7-describe-instant-clone-architecture-and-use-cases/.
MVware, "Horizon Architecture", https://techzone.vmware.com/resource/horizon-architecture#introduction.
Net App Support, "Data replication from one destination to another in a series (cascading)" Net App. 2015. Received from https://library.netapp.com/ecmdocs/ECMP1635994/html/GUID-25C143ED-C369-4129-B055-C532FDB8AB79.html (Year: 2015).
Netapp Support, "Cloning databases using SnapManager" (Aug. 2013) from, https://library.netapp.com/ecmdocs/ECMP1217281/html/GUID-EAA4950A-C186-423D-9574-6EA12A92E53D.html (accessed Dec. 17, 2019).
Netapp Support, "Types of SnapManager restore operations" (Aug. 2013) from, https://library.netapp.com/ecmdocs/ECMP1217281/html/GUID-599DF5AE-C49F-4BF0-A96C-E6E71FAFF102.html (accessed Dec. 17, 2019).
Nizhegolenko, Alexey. "High-Availability MySQL cluster with load balancing using HAProxy and Heartbeat." Towards Data Science. Dec. 3, 2018. Retrieved from https://towardsdatascience.com/high-availability-mysql-cluster-with-load-balancing-using-haproxy-and-heartbeat-40a16e134691 (Year: 2018).
Notion, "Database templates," Notion Help Center, retrieved Sep. 29, 2022 from https://www.notion.so/help/database-templates.
Nutanix, "Blueprints Usage," Nutanix Support and Insights, retrieved Sep. 29, 2022 from https://portal.nutanix.com/page/documents/details?targetId=Nutanix-Calm-Admin-Operations-Guide-v3_2_7:nuc-nucalm-blueprints-intro-c.html.
Nutanix, "Creating a Playbook," Nutanix Support and Insights, retrieved Sep. 29, 2022 from https://portal.nutanix.com/page/documents/details?targetId=Nutanix-Beam-User-Guide:bea-playbook-create-t.html.
Nutanix, "Creating a ServiceNow Template in Beam," Nutanix Support and Insights, retrieved Sep. 29, 2022 from https://portal.nutanix.com/page/documents/details?targetId=Nutanix-Beam-User-Guide:bea-servicenow-template-create-cg-t.html.
Nutanix, "Nutanix Hybrid Cloud Infrastructure Now Available on Amazon Web Services" Nutanix Press Release. Aug. 11, 2020. Received from https://www.nutanix.com/press-releases/2020/nutanix-clusters-on-aws?icid=111AJW0ZPW22N (Year: 2020).
Nyffenegger et al., "SQL Server Instance" 2017, from https://renenyffenegger.ch/notes/development/databases/SQL-Server/architecture/instance (retrieved Jan. 25, 2022).
Opster, "High Availability in Elasticsearch—Cross Cluster Replication and Alternatives" Opster. 2020. Received from https://opster.com/blogs/elasticsearch-cross-cluster-replication-overview/ (Year: 2020).
Opster, "Multi-Cluster Load Balancer-An Alternative to Cross Cluster Replication" Opster. 2020. Received from https://opster.com/elasticsearch-multi-cluster-load-balancer/ (Year: 2020).
Or, Andrew, "Understanding your Apache Spark Application Through Visualization" Data Bricks, published Jun. 22, 2015, retrieved Feb. 11, 2022 from <https://databricks.com/blog/2015/06/22/understanding-your-spark-application-through-visualization.html> (Year: 2015).
Oracle Communications, "Provisioning Database Interface User's Guide, Release 16.0" (Sep. 2014) Oracle, p. 1-174.
Oracle Help Center, "Enterprise Manager Lifecycle Management Administrator's Guide, 4. Overview of Database Provisioning" (2019) from, https://docs.oracle.com/cd/E24628_01/em.121/e27046/prov_db_overview.htm#EMLCM12206, (accessed Dec. 17, 2019).
Oracle, "Creating Databases Using Database Template," Cloud Administration Guide, retrieved Sep. 29, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.
Oracle, "Creating Databases Using Database Template," Cloud Administration Guide, retrieved on Oct. 17, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.
Oracle, "Creating Databases Using Database Template," Enterprise Manager Cloud Administration Guide, retrieved Sep. 29, 2022 from https://docs.oracle.com/cd/E91266_01/EMCLO/GUID-BB3923BE-192D-40A2-9C5D-AAC5BA3326C0.htm#EMCLO2097.
Oracle, "Creating Databases Using Database Template," Enterprise Manager Cloud Administration Guide, retrieved on Oct. 17, 2022 from https://docs.oracle.com/cd/E91266_01/EMCLO/GUID-BB3923BE-192D-40A2-9C5D-AAC5BA3326C0.htm#EMCLO2097.

(56) References Cited

OTHER PUBLICATIONS

Oracle, "Exadata Cloud@Customer Security Controls", Version 2.18, Jul. 27, 2022, https://www.oracle.com/a/ocom/docs/engineered-systems/exadata/exadata-cloud-at-customer-security-controls.pdf.
Oracle, "Introduction to Blueprints," Enterprise Manager Cloud Administration Guide, retrieved Sep. 29, 2022 from https://docs.oracle.com/cd/E63000_01/EMCLO/blueprint.htm#EMCLO1910.
Oracle, "Oracle Exadata Cloud@Customer X9M", Version 1.17, 2022, https://www.oracle.com/dk/a/ocom/docs/engineered-systems/exadata/exacc-x9m-ds.pdf.
Oracle, "Oracle Gen 2 Exadata Cloud@Customer Security Controls", version 2.18, Jul. 27, 2022, https://www.oracle.com/a/ocom/docs/engineered-systems/exadata/exadata-cloud-at-customer-security-controls.pdf.
Oracle, "Using the DBaaS Self Service Portal," Cloud Administration Guide, retrieved Sep. 29, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.
Oracle, "Using the DBaaS Self Service Portal," Cloud Administration Guide, retrieved on Oct. 17, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.
Oracle, "Part III: Database Provisioning" Enterprise Manager Lifecycle Management Administrator's Guide (2012) from https://docs.oracle.com/cd/E24628_01/em.121/e27046/part_db_prov.htm#CHDBHBCE (accessed Jun. 28, 2021).
Patil, Manoj E. et al. "Design and Implementation of Graphical User Interface for Relational Database Management System" (2012), International Jounral of Computer Science and Information Technologies (IJCSIT), vol. 3 (3), p. 3871-3874.
PlanetScale, Deployment Options Documentation, Aug. 1, 2022, https://planetscale.com/docs/concepts/deployment-options#cloud.
PlanetScale, Query Insights Documentation, 2022, https://planetscale.com/docs/concepts/query-insights#insights-page-overview.
PlanetScale, The MySQL-compatible serverless database platform, 2022, https://planetscale.com.
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Principled Technologies, "VMware vCloud Automation Center DBaaS: Provision databases in minutes" A Principled Technologies Test Report (Aug. 2014) from https://www.principledtechnologies.com/vmware/vCAC_DBaaS_0914.pdf (accessed Jun. 2, 2021).
Raffic, Mohammed, "Creating Linked Clone Desktop Pools in VMware Horizon View 6.X," VMware Arena, published Mar. 15, 2017, retrieved Sep. 11, 2022 from http://www.vmwarearena.com/creating-linked-clone-desktop-pools-in-vmware-horizon-view-6-x/.
Red Hat "Chapter 4. Configuring The Haproxy Load Balancer" Red Hat Customer Portal. 2020. Retrieved on Dec. 22, 2020 from https://access.redhat.com/documentation/en-us/red_hat_cloudforms/4.6/html/high_availability_guide/configuring_haproxy (Year: 2020).
Reed, Kate "Nutanix Introduces Database Services with Era" (published May 9, 2018) Business Wire, from https://www.businesswire.com/news/home/20180509005397/en/ (accessed Dec. 18, 2019).
Reed, Kate "Nutanix Introduces Database Services with Era" (published May 9, 2018) Nutanix Press Releases, from https://ir.nutanix.com/company/press-releases/press-release-details/2018/Nutanix-Introdu/ (accessed Dec. 18, 2019).
Rocheleau, Jake, "30 Best Free Calendar & Datepicker jQuery Plugins." Vandelay Design, published Aug. 29, 2018 (Retrieved from the Internet Apr. 7, 2020). Internet URL: <https://www.vandelaydesign.com/30-best-free-jquery-plugins/> (Year: 2018).
Sanglaji, Maryam et al. "Nutanix Era: Databases Made Simple" (published 2018) Nutanix, from https://www.nutanix.com/blog/nutanix-era-databases-made-simple (accessed Dec. 18, 2019).
Sanglaji, Maryam et al. "Nutanix Era: One-click Database Management (London)" (published 2018) .NEXT Conference 2018, from https://next.nutanix.com/next-conference-2018-54/nutanix-era-one-click-database-manag (accessed Dec. 18, 2019).
Sanglaji, Maryam et al. "Nutanix Era: One-click Database Management" (published 2018) .NEXT Conference 2018, from https://www.dropbox.com/s/tfhw1nb0rcvexg3/NEXTEURO2018%20-%20Nutanix%20Era-One%20click%20Database%20Management.pdf?dl=0 (accessed Dec. 18, 2019).
Savjani, Parikshit, "Automate your Azure Database for MySQL deployments using ARM templates," Microsoft Azure, published Nov. 1, 2018, retrieved Sep. 29, 2022 from https://azure.microsoft.com/en-us/blog/automate-your-azure-database-for-mysql-deployments-using-arm-templates/.
Sharif, Ashraf. "Making Your Database Components Highly Available (HA) via Load Balancers". Several Nines. Mar. 20, 2018. Retrieved from https://severalnines.com/blog/become-clustercontrol-dba-making-your-db-components-ha-load-balancers (Year: 2018).
Stack Exchange Users. "PostgreSQL High Availability/Scalability using HAProxy and PGBouncer" Stack Exchange. Nov. 2020. Retrieved from https://dba.stackexchange.com/questions/56559/postgresql-high-availability-scalability-using-haproxy-and-pgbouncer (Year: 2020).
Stepan, "How to Set Up Multi-Cluster Load Balancing with GKE", DoiT International. Aug. 17, 2020. Received from https://blog.doit-intl.com/how-to-setup-multi-cluster-load-balancing-with-gke-4b407e1f3dff (Year: 2020).
Stone, "Cross Tenant Access", LoanPro Help, https://help.loanpro.io/article/vyy37c5bhd-cross-tenant-access, accessed Jun. 29, 2022.
Storti, Brian "A Primer on Database Replication" Brianstorti.com (May 23, 2017) from https://www.brianstorti.com/replication/ (accessed Jun. 28, 2021).
Tang, "Multi-tenant access control for cloud services", Aug. 2014, The University of Texas at San Antonio College of Sciences.
Tarvo, Alexander et al., "CanaryAdvisor: a statistical-based tool for canary testing (demo)" Proceedings of the 2015 International Symposium on Software Testing and Analysis (ISSTA 2015), pp. 418-422, Jul. 13, 2015, DOI: 10.1145/2771783.2784770 (Year: 2015).
Tessel for Oracle, "Fully-managed, high-performance Oracle databases with enterprise-grade data protection, security, and compliance@ your terms", 2022, https://www.tessell.io/services/oracle.
The Nutanix Bible; from https://nutanixbible.com/; accessed on Jan. 12, 2016.
The Nutanix Bible; from https://nutanixbible.com/; accessed on Jun. 25, 2018.
The Nutanix Bible; from https://nutanixbible.com/; accessed on Jan. 3, 2017.
The Nutanix Bible; from https://nutanixbible.com/; accessed on Jan. 3, 2018.
The Nutanix Bible; from https://nutanixbible.com/; accessed on Sep. 4, 2015.
The Nutanix Bible; from https://nutanixbible.com/; accessed on Jan. 8, 2019.
The Nutanix Bible; from https://nutanixbible.com/; accessed on Jun. 8, 2017.
The Nutanix Bible; from https://nutanixbible.com/; accessed on Jun. 9, 2016.
Virtualization Works, "VMware vFabric Data Director" Virtualization Works: VMware Authorized Online Reseller, (Jun. 2021) from

(56) References Cited

OTHER PUBLICATIONS https://www.virtualizationworks.com/vFabric-Data-Director.asp#:~:text=VMware%C2%AE%20vFabric%E2%84%A2%20Data,agility%20and%20reducing%20database%20TCO (accessed Jun. 28, 2021).
VMware "VMware vFabric Data Director Administrator and User Guide: Clone a Database" (2012) from https://pubs.vmware.com/datadirector/index.jsp?topic=%2Fcom.vmware.datadirector.admin.doc%2FGUID-426EEA1E-BF44-462F-B400-E2421F53144D.html (accessed Dec. 17, 2019).
VMware Horizon, "Horizon Control Plane Services Architecture", Sep. 2021, https://images.techzone.vmware.com/sites/default/files/resource/horizon_control_plane_services_architecture_noindex.pdf.
VMware Tanzu, "Innovate and grow your business on any and many clouds-fast", 2022.
VMware, "Clone a Virtual Machine," VMware Fusion, published Sep. 3, 2020, retrieved Sep. 11, 2022 from https://docs.vmware.com/en/VMware-Fusion/12/com.vmware.fusion.using.doc/GUID-482C606F-0143-4466-A64A-F64116BC5430.html.
VMware, "Create a Workload Cluster Template," VMware Telco Cloud Automation, published Apr. 6, 2021, retrieved on Sep. 29, 2022 from https://docs.vmware.com/en/VMware-Telco-Cloud-Automation/1.9/com.vmware.tca.userguide/GUID-E33A228F-4FB6-41BB-BC8E-AB0D3642B788.html.
VMware, "Deploy a Virtual Machine from a Template in the vSphere Web Client," VMware vSphere, published Apr. 8, 2021, retrieved Sep. 29, 2022 from https://docs.vmware.com/en/VMware-vSphere/6.7/com.vmware.vsphere.vm_admin.doc/GUID-8254CD05-CC06-491D-BA56-A773A32A8130.html.
VMware, "Getting Started with Database Ingestion," VMware vFabric Data Director 2.0, retrieved Sep. 11, 2022 from https://www.vmware.com/pdf/vfabric-data-director-20-database-ingestion-guide.pdf.
VMware, "Horizon 7 Administration," VMware Horizon 7 7.13, published Oct. 2020, retrieved Sep. 11, 2022 from https://docs.vmware.com/en/VMware-Horizon-7/7.13/horizon-administration.pdf.
VMware, "Horizon Cloud on Microsoft Azure Architcture", https://techzone.vmware.com/resource/horizon-cloud-on-microsoft-azure-architecture#introduction.
VMware, "Horizon Cloud Pods in Microsoft Azure—Create a VDI Multi-Cloud Assignment in Your Horizon Cloud Tenant Environment", Aug. 8, 2022, https://docs.vmware.com/en/VMware-Horizon-Cloud-Service/services/hzncloudmsazure.admin15/GUID-9EE86FC9-49CB-4995-8346-3AA76CCE96F8.html.
VMware, "Horizon Control Plane Services Architecture", Sep. 2021, https://images.techzone.vmware.com/sites/default/files/resource/horizon_control_plane_services_architecture_noindex.pdf.
VMware, "Horizon Messaging", https://docs.vmware.com/en/VMware-Horizon-7/7.13/horizon-architecture-planning/GUID-39B5D03B-F619-4355-A30A-F8544D95539C.html.
VMware, "Learn More About Network Profiles in vRealize Automation Cloud", https://docs.vmware.com/en/vRealize-Automation/services/Using-and-Managing-Cloud-Assembly/GUID-01E442EE-4004-4ED1-AA32-9CF73F24CB09.html.
VMware, "Managing Virtual Machines in VMware Cloud on AWS," VMware Cloud on AWS, published Feb. 11, 2021, retrieved on Sep. 29, 2022 from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html.
VMware, "Setting Up Virtual Desktops in Horizon Console," VMware Horizon 7 7.13, published Oct. 2020, retrieved Sep. 11, 2022 from https://docs.vmware.com/en/VMware-Horizon-7/7.13/virtual-desktops.pdf.
VMware, "Snapshot Files," VMware vSphere, published Jul. 29, 2022, retrieved Sep. 11, 2022 from https://docs.vmware.com/en/VMware-vSphere/7.0/com.vmware.vsphere.vm_admin.doc/GUID-38F4D574-ADE7-4B80-AEAB-7EC502A379F4.html.
VMware, "Understanding Clones in VMware vSphere 7," Performance Study, published May 27, 2021, retrieved on Sep. 11, 2022 from https://www.vmware.com/content/dam/digitalmarketing/vmware/en/pdf/techpaper/performance/cloning-vSphere7-perf.pdf.
VMWare, "Using VMware Workstation Pro," VMware Workstation Pro 16.0, published 2021, retrieved Sep. 11, 2022 from https://docs.vmware.com/en/VMware-Workstation-Pro/16.0/workstation-pro-16-user-guide.pdf.
VMware, "VMware Horizon 7 Instant-Clone Desktops And RDSH Servers," VMware Horizon 7.x, published Jul. 2017, retrieved Sep. 11, 2022 from https://www.vmware.com/content/dam/digitalmarketing/vmware/en/pdf/techpaper/vmware-horizon-view-instant-clone-technology.pdf.
VMware, "VMware Horizon on VMware vSAN Best Practices," Technical White Paper, published Dec. 2020, retrieved Sep. 11, 2022 from https://www.vmware.com/content/dam/digitalmarketing/vmware/en/pdf/products/vsan/vmware-horizon-7-on-vmware-vsan-best-practices.pdf.
VMware, "VMware vFabric Data DirectorAdministrator and User Guide," vFabric Data Director 1.0, retrieved Sep. 11, 2022 from https://usermanual.wiki/vmware/vfabricdatadirector10ag.715740134/view.
VMware, "VMware vStorage Virtual Machine File System," Vmware Technical White Paper Updated for VMware Vsphere 4 Version 2.0, retrieved Sep. 11, 2022 from https://www.vmware.com/content/dam/digitalmarketing/vmware/en/pdf/techpaper/vmware-vmfs-tech-overview-white-paper.pdf.
VMware, "vRealize Automation Cloud and VMware Cloud on AWS", https://www.vmware.com/content/dam/digitalmarketing/vmware/en/pdf/vrealize-automation/vmw-vrealize-automation-cloud-on-aws-solution-brief.pdf.
VMware, "Create a Workload Cluster Template" (published Apr. 6, 2021) from https://docs.vmware.com/en/VMware-Telco-Cloud-Automation/1.9/com.vmware.tca.userguide/GUID-E33A228F-4FB6-41BB-BC8E-AB0D3642B788.html (accessed Sep. 10, 2021).
VMware, "Deploy a Virtual Machine from a Template in the vSphere Web Client" (published Apr. 8, 2021) from https://docs.vmware.com/en/VMware-vSphere/6.7/com.vmware.vsphere.vm_admin.doc/GUID-8254CD05-CC06-491D-BA56-A773A32A8130.html (accessed Sep. 10, 2021).
VMware, "Getting Started with Database-as-a-Service" VMware vFabric Data Director 2.0 (2012) from https://www.vmware.com/pdf/vfabric-data-director-20-database-as-a-service-guide.pdf (accessed Jun. 2, 2021).
VMware, "Managing Virtual Machines in VMware Cloud on AWS" (published Feb. 11, 2021) from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html (accessed Sep. 10, 2021).
VMware, "Virtual Volumes and Replication" VMware Docs (May 31, 2019) from https://docs.vmware.com/en/VMware-vSphere/6.5/com.vmware.vsphere.storage.doc/GUID-6346A936-5084-4F38-ACB5-B5EC70AB8269.html (accessed Jun. 2, 2021).
VMware, "VMware vFabric Data Director 2.0: Getting Started with Database Provisioning" (2012) from https://www.vmware.com/pdf/vfabric-data-director-20-database-provision-guide.pdf (accessed Dec. 18, 2019).
VMware, "What's New in vSphere 7 Core Storage" VMware The Cloud Platform Tech Zone (May 17, 2021) from https://core.vmware.com/resource/whats-new-vsphere-7-core-storage#sec2-sub5 (accessed Jun. 2, 2021).
VMware, "What's New: vSphere Virtual Volumes" VMware Storage Business Unit Documentation (Aug. 2015) from https://www.vmware.com/content/dam/digitalmarketing/vmware/en/pdf/products/virtualvolumes/vmware-whats-new-vsphere-virtual-volumes.pdf (accessed Jun. 2, 2021).
VMWare, Cloud Control Plane Management, "Horizon Control Plane Services", https://www.vmware.com/in/products/horizon/controlplane.html.
VMware, Create Network Profiles, https://vdc-repo.vmware.com/vmwb-repository/dcr-public/e07569a6-6154-45d7-acdf-595e0b089892/44bb2e01-dd74-44e8-98da-b16f257b9a8d/GUID-35DF1889-6E34-449E-915A-3BC5C4DA172C.html.

(56) References Cited

OTHER PUBLICATIONS

Warner, Alex et al., "Chapter 16—Canarying Releases" (published 2018) Google Workbook published by O'Reilly Media, Inc., from https://sre.google/workbook/canarying-releases/ (accessed Sep. 14, 2021).
Warren, "Internet Archive Wayback Machine Introduces New Beta Version With Calendar View." warren's blog, published Jan. 23, 2011 (Retrieved from the Internet Apr. 7, 2020). Internet URL: <warrenduecker.blogspot.com/2011/01/internet-archive-wayback-machine.html> (Year: 2011).
WebDeveloper Juice, "7 Beatiful Web Based Timeline Using Javascript and CSS," WebDeveloper Juice, published Sep. 28, 2011, retrieved Feb. 11, 2022 from <https://www.webdeveloperjuice.com/2011/09/28/7-beautiful-web-based-timeline-using-javascript-and-css/> (Year: 2011).
Wickstrom, Frank, "Keeping personal data personal with database sanitization" Anders. (Jun. 26, 2019) from https://www.anders.com/en/blog/keeping-personal-data-personal-with-database-sanitization/ (accessed Jun. 28, 2021).
YouTube Video screenshots for "Nutanix Business Critical Applications & Databases—.NEXT Europe 2019," YouTube, Oct. 16, 2019, https://www.youtube.com/watch?v=KI7IEmm6j6o [youtube.com].
YouTube Video screenshots for Nutanix , "Nutanix Era .NEXT 2019 Demo", YouTube, May 10, 2019, https://youtu.be/PAWHHdCEArc [youtube.com].
Zhang, Junchi, "vFabric Data Director 2.7 customer deck," published May 17, 2013, retrieved Sep. 11, 2022 from https://www.slideshare.net/harryaya/vfabric-data-director-27-customer-deck.
AWS. "Amazon DocumentDB elastic clusters: how it works" Amazon DocumentDB. Retrieved from https://docs.aws.amazon.com/documentdb/latest/developerguide/elastic-how-it-works.html (accessed Apr. 6, 2023).
AWS. "Amazon EC2 M5 Instances" Amazon DocumentDB. Amazon EC2. Retrieved from https://aws.amazon.com/ec2/instance-types/m5/ (accessed Apr. 6, 2023).
AWS. "Amazon ECS clusters" Amazon Elastic Container Service. Retrieved from https://docs.aws.amazon.com/AmazonECS/latest/developerguide/clusters.html (accessed Apr. 6, 2023).
AWS. "Amazon Virtual Private Cloud" User Guide. Retrieved from https://docs.aws.amazon.com/pdfs/vpc/latest/userguide/vpc-ug.pdf#what-is-amazon-vpc (accessed Apr. 6, 2023).
AWS. "AWS glossary" AWS General Reference Guide. Retrieved from https://docs.aws.amazon.com/general/latest/gr/glos-chap.html (accessed Apr. 6, 2023).
AWS. "Copy a snapshot" Amazon Elastic Compute Cloud. Retrieved from https://docs.aws.amazon.com/AWSEC2/latest/UserGuide/ebs-copy-snapshot.html#ebs-snapshot-copy (accessed Apr. 6, 2023).
AWS. "CopySnapshot" Amazon Elastic Compute Cloud. Retrieved from https://docs.aws.amazon.com/AWSEC2/latest/APIReference/API_CopySnapshot.html (accessed Apr. 6, 2023).
AWS. "CreateDBInstanceReadReplica" Amazon Relational Database Service. Retrieved from https://docs.aws.amazon.com/AmazonRDS/latest/APIReference/API_CreateDBInstanceReadReplica.html (accessed Apr. 25, 2023).
AWS. "Introducing Five New Amazon EC2 Bare Metal Instances" Amazon Web Services. Feb. 13, 2019. Retrieved from https://aws.amazon.com/about-aws/whats-new/2019/02/introducing-five-new-amazon-ec2-bare-metal-instances/ (accessed Apr. 6, 2023).
AWS. "Kubernetes on AWS" Amazon Web Services. Retrieved from https://aws.amazon.com/kubernetes/#:~:text=Kubernetes%20manages%20clusters%20of%20Amazon,premises%20and%20in%20the%20cloud (accessed Apr. 6, 2023).
AWS. "Storage" Amazon Elastic Compute Cloud. Retrieved from https://docs.aws.amazon.com/AWSEC2/latest/WindowsGuide/Storage.html (accessed Apr. 6, 2023).
AWS. "Use EBS direct APIs to access the contents of an EBS snapshot" Amazon Elastic Compute Cloud. Retrieved from https://docs.aws.amazon.com/AWSEC2/latest/UserGuide/ebs-accessing-snapshot.html (accessed Apr. 6, 2023).
AWS. "User Guide for Linux Instances" Amazon Elastic Compute Cloud. 2023. Retrieved from https://docs.aws.amazon.com/pdfs/AWSEC2/latest/UserGuide/ec2-ug.pdf#ebs-accessing-snapshot (accessed Apr. 6, 2023).
AWS. "What Is An Instance In Cloud Computing?" Amazon Web Services. Retrieved from https://aws.amazon.com/what-is/cloud-instances/#:~:text=You%20can%20run%20multiple%20virtual,of%20sharing%20and%20scaling%20resources (accessed Apr. 6, 2023).
AWS. "Working with DB instance read replicas" Amazon Relational Database Service. Retrieved from https://docs.aws.amazon.com/AmazonRDS/latest/UserGuide/USER_ReadRepl.html (accessed Apr. 25, 2023).
AWS. "Working with read replicas for Microsoft SQL Server in Amazon RDS" Amazon Relational Database Service. Retrieved from https://docs.aws.amazon.com/AmazonRDS/latest/UserGuide/SQLServer.ReadReplicas.html (accessed Apr. 25, 2023).
Banthia, Bakul. "Can I share snapshots with specific users?" Tessell. Retrieved from https://help.tessell.com/en/articles/7118615-can-i-share-snapshots-with-specific-users (accessed Apr. 6, 2023).
Banthia, Bakul. "Do I need to enable snapshots for my database service or is it done automatically?" Tessell. Retrieved from https://help.tessell.com/en/articles/7118606-do-i-need-to-enable-snapshots-for-my-database-service-or-is-it-done-automatically (accessed Apr. 6, 2023).
Banthia, Bakul. "How can I perform cross-region snapshots and point-in-time-restore (PITR) for my disaster recovery needs?" Tessell. Retrieved from https://help.tessell.com/en/articles/6614103-how-can-i-perform-cross-region-snapshots-and-point-in-time-restore-pitr-for-my-disaster-recovery-needs (accessed Apr. 6, 2023).
Banthia, Bakul. "How do I provision a database service?" Tessell. Retrieved from https://help.tessell.com/en/articles/7118590-how-do-i-provision-a-database-service (accessed Apr. 6, 2023).
Banthia, Bakul. "How does billing work in Tessell?" Tessell. Retrieved from https://help.tessell.com/en/articles/6624926-how-does-billing-work-in-tessell (accessed Apr. 6, 2023).
Banthia, Bakul. "How does Tessell guarantee Zero Data Loss for Oracle?" Tessell. Retrieved from https://help.tessell.com/en/articles/7118627-how-does-tessell-guarantee-zero-data-loss-for-oracle (accessed Apr. 6, 2023).
Banthia, Bakul. "How does Tessell host Oracle databases on Azure?" Tessell. Retrieved from https://help.tessell.com/en/articles/7118621-how-does-tessell-host-oracle-databases-on-azure (accessed Apr. 6, 2023).
Banthia, Bakul. "Manage Data on Your Multi-tenant SaaS Environment with Tessell" Tessell. Feb. 25, 2023. Retrieved from https://tessell.com/blogs/manage-multi-tenant-saas-metadata (accessed May 9, 2023).
Banthia, Bakul. "Snapshots" Tessell. Retrieved from https://help.tessell.com/en/collections/3899147-snapshots (accessed Apr. 6, 2023).
Banthia, Bakul. "What are all the Apps in Tessell?" Tessell. Retrieved from https://help.tessell.com/en/articles/7118551-what-are-all-the-apps-in-tessell (accessed Apr. 6, 2023).
Banthia, Bakul. "What is an Availability Machine?" Tessell. Retrieved from https://help.tessell.com/en/articles/7118549-what-is-an-availability-machine (accessed Apr. 6, 2023).
Banthia, Bakul. "What is Tessell and how does it work?" Tessell. Retrieved from https://help.tessell.com/en/articles/7118534-what-is-tessell-and-how-does-it-work (accessed Apr. 6, 2023).
Banthia, Bakul. "What is Tessell's security posture?" Tessell. Retrieved from https://help.tessell.com/en/articles/6624923-what-is-tessell-s-security-posture (accessed Apr. 25, 2023).
Banthia, Bakul. "What is Tessell's unified data management?" Tessell. Retrieved from https://help.tessell.com/en/articles/6624933-what-is-tessell-s-unified-data-management (accessed Apr. 6, 2023).
Banthia, Bakul. "What is the patch set composition of DB engine version for Oracle?" Tessell. Retrieved from https://help.tessell.com/en/articles/6614079-what-is-the-patch-set-composition-of-db-engine-version-for-oracle (accessed Apr. 6, 2023).
Banthia, Bakul. "Where are my automated snapshots stored and how do I manage their retention?" Tessell. Retrieved from https://help.tessell.com/en/articles/7118607-where-are-my-automated-snapshots-stored-and-how-do-i-manage-their-retention (accessed Apr. 6, 2023).

(56) References Cited

OTHER PUBLICATIONS

Banthia, Bakul. "Where are the databases hosted in Tessell?" Tessell. Retrieved from https://help.tessell.com/en/articles/6624929-where-are-the-databases-hosted-in-tessell (accessed Apr. 6, 2023).
Banthia, Bakul. "Why choose Tessell for your startup?" Tessell. Mar. 24, 2023. Retrieved https://tessell.com/blogs/why-tessell-for-startups (accessed May 9, 2023).
Flexera. "How can I copy an EBS snapshot between different EC2 regions?" Flexera CMP Docs. Retrieved from https://docs.rightscale.com/faq/clouds/aws/How_can_I_copy_an_EBS_snapshot_between_different_EC2_regions.html (accessed Apr. 6, 2023).
Hashicorp Terraform. "tessell_dap (Data Source)" tessell. Retrieved from https://registry.terraform.io/providers/TessellDevelopment/tessell/latest/docs/data-sources/dap#nestedatt--target_cloud_locations (accessed Apr. 6, 2023).
Hashicorp Terraform. "tessell_database_backup (Resource)" tessell. Retrieved from https://registry.terraform.io/providers/TessellDevelopment/tessell/latest/docs/resources/database_backup (accessed Apr. 6, 2023).
Hashicorp Terraform. "tessell_db_service (Resource)" tessell. Retrieved from https://registry.terraform.io/providers/tessell-cloud/tessell/latest/docs/resources/db_service#snapshot_configuration (accessed Apr. 6, 2023).
Kaplan, Steve. "The Tessellator Crunches Cloud Costs" Tessellator Book 1. 2022. Retrieved from https://tessell.com/documents/Tessellator%20Book%201.pdf (accessed Apr. 6, 2023).
Kaplan, Steven. "Bringing the Art and Science of Tessellation to Data" Tessell. Feb. 20, 2023. Retrieved from https://tessell.com/blogs/tessellation-of-data (accessed May 9, 2023).
Kaplan, Steven. "The Tessell Alternative to Oracle Database Services for Microsoft Azure" Tessell. Feb. 15, 2023. Retrieved from https://tessell.com/blogs/the-tessell-alternative-to-oracle-dbaas-on-azure (accessed May 9, 2023).
Kaplan, Steven. "The Why and How of Cloud Databases . . . and how Tessell changes the game" Tessell. Jan. 24, 2023. Retrieved from https://tessell.com/blogs/the-why-and-how-of-cloud-databases (accessed May 9, 2023).
Khanuja, Kamaldeep. "Benchmark Tessell RDS PostgreSQL performance using PGIO (SLOB)" Tessell. Mar. 1, 2023. Retrieved from https://tessell.com/blogs/postgresql-benchmark (accessed May 9, 2023).
Khanuja, Kamaldeep. "Tessell supports AWS PrivateLink" Tessell. Jan. 11, 2023. Retrieved from https://tessell.com/blogs/aws-tessell-privatelink (accessed Apr. 25, 2023).
Khanuja, Kamaldeep. "Tessell supports AWS PrivateLink" Tessell. Jan. 11, 2023. Retrieved from https://tessell.com/blogs/aws-tessell-privatelink (accessed May 9, 2023).
Krishnia, Rajesh. "Fully Managed Oracle Database Service on Azure with Tessell" Tessell. Mar. 5, 2023. Retrieved from https://tessell.com/blogs/azure-tessell-oracle-dbaas (accessed May 9, 2023).
Kuchibhotla, Bala. "Tessell's journey: How and why it all started?" Tessell. Mar. 24, 2023. Retrieved from https://tessell.com/blogs/why-tessell (accessed May 9, 2023).
Kuchibhotla, Bala. "Why choose Tessell for your enterprise?" Tessell. Mar. 24, 2023. Retrieved from https://tessell.com/blogs/why-tessell-for-enterprises (accessed May 9, 2023).
Kumar, Sandip. "Benchmark Tessell RDS Oracle performance using SLOB" Tessell. Apr. 13, 2023. Retrieved from https://tessell.com/blogs/oracle-benchmark (accessed May 9, 2023).
Microsoft. "Basic Always On availability groups for a single database" SQL Server. Mar. 3, 2023. Retrieved from https://learn.microsoft.com/en-us/sql/database-engine/availability-groups/windows/basic-availability-groups-always-on-availability-groups?view=sql-server-ver16 (accessed Apr. 25, 2023).
Microsoft. "What is BareMetal Infrastructure on Azure?" BareMetal Infrastructure. Apr. 10, 2023. Retrieved from https://learn.microsoft.com/en-us/azure/baremetal-infrastructure/concepts-baremetal-infrastructure-overview (accessed Apr. 20, 2023).
Mitchell, Cal. "Migrating On Prem SQL Server To Multi Cloud With Tessell" SQLpipe. Feb. 18, 2023. Retrieved from https://www.sqlpipe.com/blog/migrating-on-prem-sql-server-to-multi-cloud-with-tessell (accessed Apr. 6, 2023).
MP4 Video screenshots for Tessell. "Backups" Tessell. Retrieved from https://tessell.com/videos/Backups.mp4 (accessed Apr. 25, 2023).
MP4 Video screenshots for Tessell. "DataFlow" Tessell. Retrieved from https://tessell.com/videos/DataFlow.mp4 (accessed Apr. 25, 2023).
Parikh, Priyank. "Benchmark Tessell RDS MySQL performance using Sysbench" Tessell. Apr. 19, 2023. Retrieved from https://tessell.com/blogs/mysql-benchmark (accessed May 9, 2023).
Pillai, Animesh. "High-performance data infrastructure for the cloud era" Tessell. Retrieved from https://app.hubspot.com/documents/20843544/view/494538972?accessId=b713c0 (accessed Apr. 13, 2023).
Rawat, Maneesh. "Nitro Boost your PostgreSQL Workloads" PGConf India. Feb. 23, 2023. Retrieved from https://pgconf.in/conferences/pgconfin2023/program/proposals/356 (accessed Apr. 6, 2023).
Sandbu, Marius. "Tessell—A new way to provide DBaaS in Public Cloud" Marius Sandbu Tech Ramblings. Nov. 1, 2022. Retrieved from https://msandbu.org/tessell-a-new-way-to-provide-dbaas-in-public-cloud/ (accessed Apr. 6, 2023).
Tessell. "Announcing SOC 2 Type I Certification for Tessell" Tessell. Mar. 31, 2023. Retrieved from https://tessell.com/blogs/tessell-soc2-type1 (accessed May 9, 2023).
Tessell. "Azure Tessell for Oracle" Microsoft. Retrieved from https://azuremarketplace.microsoft.com/en-us/marketplace/apps/tessellinc1655919615020.tessell_database_service?ocid=GTMRewards_WhatsNewBlog_healthcareazurecloudsecurityassessment_Vol160&tab=Overview (accessed Apr. 6, 2023).
Tessell. "Cloud Databases. Done Right. At Scale." Tessell. Retrieved from https://tessell.com/ (accessed Apr. 6, 2023).
Tessell. "Differentiated Infrastructure. Delightful Management." Tessell. Retrieved from https://query.prod.cms.rt.microsoft.com/cms/api/am/binary/RW13XNT (accessed Apr. 6, 2023).
Tessell. "It's official: Tessell's DBaaS is Co-Sell Ready with Microsoft Azure" Tessell. Mar. 10, 2023. Retrieved from https://tessell.com/blogs/azure-tessell-ip-co-sell (accessed May 9, 2023).
Tessell. "Migrating a #SQLServer #database to a multi-cloud environment poses many challenges." Twitter. Retrieved from https://twitter.com/tessell/status/1631039267672674304 (accessed Apr. 20, 2023).
Tessell. "Multi-AZ High Availability for Oracle Standard Edition 2" Tessell. Retrieved from https://query.prod.cms.rt.microsoft.com/cms/api/am/binary/RW10vv8 (accessed Apr. 13, 2023).
Tessell. "Multi-AZ High Availability for Oracle Standard Edition 2" Tessell. Retrieved from https://query.prod.cms.rt.microsoft.com/cms/api/am/binary/RW13XNV (accessed Apr. 6, 2023).
Tessell. "Plans & Pricing" Tessell. Retrieved from https://tessell.com/pricing?show=service (accessed Apr. 6, 2023).
Tessell. "Pricing Guide" Tessell. Retrieved from https://tessell.com/pricing/guide?engine=PostgreSQL&cloud=AWS&workload=HighPerformance&deploymentOption=Professional&workflow=self (accessed Apr. 6, 2023).
Tessell. "Product Help, FAQs, Knowledge Base, and more . . . " Tessell. Retrieved from https://help.tessell.com/en/ (accessed Apr. 6, 2023).
Tessell. "Product Overview" AWS Marketplace. Retrieved from https://aws.amazon.com/marketplace/pp/prodview-h2caqujt4pp3q (accessed Apr. 6, 2023).
Tessell. "Tessell Blogs" Tessell. Retrieved from https://tessell.com/blogs (accessed May 9, 2023).
Tessell. "Tessell Database as a Service" AWS Marketplace. Retrieved from https://aws.amazon.com/marketplace/seller-profile?id=37c6e91e-5c34-43b2-b938-91ac9f9b9a73 (accessed Apr. 6, 2023).
Tessell. "Tessell for Enterprises" Tessell. Retrieved from https://tessell.com/platform/enterprises (accessed Apr. 6, 2023).
Tessell. "Tessell for MySQL" Tessell. Retrieved from https://tessell.com/services/mysql (accessed Apr. 6, 2023).
Tessell. "Tessell for Oracle" Tessell. Retrieved from https://tessell.com/services/oracle (accessed Apr. 6, 2023).

(56) References Cited

OTHER PUBLICATIONS

Tessell. "Tessell for PostgreSQL" Tessell. Retrieved from https://tessell.com/services/postgresql (accessed Apr. 6, 2023).
Tessell. "Tessell for SQL Server" Tessell. Retrieved from https://tessell.com/services/sqlserver (accessed Apr. 6, 2023).
Tessell. "Tessell for Startups" Tessell. Retrieved from https://tessell.com/platform/developers (accessed Apr. 6, 2023).
Tessell. "Tessell" Twitter. Retrieved from https://twitter.com/tessell (accessed Apr. 20, 2023).
Tessell. "Tessell" YouTube. Retrieved from https://www.youtube.com/channel/UCMSdbKchVXPIEreaRbW-fLw?app=desktop (accessed Apr. 6, 2023).
Tessell. "The Tessell platform provides unparalleled security for your data and users" Tessell Data Transform Enterprise. Retrieved from https://query.prod.cms.rt.microsoft.com/cms/api/am/binary/RE50pqt (accessed Apr. 13, 2023).
Tessell. "The Tessell platform provides unparalleled security for your data and users" Tessell. Retrieved from https://query.prod.cms.rt.microsoft.com/cms/api/am/binary/RW13XNU (accessed Apr. 6, 2023).
Tessell. "We take care of your data infrastructure and data management needs" Tessell. Retrieved from https://www.tessell.com/about-us (accessed Apr. 6, 2023).
Twitter Video screenshots for Tessell. "Tessell's delightful data management . . . " Twitter. Apr. 19, 2023. https://twitter.com/tessell/status/1648775051980816385 [twitter.com].
YouTube Video screenshots for Tessell. "Eliminate IOPS metering for your cloud data infrastructure" YouTube. Oct. 20, 2022. https://www.youtube.com/watch?v=Puk0fQ43PmA [youtube.com].
YouTube Video screenshots for Tessell. "Tessell DBaaS on your choice of cloud at your terms" YouTube. Sep. 14, 2022. https://www.youtube.com/watch?v=sfWo0KyT1Do [youtube.com].
YouTube Video screenshots for Tessell. "Tessell. Choice. Power to you." YouTube. Mar. 6, 2023. https://www.youtube.com/watch?v=4DduLUdikRY [youtube.com].
YouTube Video screenshots for Tessell. "Why Tessell?" YouTube. Jan. 15, 2023. https://www.youtube.com/watch?v=JSOPhTgwrXI [youtube.com].
"About Snapshots and Clones", Administering Oracle Java Cloud Service, https://docs.oracle.com/en/cloud/paas/java-cloud/jscag/snapshots-and-clones1.html#GUID-28871F48-A458-41C1-86F8-566ED842C3D5.
"Cloning a volume for an Amazon Aurora DB cluster", https://docs.aws.amazon.com/AmazonRDS/latest/AuroraUserGuide/Aurora.Managing.Clone.html.
"Dell PS Series Snapshots and Clones: Best Practices and Sizing Guidelines", Dell Storage Engineering, Nov. 2019, https://dl.dell.com/manuals/common/ps-series-snapshots-clones-bp1027_en-us.pdf.
"Enterprise Manager Cloud Administration Guide", Oracle Help Center, 2024, https://docs.oracle.com/cd/E24628_01/doc.121/e28814/cloud_db_clonesnap.htm#CEGCJCBC.
"Protecting Microsoft SQL Server with Rubrik", Rubrik Technical Marketing, Sep. 2023, https://www.rubrik.com/content/dam/rubrik/en/resources/white-paper/rwp-protecting-microsoft-sql-server-with-rubrik.pdf.
Maruthachalam, et al., "A Distributed System Design for Next Generation Storage and Remote Replication", 2014, https://ieeexplore.ieee.org/abstract/document/6814686.
Affidavit of Nathaniel E Frank-White, Aug. 10, 2024.
Expedia, Preferred Class Drop Down, www.expedia.com/.
Foreign Action other than Search Report on PCT DTD Jan. 2, 2025.
McGraw-Hill Dictionary of Scientific and Technical Terms, recoil milking—recovery system, pp. 4, 6th edition.
MySQL, "Supported Platforms: MySQL Database", https://web.archive.org/web/20181106221826/https://www.mysql.com/support/supportedplatforms/database.html.
New Oxford American Dictionary, Third Edition, "authorized—avail", 4 pages, 2010.
*Nutanix* v. *Tessell*, "Civil Docket for Case 3:24-cv-01729-AMO".
*Nutanix* v. *Tessell*, "Order Setting initial Case Management Conference and ADR Deadlines", Northern District of California, Mar. 20, 2024.
*Tessell* v. *Nutanix* IPR Power of Attorney.
*Tessell* v. *Nutanix*, IPR2025-00322, Dec. 18, 2024, pp. 7.
"Creating Instances," Google Cloud ("Google") (Wayback Machine Capture, Sep. 18, 2018), available at https://www.archive.org/web/20180918103721/https://cloud.google.com/sql/docs/mysql/create-instance (1 of 3).
“Nutanix Era: Databases Made Simple, ” as archived by the Internet Archive on Sep. 26, 2020, available at http://web.archive.org/web/20200926222827/https://www.nutanix.com/blog/nutanix-era-databases-made-simple ( 2 of 3).
“Taking a Backup Using Snapshots” (“LVM-Howto”) (Wayback Machine Capture, Jan. 20, 2007), available at https://web.archive.org/web/20070120200004/https://tldp.org/HOWTO/LVM-HOWTO/snapshots_backup.html (3 of 3).
“Windows Geo-Clustering: SQL Server,” published Oct. 12, 2014.
7 more ways to Query Always on Availability Groups, as archived by the Internet Archive on Mar. 30, 2019, available at https://web.archive.org/web/20190330182441/https://sqlundercover.com/2019/02/19/7-more-ways-to-query-always-on-availability-groups/.
Amazon Relational Database Service User Guide (2016) (“RDS ”) (Wayback Machine Capture, Apr. 12, 2016), available at https://web.archive.org/web/20160412105355/http://docs.aws.amazon.com/AmazonRDS/latest/UserGuide/rds-ug.pdf.
Federal Court Management Statistics–Profiles, U.S. District Courts𠄼ombined Civil and Criminal (Dec. 2024).
Order Granting Defendant’s Motion to Compel Arbitration (staying the remaining claims) in *Nutanix, Inc.* v. *Tessell, Inc.*, Case No. 3:24-cv-01729 (N.D. Cal. Mar. 20, 2024).
SQL Server AlwaysOn Availability Group Backup Preference Setting, as archived by the Internet Archive on Sep. 25, 2020, available at https://www.mssqltips.com/sqlservertip/4976/sql-server-alwayson-availability-group-backup-preference-setting/.
The American Heritage Dictionary of the English Language (5th ed. 2011) ("Heritage").
Use the Availability Group Wizard (SQL Server Management Studio), as archived by the Interne Archive on Jan. 20, 2020, available at https://web.archive.org/web/20200120100053/https://docs.microsoft.com/en-us/sql/database-engine/availability-groups/windows/use-the-availability-group-wizard-sql-server-management-studio?view=sql-server-ver15.
Using Oracle Database Cloud Service – Creating a Database Deployment (2017) (“Oracle”) (Wayback Machine Capture, Jan. 18, 2017), available at https://web.archive.org/web/20170118071307/https://docs.oracle.com/en/cloud/paas/database-dbaascloud/csdbi/create-db-deployment.html.
BackupAssist, "https://secure.backupassist.com/support/en/backupassist/manage/calendar.htm"; "https://secure.backupassist.com/support/en/references/backup-schedules.htm", Jul. 1, 2017 (Year: 2017).
Oracle, "https://web.archive.org/web/20170829005212/https://docs.oracle.com/cd/E24628_01lem.121/e27046/cloning_database.htm#EMLCM93230", Aug. 29, 2017 (Year: 2017).
Google, Creating Instances, Cloud SQL for MySQL, pp. 1-5.
Taking a Backup Using Snapshots, LVM HOWTO, Chapter 13 Recipes.
Enterprise Manager Lifecycle Management Administrator's Guide, "14 Cloning Oracle Databases and Pluggable Databases", https://web.archive.org/web/20170829005212/https://docs.oracle.com/cd/E24628_01/em.121/e27046/cloning_database.htm#EMLCM93230, 2017, Oracle.
Oracle®, "Oracle® Enterprise Manager Cloud Administration Guide 120 Release 5 (12.1.0.5)E28814-19", Dec. 2015 (Year: 2015).
"Recommended Practice for Patch Management of Control Systems", Steven Tom, Idaho National Laboratory, Dec. 2008, Cybersecurity Infrastructure Security Agency (CISA), US. Department of Homeland Security (Year: 2008).
High availability software—Wikipedia (Year: 2016).
"Database Management Revolutionized by AI", OCI, https://www.oracle.com/artificial-intelligence/transform-database-management-with-ai/, Oct. 16, 2025.

(56) References Cited

OTHER PUBLICATIONS

"AI agents in Azure Cosmos DB", https://learn.microsoft.com/en-US/azure/cosmos-db/ai-agents, Mar. 9, 2025.
"MCP: Transform Database Admin Tasks with LLMs" https://builder.aws.com/content/2umKOtgxiPzrAf0RzQOdnFhGedg/mcp-transform-database- admin-tasks-with-llms, Jun. 8, 2025.
"Oracle Autonomous Database", White Paper Series, 13 pages, Sep. 2018.
"What are the future trends in DBMS technology? Advances in data and systems have led to the following advances in DBMS technology. ", https://aws.amazon.com/what-is/dbms/, Oct. 16, 2025.
Garg, "Neon: The Serverless PostgreSQL Platform Built for AI Agents", Gocodeo, Jun. 16, 2025, https://www.gocodeo.com/post/neon-the-serverless-postgresql-platform-built-for-ai-agents.
Marodia, Democratizing database observability with AI-assisted troubleshooting, https://cloud.google.com/blog/products/databases/inside-ai-assisted-troubleshooting-for-databases, May 13, 2025.
Oracle, "Oracle Autonomous Database Technical Overview", Version [2.1], 20 page, Jul. 2020.
"An SQL Server DBA’s Guide to Actifio GO", https://docs.actifio.com/static/Actifio-GO/PDFs/DBA_SQLServer.pdf, 2001.
M. A. Murphy, M. Fenn, L. Abraham, J. A. Canter, B. T. Sterrett and S. Goasguen, "Distributed management of virtual cluster infrastructures," 2009 IEEE International Symposium on Parallel & Distributed Processing, Rome, Italy, 2009, pp. 1-8 (Year: 2009).

* cited by examiner

FIG. 3
300
310
Organization 1
Tenant 1 (Account for Dept X)
312
Tenant 2
314
Tenant 3
316
320
Organization 2
Tenant 4
322
Tenant 5
324
330
Organization 3
Tenant 6
326

400

500

600

MULTI-TENANCY IN DATABASE-AS-A-SERVICE

CROSS-REFERENCE TO RELATED APPLICATIONS

This application is a non-provisional of U.S. Provisional Application No. 63/353,205, filed Jun. 17, 2022, the entirety of which is incorporated by reference herein.

BACKGROUND

Database as a service (DBaaS) products allow users to utilize the functionality of a database without requiring the users to supply servers on which to host the database. A host of a DBaas product may provide servers on which user databases are hosted. Database management software may facilitate use and maintenance of database servers.

SUMMARY

Aspects of the present disclosure are directed to a system including a memory having computer-readable instructions stored thereon and a processor that executes the computer-readable instructions to receive, from a user, a first login credential associated with an organization on a database management service, wherein the organization is associated with a first cloud account associated with a first tenancy of a first cloud and a second cloud account associated with a second tenancy of a second cloud, wherein the organization defines an account access privilege for the first cloud account and the second cloud account, the first tenancy defines a first database access privilege for a first database on the first cloud, and the second tenancy defines a second database access privilege for a second database on the second cloud, receive, from the user, a selection of the first cloud account, retrieve a second login credential for the first cloud account based on the selection, automatically log in to the first cloud account using the second login credential, receive, from the user, input to perform an operation on data in the first database on the first cloud, and transmit, to the first cloud, using the second login credential for the first cloud account, a signal to perform the operation based on the input.

In some embodiments, the processor further executes the computer-readable instructions to receive, from the user, a selection of the second cloud account, and deny access to the user to the second cloud account based on a project associated with the user, wherein the project defines a project access privilege for the first cloud account but not the second cloud account.

In some embodiments, the processor further executes the computer-readable instructions to receive, from the user, a selection of the first database corresponding to the first tenancy, grant access to the user to the first database, receive, from the user, a selection of a third database corresponding to the first tenancy, and deny access to the user to the third database based on a user role, wherein the user role grants access to the first database but not the third database.

In some embodiments, the database management service is configured to manage database operations of the first database on the first cloud corresponding to the first tenancy and manage operations of the second database on the second cloud corresponding to the second tenancy.

In some embodiments, the processor further executes the computer-readable instructions to create, on the first cloud, using the second login credential, the first tenancy, and provision, on the first cloud, within the first tenancy, the first database on the first cloud.

The system of claim 1, wherein the processor further executes the computer-readable instructions to associate each row of the first database on the first cloud with the first tenancy, and associate each row of the second database on the second cloud with the second tenancy.

In some embodiments, the processor further executes the computer-readable instructions to receive a request from the user to view a row from the first database on the first cloud, wherein the request is not associated with the first tenancy, and deny the request based on the request not being associated with the first tenancy.

In some embodiments, the processor further executes the computer-readable instructions to calculate a first billing amount for the organization based on usage information associated with the first tenancy, and calculate a second billing amount for the organization based on usage information associated with the second tenancy.

In some embodiments, the processor further executes the computer-readable instructions to associate the user with the second tenancy, receive, from the user, a selection of the second tenancy, receive, from the user, a request associated with a second tenancy context, and grant access to the user to the second database on the second cloud based on the second tenancy context.

In some embodiments, the processor further executes the computer-readable instructions to receive, from the user, a subscription request, generate, in response to the subscription request, a third tenancy, and generate a tenant admin role for the third tenancy for the user.

Aspects of the disclosure are directed to a non-transitory, computer-readable medium including instructions which, when executed by a processor, cause the processor to receive, from a user, a first login credential associated with an organization on a database management service, wherein the organization is associated with a first cloud account associated with a first tenancy of a first cloud and a second cloud account associated with a second tenancy of a second cloud, wherein the organization defines an account access privilege for the first cloud account and the second cloud account, the first tenancy defines a first database access privilege for a first database on the first cloud, and the second tenancy defines a second database access privilege for a second database on the second cloud, receive, from the user, a selection of the first cloud account, retrieve a second login credential for the first cloud account based on the selection, automatically log in to the first cloud account using the second login credential, receive, from the user, input to perform an operation on data in the first database on the first cloud, and transmit, to the first cloud, using the second login credential for the first cloud account, a signal to perform the operation based on the input.

In some embodiments, the instructions further cause the processor to receive, from the user, a selection of the second cloud account, and deny access to the user to the second cloud account based on a project associated with the user, wherein the project defines a project access privilege for the first cloud account but not the second cloud account.

In some embodiments, the instructions further cause the processor to receive, from the user, a selection of the first database corresponding to the first tenancy, grant access to the user to the first database, receive, from the user, a selection of a third database corresponding to the first tenancy, and deny access to the user to the third database based on a user role, wherein the user role grants access to the first database but not the third database.

In some embodiments, the database management service is configured to manage database operations of the first database on the first cloud corresponding to the first tenancy and manage operations of the second database on the second cloud corresponding to the second tenancy.

In some embodiments, the instructions further cause the processor to create, on the first cloud, using the second login credential, the first tenancy, and provision, on the first cloud, within the first tenancy, the first database on the first cloud.

In some embodiments, the instructions further cause the processor to associate each row of the first database on the first cloud with the first tenancy and associate each row of the second database on the second cloud with the second tenancy.

In some embodiments, the instructions further cause the processor to receive a request from the user to view a row from the first database on the first cloud, wherein the request is not associated with the first tenancy, and deny the request based on the request not being associated with the first tenancy.

In some embodiments, the instructions further cause the processor to calculate a first billing amount for the organization based on usage information associated with the first tenancy, and calculate a second billing amount for the organization based on usage information associated with the second tenancy.

In some embodiments, the instructions further cause the processor to associate the user with the second tenancy, receive, from the user, a selection of the second tenancy, receive, from the user, a request associated with a second tenancy context, and grant access to the user to the second database on the second cloud based on the second tenancy context.

In some embodiments, the instructions further cause the processor to receive, from the user, a subscription request, generate, in response to the subscription request, a third tenancy, and generate a tenant admin role for the third tenancy for the user.

Figure 1:
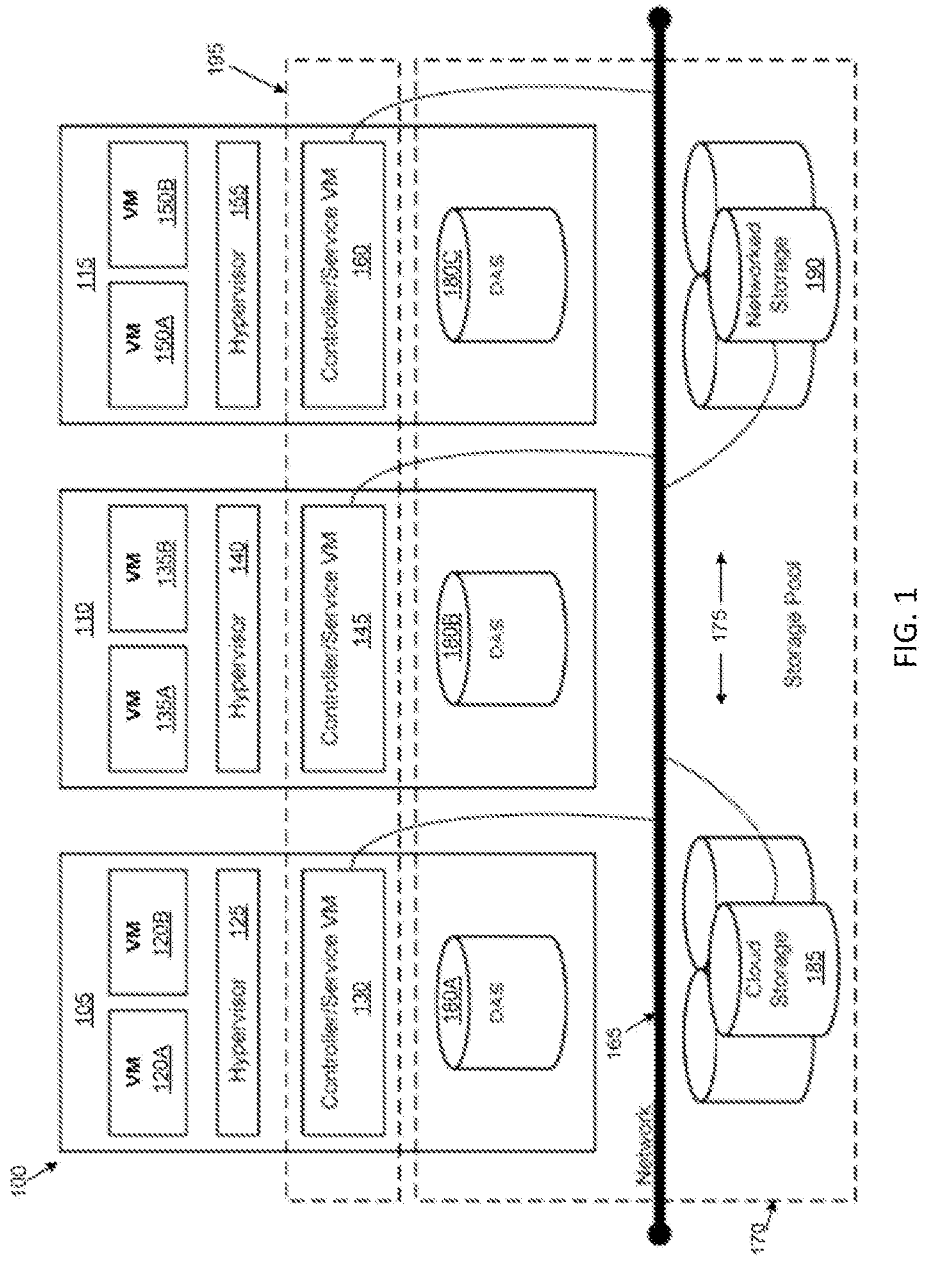
FIG. 1 is an example block diagram of a cluster of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Referring now to FIG. 1, a cluster 100 of a virtual computing system is shown, in accordance with some embodiments of the present disclosure. The cluster 100 includes a plurality of nodes, such as a first node 105, a second node 110, and a third node 115. Each of the first node 105, the second node 110, and the third node 115 may also be referred to as a "host" or "host machine." The first node 105 includes database virtual machines ("database VMs") 120A and 120B (collectively referred to herein as "database VMs 120"), a hypervisor 125 configured to create and run the database VMs, and a controller/service VM 130 configured to manage, route, and otherwise handle workflow requests between the various nodes of the cluster 100. Similarly, the second node 110 includes database VMs 135A and 135B (collectively referred to herein as "database VMs 135"), a hypervisor 140, and a controller/service VM 145, and the third node 115 includes database VMs 150A and 150B (collectively referred to herein as "database VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165. Further, although not shown, one or more of the first node 105, the second node 110, and the third node 115 may include one or more containers managed by a monitor (e.g., container engine).

The cluster 100 also includes and/or is associated with a storage pool 170 (also referred to herein as storage subsystem). The storage pool 170 may include network-attached storage 175 and direct-attached storage 180A, 180B, and 180C. The network-attached storage 175 is accessible via the network 165 and, in some embodiments, may include cloud storage 185, as well as a networked storage 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be provided within the cluster. Likewise, although only two database VMs (e.g., the database VMs 120, the database VMs 135, the database VMs 150) are shown on each of the first node 105, the second node 110, and the third node 115, in other embodiments, the number of the database VMs on each of the first, second, and third nodes may vary to include other numbers of database VMs. Further, the first node 105, the second node 110, and the third node 115 may have the same number of database VMs (e.g., the database VMs 120, the database VMs 135, the database VMs 150) or different number of database VMs.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the cluster 100. In some embodiments, the cluster 100 may be part of a data center. Further, one or more of the first node 105, the second node 110, and the third node 115 may be organized in a variety of network topologies. Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. In some embodiments, the processing units may execute instructions without first copying the instructions to the RAM. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices that are suitable for a virtual computing system. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the networked storage 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the database VMs 120, the database VMs 135, and the database VMs 150.

Each of the database VMs 120, the database VMs 135, the database VMs 150 is a software-based implementation of a computing machine. The database VMs 120, the database VMs 135, the database VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the database VMs 120, the database VMs 135, the database VMs 150 that may run its own operating system and applications on the underlying physical resources just like a real computer. By encapsulating an entire machine, including CPU, memory, operating system, storage devices, and network devices, the database VMs 120, the database VMs 135, the database VMs 150 are compatible with most standard operating systems (e.g. Windows, Linux, etc.), applications, and device drivers.

Thus, each of the hypervisor 125, the hypervisor 140, and the hypervisor 155 is a virtual machine monitor that allows a single physical server computer (e.g., the first node 105, the second node 110, third node 115) to run multiple instances of the database VMs 120, the database VMs 135, and the database VMs 150 with each VM sharing the resources of that one physical server computer, potentially across multiple environments. For example, each of the hypervisor 125, the hypervisor 140, and the hypervisor 155 may allocate memory and other resources to the underlying VMs (e.g., the database VMs 120, the database VMs 135, the database VM 150A, and the database VM 150B) from the storage pool 170 to perform one or more functions.

By running the database VMs 120, the database VMs 135, and the database VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new database VMs are created (e.g., installed) on the first node 105, the second node 110, and the third node 115, each of the new database VMs may be configured to be associated with certain hardware resources, software resources, storage resources, and other resources within the cluster 100 to allow those virtual VMs to operate as intended.

The database VMs 120, the database VMs 135, the database VMs 150, and any newly created instances of the database VMs may be controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may be considered a local management system configured to manage various tasks and operations within the cluster 100. For example, in some embodiments, the local management system may perform various management related tasks on the database VMs 120, the database VMs 135, and the database VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the database VMs 120, the database VMs 135, the database VM 150A, and the database VM 150B, respectively, and for managing the interactions between those VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications. The network 165 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 105, the second node 110, or the third node 115 may be configured as a leader node. The leader node may be configured to monitor and handle requests from other nodes in the cluster 100. For example, a particular database VM (e.g., the database VMs 120, the database VMs 135, or the database VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 100 to fulfil that request). Upon fulfilling the input/output request, the controller/service VM of the leader node may send a response back to the controller/service VM of the node from which the request was received, which in turn may pass the response to the database VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
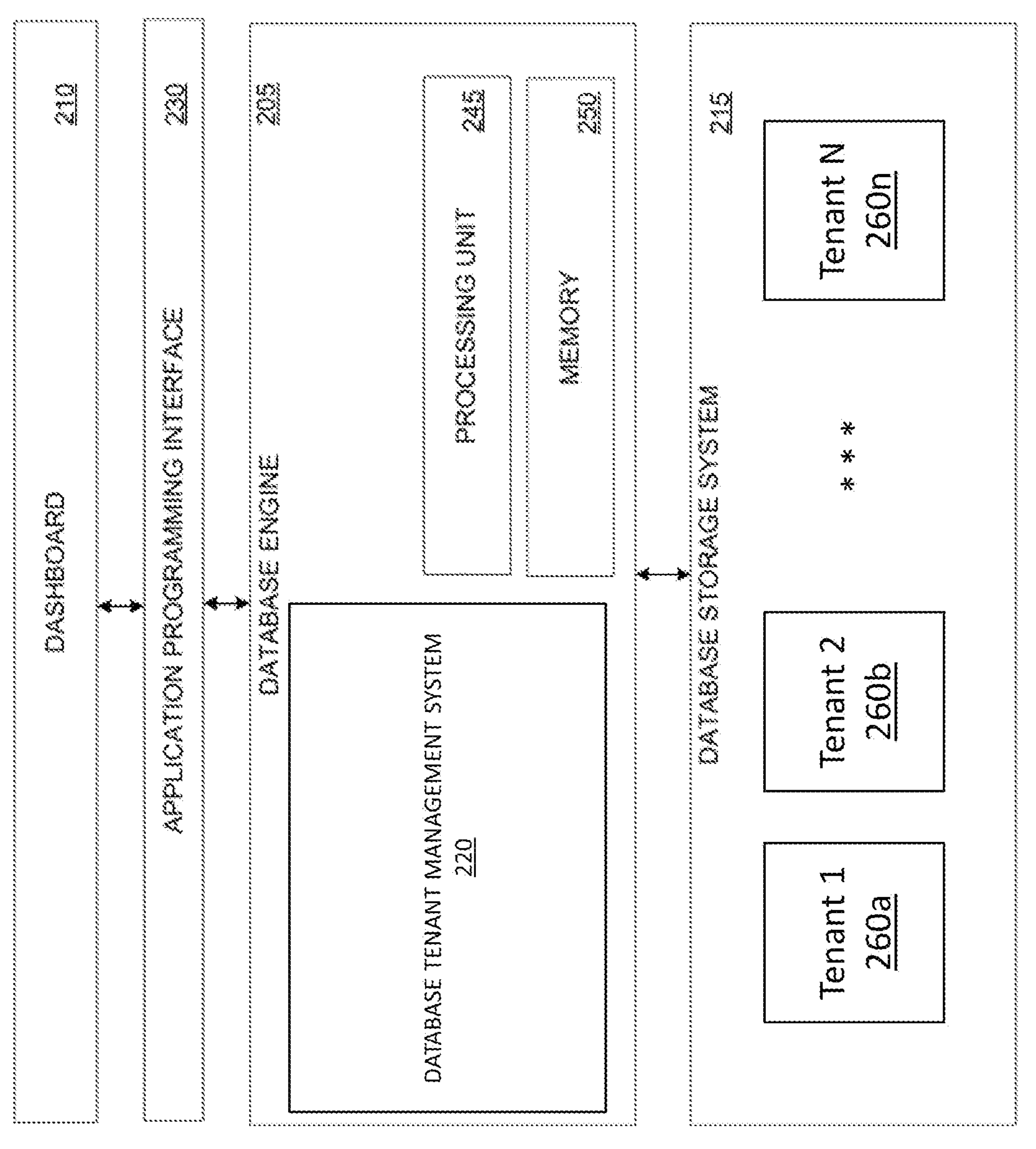
FIG. 2 is an example block diagram of a database system of the virtual computing system of FIG. 1, in accordance with some embodiments of the present disclosure.

Turning now to FIG. 2, an example block diagram of a database system 200 is shown, in accordance with some embodiments of the present disclosure. FIG. 2 is discussed in conjunction with FIG. 1. The database system 200 or portions thereof may be configured as utility software for creating and implementing database management services. The database system 200 is configured to facilitate creation/registration, querying, and/or administration of the databases associated therewith. Thus, the database system 200 includes a database engine 205 that is configured to receive input from and provide output to a user via a dashboard 210. The database engine 205 is also associated with a database storage system 215 that is configured to store one or more databases under management of the database system 200. In association with the dashboard 210 and the database storage system 215, the database engine 205 is configured to implement one or more database management services of the database system 200. For example, the database engine 205 is configured to provide database tenant management services to create/manage tenants with the database system 200 using a database tenant management system 220. The database storage system 215 may include a plurality of tenants 260 created by the database tenant management system 220. A tenant is a billing and/or data isolation entity tied to a specific customer. In some embodiments, a single customer may have multiple tenants. A tenant is identified by a unique identifier. All database objects, including users, are associated with the unique tenant identifier and are part of a tenancy scope. The tenancy scope defines what data is available to users (e.g., for accessing) in the database storage system 215.

The database system 200 may be installed on a database VM (e.g., the database VMs 120, the database VMs 135, the database VMs 150 of FIG. 1). The database system 200 may be installed via the controller/service VM (e.g., the controller/service VM 130, the controller/service VM 145, the controller/service VM 160) of the node (e.g., the first node 105, the second node 110, and the third node 115) on which the database system is to be installed. For example, an administrator desiring to install the database system 200 may download a copy on write image file (e.g., qcow or qcow2 image file) on the controller/service VM to define the content and structure of a disk volume to be associated with the database system 200. In some embodiments, instead of a copy on write image file, another type of disk image file, depending upon the type of underlying hypervisor, may be installed. Further, the administrator may create or one or more new database VMs on which the database system 200 is to reside. As part of creating the database VMs, the administrator may allocate a particular number of virtual central processing units (vCPU) to each of the database VMs, define the number of cores that are desired in each vCPU, designate a specific amount of memory to each of the database VMs, and attach a database storage device (e.g., a virtual disk from the storage pool 170) with each of the database VMs. In some embodiments, at least a portion of the database storage device attached to the database system 200 may form the database storage system 215. The administrator may also create a new network interface (e.g., associate a virtual local area network (VLAN), assign an Internet Protocol ("IP") address to access the database system 200, etc.) with each of the database VMs. The administrator may perform additional and/or other actions to create the database VMs on which the database system 200 resides upon creation and installation of the disk image file.

In some embodiments, the database VMs on which the database system 200 resides may all be located on a single node (e.g., one of the first node 105, the second node 110, and the third node 115). In other embodiments, the database VMs on which the database system 200 resides may be spread across multiple nodes within a single cluster, or possibly amongst multiple clusters. When spread across multiple clusters, each of the associated multiple clusters may be configured to at least indirectly communicate with one another to facilitate operation of the database system 200. Upon installing the database system 200, a user (e.g., the administrator or other user authorized to access the database system) may access the dashboard 210. The dashboard 210, thus, forms the front end of the database system 200 and the database engine 205 and the database storage system 215 form the backend of the database system.

The database system 200 may be accessed via a computing device associated with the virtual computing system 100. In other embodiments, instead of or in addition to being accessible via a particular computing device, the database system 200 may be hosted on a cloud service and may be accessed via the cloud. In some embodiments, the database system 200 may additionally or alternatively be configured as a mobile application suitable for access from a mobile computing device (e.g., a mobile phone). In some embodiments, the database system 200 and particularly the dashboard 210 may be accessed via an Application Programming Interface ("API") 230. To access the dashboard 210 via the API 230, a user may use designated devices such as laptops, desktops, tablets, mobile devices, other handheld or portable devices, and/or other types of computing devices that are configured to access the API. These devices may be different from the computing device on which the database system 200 is installed.

In some embodiments and when the dashboard 210 is configured for access via the API 230, the user may access the dashboard via a web browser and upon entering a uniform resource locator ("URL") for the API such as the IP address of the database system 200 or other web address. Using the API 230 and the dashboard 210, the users may then send instructions to the database engine 205 and receive information back from the database engine. In some embodiments, the API 230 may be a representational state transfer ("REST") type of API. In other embodiments, the API 230 may be any other type of web or other type of API (e.g., ASP.NET) built using any of a variety of technologies, such as Java, .Net, etc., that is capable of accessing the database engine 205 and facilitating communication between the users and the database engine. In some embodiments, the API 230 may be configured to facilitate communication via a hypertext transfer protocol ("HTTP") or hypertext transfer protocol secure ("HTTPS") type request. The API 230 may receive an HTTP/HTTPS request and send an HTTP/HTTPS response back. In other embodiments, the API 230 may be configured to facilitate communication using other or additional types of communication protocols. In other embodiments, the database system 200 may be configured for access in other ways.

The dashboard 210 provides a user interface that facilitates human-computer interaction between the users and the database engine 205. The dashboard 210 is configured to receive user inputs from the users via a graphical user interface ("GUI") and transmit those user inputs to the database engine 205. The dashboard 210 is also configured to receive outputs/information from the database engine 205 and present those outputs/information to the users via the GUI of the management system. The GUI may present a variety of graphical icons, windows, visual indicators, menus, visual widgets, and other indicia to facilitate user interaction. In other embodiments, the dashboard 210 may be configured as other types of user interfaces, including for example, text-based user interfaces and other man-machine interfaces. Thus, the dashboard 210 may be configured in a variety of ways.

Further, the dashboard 210 may be configured to receive user inputs in a variety of ways. For example, the dashboard 210 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the database system 200. The dashboard 210 may also be configured to present outputs/information to the users in a variety of ways. For example, the dashboard 210 may be configured to present information to external systems such as users, memory, printers, speakers, etc. Therefore, although not shown, dashboard 210 may be associated with a variety of hardware, software, firmware components, or combinations thereof. Generally speaking, the dashboard 210 may be associated with any type of hardware, software, and/or firmware component that enables the database engine 205 to perform the functions described herein.

Thus, the dashboard receives a user request (e.g., an input) from the user and transmits that user request to the database engine 205. In some embodiments, the user request may be to request a database management service. For example, in some embodiments, the user request may be to request a database tenant management service. In response to the user request for a database tenant management service, the database engine 205 may activate the database tenant management system 220.

The database engine 205, including the database tenant management system 220, may be configured as, and/or operate in association with, hardware, software, firmware, or a combination thereof. Specifically, the database engine 205 may include a processing unit 245 configured to execute instructions for implementing the database management services of the database system 200. In some embodiments, the database tenant management system 220 may have its own separate instance of the processing unit 245. The processing unit 245 may be implemented in hardware, firmware, software, or any combination thereof. "Executing an instruction" means that the processing unit 245 performs the operations called for by that instruction. The processing unit 245 may retrieve a set of instructions from a memory for execution. For example, in some embodiments, the processing unit 245 may retrieve the instructions from a permanent memory device like a read only memory (ROM) device and copy the instructions in an executable form to a temporary memory device that is generally some form of random access memory (RAM). The ROM and RAM may both be part of the storage pool 170 and/or provisioned separately from the storage pool. In some embodiments, the processing unit 245 may be configured to execute instructions without first copying those instructions to the RAM. The processing unit 245 may be a special purpose computer, and include logic circuits, hardware circuits, etc. to carry out the instructions. The processing unit 245 may include a single stand-alone processing unit, or a plurality of processing units that use the same or different processing technology. The instructions may be written using one or more programming language, scripting language, assembly language, etc.

The database engine 205 may also include a memory 250. The memory 250 may be provisioned from or be associated with the storage pool 170. In some embodiments, the memory 250 may be separate from the storage pool 170. The memory 250 may be any of a variety of volatile and/or non-volatile memories that may be considered suitable for use with the database engine 205. In some embodiments, the memory 250 may be configured to store the instructions that are used by the processing unit 245. Further, although not shown, in some embodiments, the database tenant management system 220 have its own dedicated memory.

It is to be understood that only some components of the database engine 205 are shown and discussed herein. In other embodiments, the database engine 205 may also include other components that are considered necessary or desirable in implementing the various database management services discussed herein. Similarly, the database tenant management system 220 may have components that are considered necessary or desirable in implementing the various database management services discussed herein.

Referring still to FIG. 2, the database storage system 215 is configured to store one or more databases that are either created within the database system 200 or registered with the database system. The database storage system 215 is structured with the flexibility to expand and adapt to accommodate databases of various sizes.

Figure 3:
FIG. 3 is an example block diagram of a tenancy architecture of the database system of FIG. 2, in accordance with some embodiments of the present disclosure.

FIG. 3 is an example block diagram of a tenancy architecture 300 of the database system of FIG. 2, in accordance with some embodiments of the present disclosure. The tenancy architecture 300 may include a first organization 310, a second organization 320, and a third organization 330. The first organization 310 may include a first tenant 312, a second tenant 314, and a third tenant 316. The second organization 320 may include a fourth tenant 322 and a fifth tenant 324. The third organization 330 may include a sixth tenant 326. The plurality of tenants 260 in the database storage system 215 of FIG. 1 may include the first through sixth tenants 312-326. Although the first organization 310 is shown to include 3 tenants, the second organization 320 is shown to include two tenants, and the third organization 330 is shown to include a single tenant, in other embodiments, the number of tenants in each organization may vary from that shown. Data in the first tenant is isolated from data in the second tenant 314 and the third tenant 316. Data in the first tenant is similarly isolated from the fourth tenant 322, the fifth tenant 324, and the sixth tenant 326. Each tenant's data is isolated from the data of the other tenants. Similarly, billing is separated by tenancies as well. The first organization 310 receives separate bills and billing data for the first tenant 312, the second tenant 314, and the third tenant 316.

The first tenant 312 may be a tenancy of a cloud account or cloud subscription. For example, the first tenant 312 may be a tenancy of a cloud account for a department of the first organization 310. In some embodiments, the cloud account may be a cloud account of a private cloud or on-premises cloud. In other embodiments, the cloud account may be a cloud account of a public cloud such as an AWS cloud account, an Azure cloud account, etc. The cloud account may be an existing cloud account or a newly-created cloud account. A cloud account may be created when a user subscribes to the cloud. The user may be assigned a tenant-admin role which may manage users and roles of the cloud account. The cloud account may be associated with a cloud commit or a minimum cloud commit. The first tenant 312 may allow for tracking of resource consumption for billing purposes. The first tenant 312 may allow for alerts for over-usage of cloud resources or under-usage relative to a minimum cloud commit. The first tenant 312 may allow for integration with external identity providers. The first tenant 312 may achieve separation of infrastructure, including data isolation. Although the structure and function of the first tenant 312 is discussed, the second through sixth tenants 314-326 may be similarly structured and/or function similar to the first tenant 312.

The tenant admin role associated with a tenant may define a collection of privileges associated with the tenant. A user associated with the tenant-admin role may have the ability to add users to the tenant. The tenant-admin role may include assigning roles to users. The tenant-admin role may include managing user permissions and/or privileges. The tenant-admin role may include assigning users to projects. The tenant-admin role may include managing sign-in permissions for users, such as determining for which users the database system will retrieve login credentials for signing in to a tenant. In some embodiments, user roles may be associated with user sign-in permissions.

An admin role for a customer or organization may be associated with multiple tenants. The admin role may include privileges for multiple tenants such that the admin role includes privileges included in multiple tenant admin roles. The admin role may be associated with multiple tenants which serve as multiple billing entities. The admin role may be associated with the customer or organization which includes multiple tenants and thus multiple billing entities. For example, a billing administrator or support administrator may have an admin role for an organization, allowing the billing administrator to manage billing for the entire organization across multiple tenants and cloud accounts. The billing administrator may be able to implement organization-wide policies across all of the tenants of an organization such as multi-factor authentication (MFA) or federation.

Figure 4:
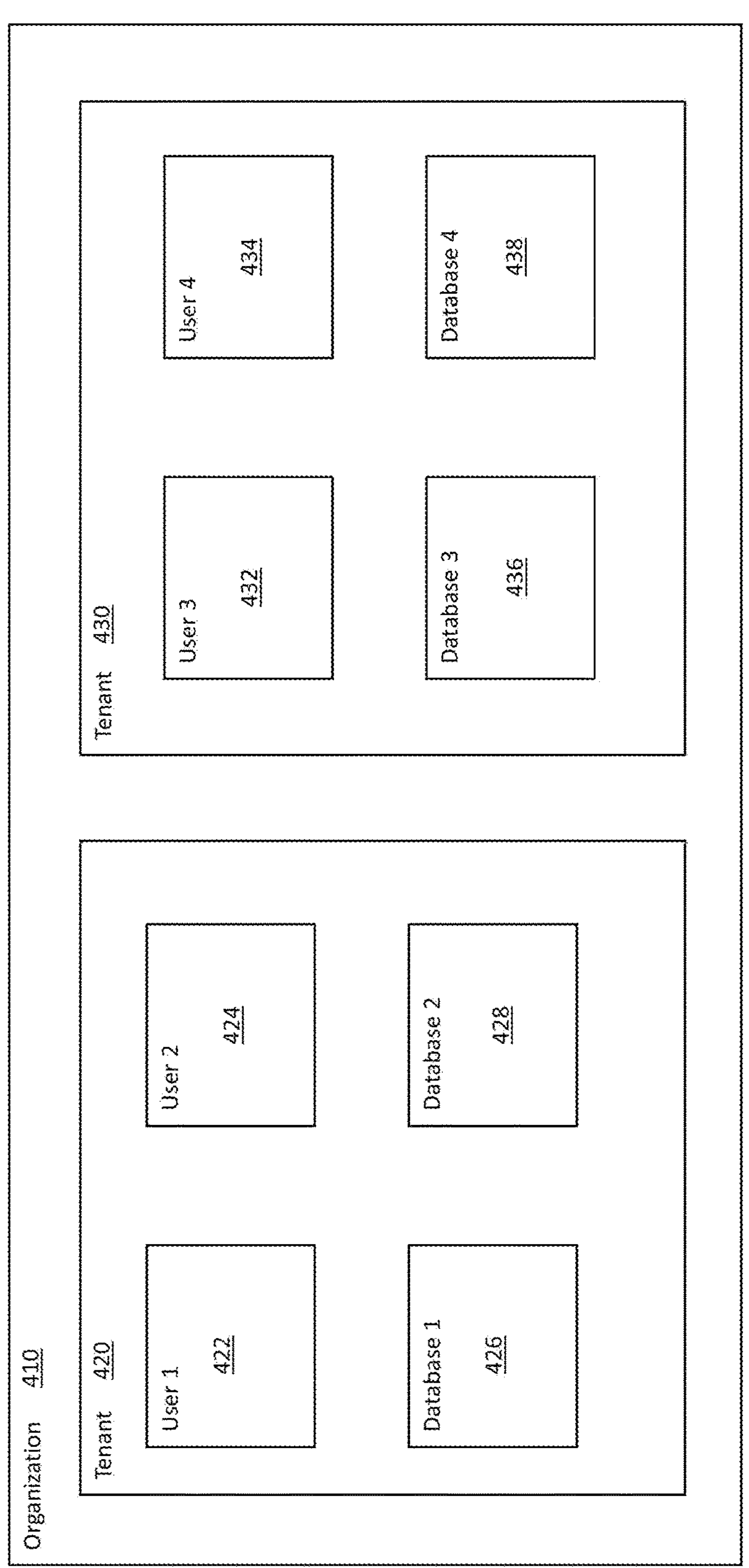
FIG. 4 is another example block diagram of a tenancy architecture of the database system of FIG. 2, in accordance with some embodiments of the present disclosure.

FIG. 4 is an example block diagram of a tenancy architecture 400 including user and database objects, in accordance with some embodiments of the present disclosure. The tenancy architecture 400 includes an organization 410. The organization 410 may be one of the organizations, such as the first organization 310 of FIG. 3. The organization may include a first tenant 420 and a second tenant 430. The first tenant 420 may include a first user 422, a second user 424, a first database 426, and a second database 428. Each software object in the database system 200 is associated with a tenant. Objects may include users and databases. The first user 422, the second user, the first database 426, and the second database 428 are associated with the first tenant 420. The second tenant 430 may include a third user 432, a fourth user 434, a third database 436, and a fourth database 438, all of which are associated with the second tenant 430. The first user 422 and the second user 424 may access the first database 426 and the second database 428, but not the third database 436 and fourth database 438. The third user 432 and the fourth user 434 may access the third database 436 and the fourth database 438, but not the first database 426 and the second database 428.

Figure 5:
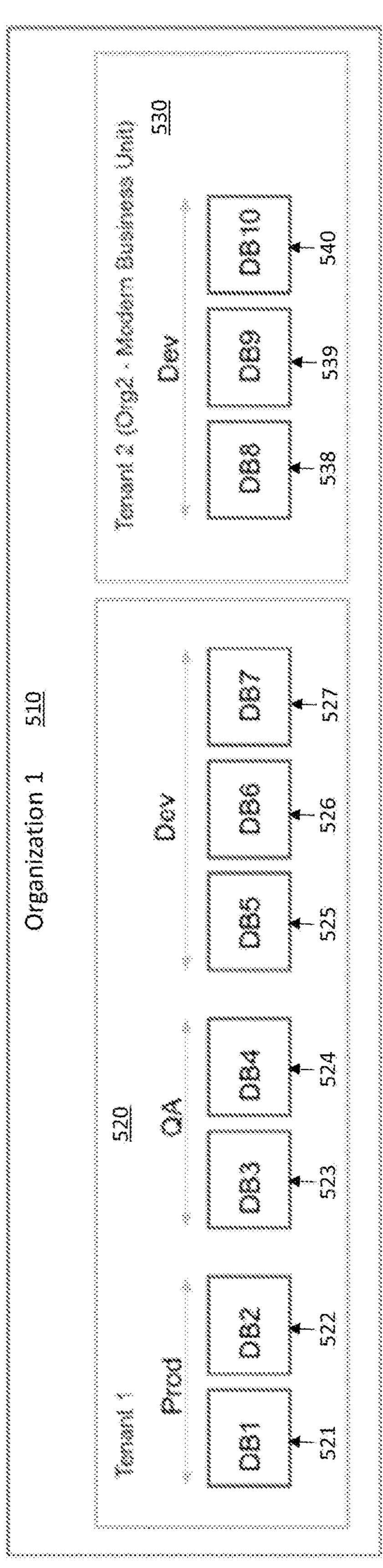
FIG. 5 is an example block diagram of a tenancy architecture including user roles, in accordance with some embodiments of the present disclosure.

FIG. 5 is an example block diagram of a tenancy architecture 500 including user roles, in accordance with some embodiments of the present disclosure. The tenancy architecture 500 may include an organization 510. The organization 510 may include a first tenant 520 and a second tenant 530. The first tenant 520 may include a first database 521, a second database 522, a third database 523, a fourth database 524, a fifth database 525, a sixth database 526, and a seventh database 527. The second tenant 530 may include an eighth database 538, a ninth database 539, and a tenth database 540. Users (not shown) associated with either the first tenant 520 or the second tenant 530 may have assigned roles. Roles are collections of privileges which allow users to enact actions. For example, a first user associated with the first tenant 520 may have a tenant admin role which has all privileges. This role allows the first user to take all possible actions on any of the first through seventh databases 521-527. A second user associated with the first tenant may have a database admin role for the first database 521. This role allows the second user to take all possible actions on the first database 521.

The second tenant 530 may include an eighth database 538, a ninth database 539, and a tenth database 540. As an example, a second user associated with the second tenant 530 may have a tenant admin role which has all privileges. This role allows the second user to take all possible actions on any of the eighth through tenth databases 538-540.

Figure 6:
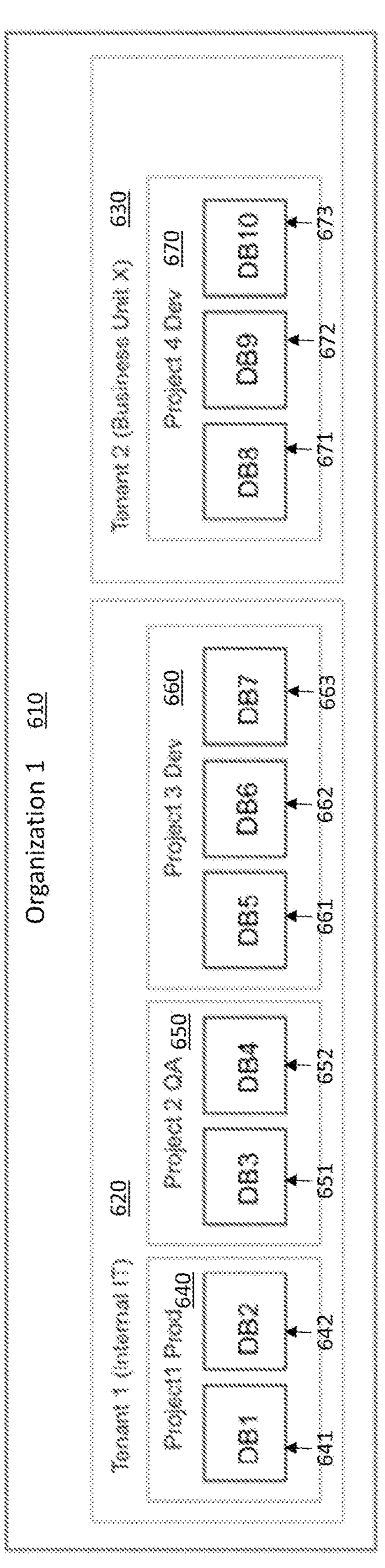
FIG. 6 is an example block diagram of a tenancy architecture including projects, in accordance with some embodiments of the present disclosure.

FIG. 6 is an example block diagram of a tenancy architecture 600 including projects, in accordance with some embodiments of the present disclosure. The tenancy architecture 600 may include an organization 610. The first organization may include a first tenant 620 and a second tenant 630. The first tenant may include a first project 640, a second project 650, and a third project 660. The first project 640 may include a first database 641 and a second project 642. A project is a logical grouping which includes access rights and privileges. For example, the first project 640 may be a production project. A first user may be a programmer associated with the production project, giving the first user access to, the first database 641 and the second database 642. The production project may also be associated with the ability to clone databases, giving the first user the ability to clone the first database 641 and the second database 642. The first user may have the ability to clone the first database 641 and the second database 642 even if a role of the first user is not associated with the privilege of cloning databases. Thus, a project may be used to assign privileges to users for multiple databases based on their association with the project.

The second project 650 may, for example, be a quality assurance (QA) project which carries with it the privilege to view a third database 651 and a fourth database 652 included in the second project 650. A QA user may be associated with the second project 650, allowing the QA user to view the third database 651 and the fourth database 652. The QA user may also be associated with the first project 640, granting the QA user the privileges associated with the first project.

The third project 660 may include a fifth database 661, a sixth database 662, and a seventh database 663. The third project may carry with it privileges to take all possible actions on the fifth through seventh databases 661-663. Thus, users associated with the third project 660 may have equal privileges to a tenant admin user of the first tenant 620 in regards to the fifth through seventh databases 661-663.

The second tenant 630 may include a fourth project 670. The fourth project 670 may include an eighth database 671, a ninth database 672, and a tenth database 673. The fourth project 670 may include all of the databases associated with the second tenant 630. The fourth project may carry with it privileges to take all possible actions on the eighth through tenth databases 671-673 except adding and deleting databases. All users associated with the second tenant 630 may be associated with the fourth project 670. Thus, all users associated with the second tenant 630 may have privileges to take all possible actions on the eighth through tenth databases 671-673 except adding and deleting databases. A tenant admin user of the second tenant 630 may be the only user associated with the second tenant 630 able to add and deleted databases in the second tenant 630.

Figure 7:
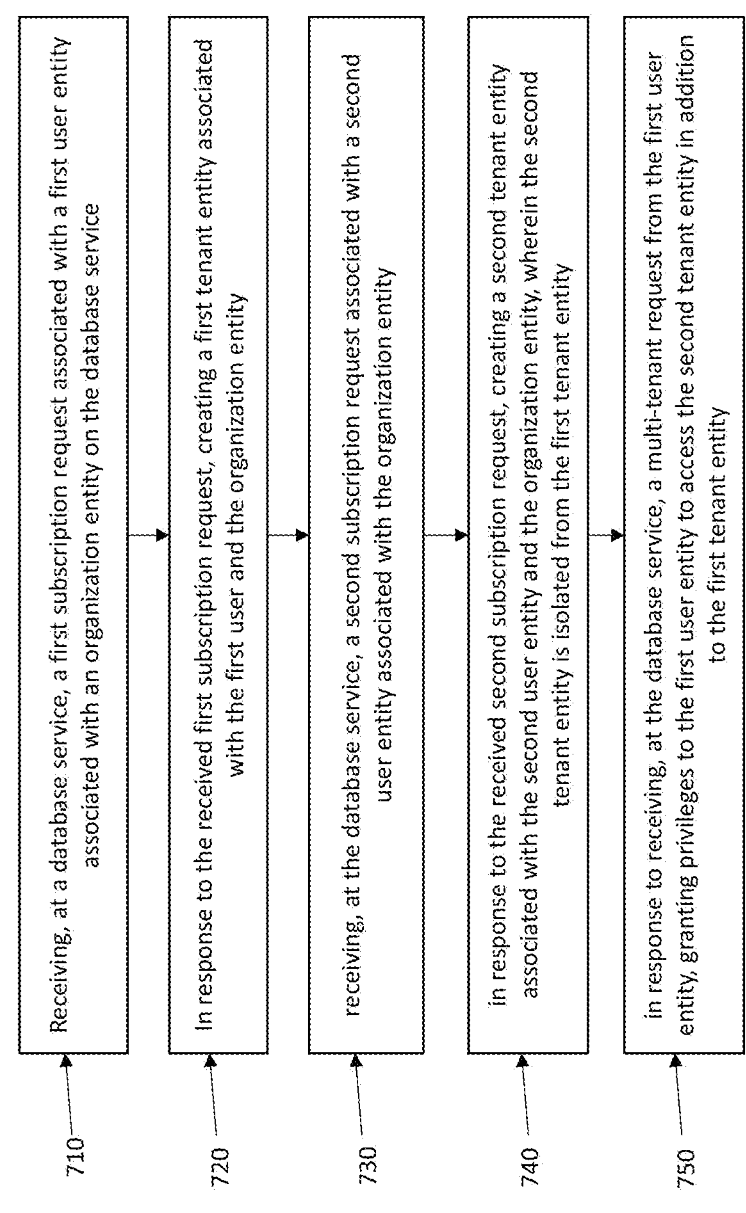
FIG. 7 is an example flowchart illustrating operations for creating tenancies within the database system of FIG. 2, in accordance with some embodiments of the present disclosure.

FIG. 7 is an example flowchart 700 illustrating operations for creating tenancies within the database system of FIG. 2, in accordance with some embodiments of the present disclosure. Additional, fewer, or different operations may be performed in the method, depending on the embodiment. Further, the operations may be performed in the order shown, concurrently, or in a different order. The operations may be implemented by the database tenant management system 220 of FIG. 2. Operation 710 includes receiving, at the database tenant management system 220, a first subscription request associated with a first user entity associated with an organization entity on the database system 200. Operation 720 includes, in response to the received first subscription request, creating, by the database tenant management system 220, a first tenant entity associated with the first user and the organization entity. Operation 730 includes receiving, at the database tenant management system 220, a second subscription request associated with a second user entity associated with the organization entity. Operation 740 includes, in response to the received second subscription request, creating, by the database tenant management system 220, a second tenant entity associated with the second user entity and the organization entity, wherein the second tenant entity is isolated from the first tenant entity. Operation 750 includes, in response to receiving, at the database tenant management system 220, a multi-tenant request from the first user entity, granting privileges to the first user entity to access the second tenant entity in addition to the first tenant entity.

A user corresponding to the user entity may access each of the first and second tenants corresponding to the first and second tenant entities. The user may operate within a scope of the first tenant when accessing the first tenant or a first cloud account associated with the first tenant. The user may operate within a scope of the second tenant when accessing the second tenant or a second cloud account associated with the second tenant. The database system may allow the user to switch between the first tenant and the second tenant during login time only. The user may select one of the first tenant or the second tenant when logging in to the database system. The database system may retrieve login credentials for the selected tenant and automatically log the user in to the selected tenant. Causing the user to operate within the scope of the selected tenant maintains data isolation between tenants. The user is able to access multiple tenants but is only able to switch between them or select a tenant at login time, preventing data from being shared between tenants.

Figure 8:
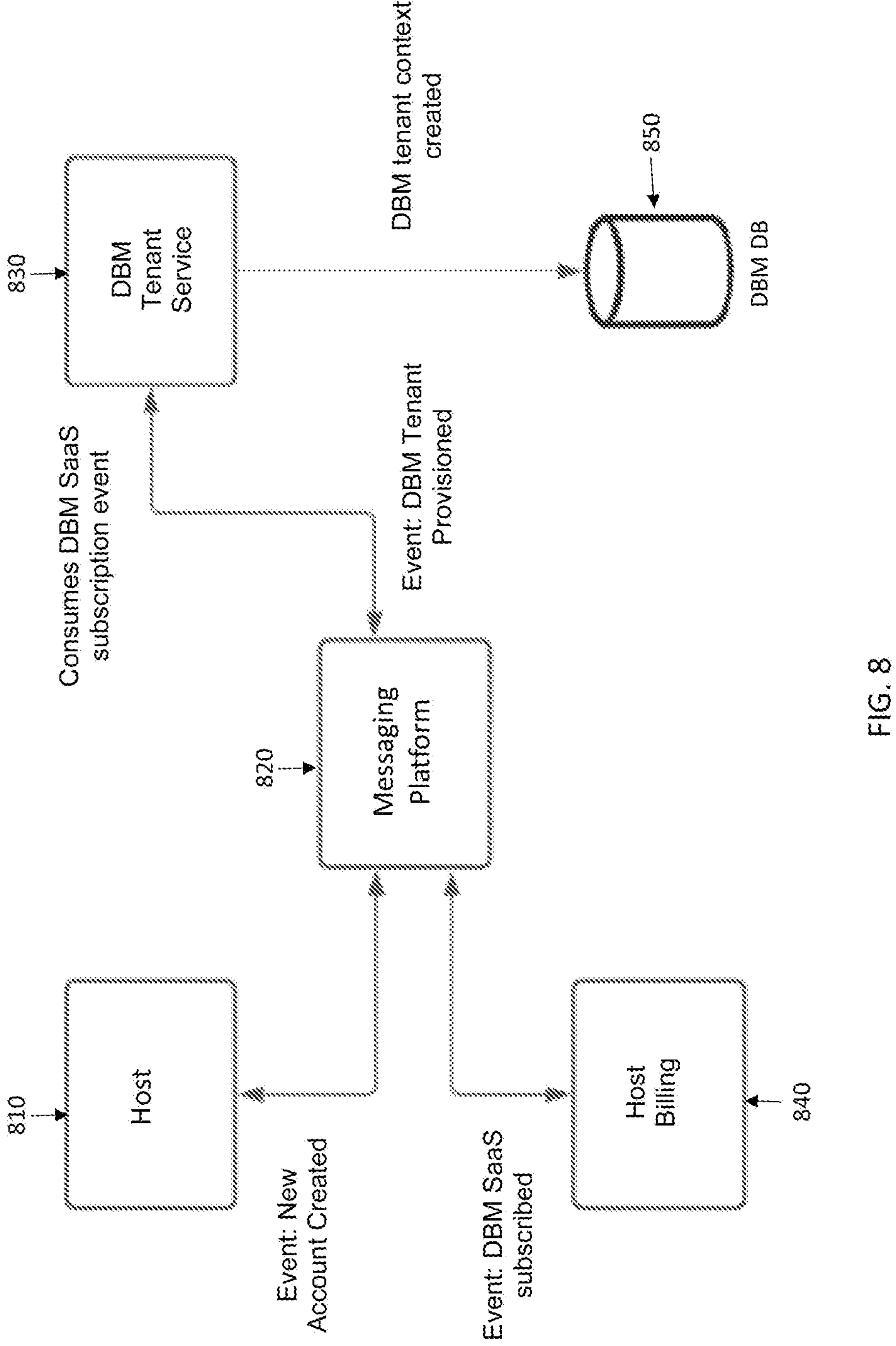
FIG. 8 is an example block diagram of a database system, in accordance with some embodiments of the present disclosure.

FIG. 8 is an example block diagram of a database system 800 showing additional details of the database engine 205, the database tenant management system 220, and/or the database storage system 215 of FIG. 2, in accordance with some embodiments of the present disclosure. Components of the database system 800 may be part of the database engine 205, the database tenant management system 220, or both. In some embodiments, some components of the database system 800 may be combined together. The components of the database system 800 may utilize the processing unit 245 and memory 250 of the database engine. The components of the database system 800 may include their own processing units and memories (not shown). The database system 800 includes a host 810, a messaging platform 820, a database management (DBM) tenant service 830, a host billing service 840, and a DBM database (DBM DB) 850. The host 810 may be part of the database tenant management system 220 and may provide functions for creating new users and associated user ids and tenant ids. The DBM tenant service 830 may be part of the database tenant management system 220 and may create new tenants upon request from the host 810. The host billing service 840 may be part of the database tenant management system 220 and/or the database engine 205 and may track resource consumption for tenants for billing purposes. The DBM DB 850 may be part of the database storage system 215 and/or the database tenant management system 220 and may store information related to tenants, users associated with the tenants, user roles, and projects.

A user may create a new account at the host 810. The host 810 may publish a message to the messaging platform 820 that a new account has been created. The message may include details about the new account, such as a uuid. The messaging platform 820 may create a SaaS subscription event based on the message from the host 810. The DBM tenant service 830 may consume the SaaS subscription event and provision a database including a tenant associated with the user. The DBM tenant service 830 may create a tenant context and record it in the DBM DB 850. The tenant context may be a DBM tenant object used to identify the tenant and its associated databases within the database system 800. The DBM tenant service 830 may publish a message to the messaging platform 820 concerning the provisioned tenant. The message may include a tenant id. The tenant id may be associated with a customer id. The customer id may be associated with an organization and the tenant id may be associated with a tenancy of the database system or a cloud account. The message may include customer details. The tenant context may be created using the tenant id. The tenant context may serve to enforce tenant scope, where queries or requests to a tenant are only accepted if they carry the correct tenant context. The messaging platform 820 may send to the host billing service 840, or publish in a channel to which the host billing service 840 subscribes, the message concerning the provisioned tenant. The host billing service 840 may render the subscription active. The host billing service 840 may publish and receive messages related to resource consumption in order to calculate billing for the provisioned tenant. The host billing service 840 may track cloud resource consumption for a plurality of tenants. The host billing service 840 may alert the host 810 and/or the DBM tenant service 830 of overconsumption of resources via the messaging platform 820. The host 810 may indicate to the DBM tenant service 830 to restrict resource consumption by a tenant based on an overconsumption of resources. Users may log in to the tenant using an identity provider (IDP). The IDP may include one or more login credentials for the tenant. The database system may use the IDP to retrieve login credentials for the tenant. The database system may use the IDP to retrieve login credentials for various cloud accounts associated with a customer or organization.

Figure 9:
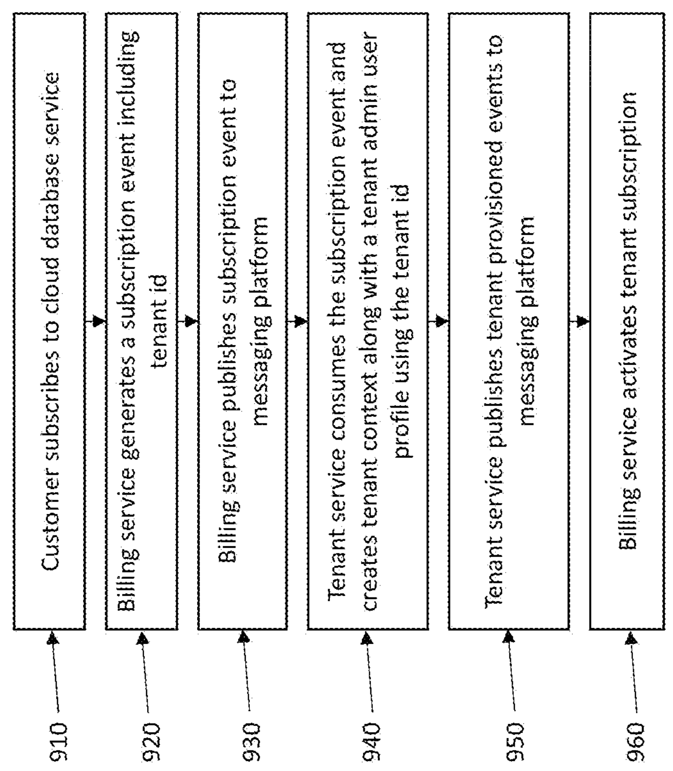
FIG. 9 is an example flowchart illustrating operations for creating a tenancy based on a user subscription, in accordance with some embodiments of the present disclosure.

FIG. 9 is an example flowchart 900 illustrating operations for creating a tenancy based on a user subscription, in accordance with some embodiments of the present disclosure. Additional, fewer, or different operations may be performed in the method, depending on the embodiment. Further, the operations may be performed in the order shown, concurrently, or in a different order. In some embodiments, the operations of the flowchart 900 may be performed by the components of the database system 800 of FIG. 8. Operation 910 includes a customer subscribing to the database system 800. The host 810 may receive an indication of the customer subscribing to the database system 800 as well as information entered by the customer. Operation 920 includes the host billing service 840 generating a subscription event including a tenant id. Operation 930 includes the host billing service 840 publishing a subscription event to the messaging platform 820. Operation 940 includes the DBM tenant service 830 consuming the subscription event and creating a tenant context along with a tenant admin user profile using the tenant id. Operation 950 includes the DBM tenant service 830 publishing a tenant provisioned event to the messaging platform 820. Operation 960 includes the host billing service 840 activating a tenant subscription for the customer.

Figure 10:
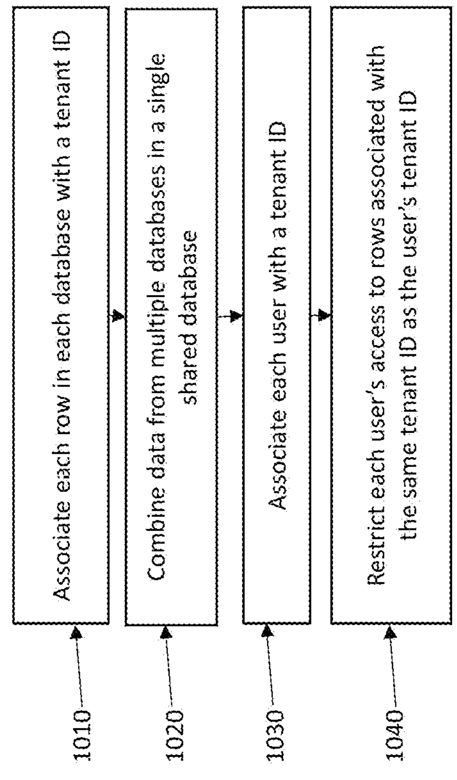
FIG. 10 is an example flowchart illustrating operations for isolating data by tenancies within a database system, in accordance with some embodiments of the present disclosure.

FIG. 10 is an example flowchart 1000 illustrating operations for isolating data by tenancies within a database system, in accordance with some embodiments of the present disclosure. Additional, fewer, or different operations may be performed in the method, depending on the embodiment. Further, the operations may be performed in the order shown, concurrently, or in a different order. The operations of the example flowchart 1000 may be performed by the database tenant management system 220 and/or the database storage system 215 of FIG. 2. Operation 1010 includes associating, by the database tenant management system 220 and/or the database storage system 215, each row in each database in the database storage system 215 with a tenant ID. Associating each row with a tenant ID may be done based on users associated with tenant IDs creating rows in databases and associating the created rows with the tenant IDs associated with the users. Operation 1020 includes combining data, by the database storage system 215, from multiple databases in a single shared database in the database storage system 215. The multiple databases may be combined to conserve memory resources or otherwise more efficiently store data on servers. Operation 1030 includes associating, by the database tenant management system 220, each user with a tenant ID. Operation 1040 includes restricting, the database tenant management system 220, each user's access to rows associated with the same tenant ID as the user's tenant ID.

Figure 11:
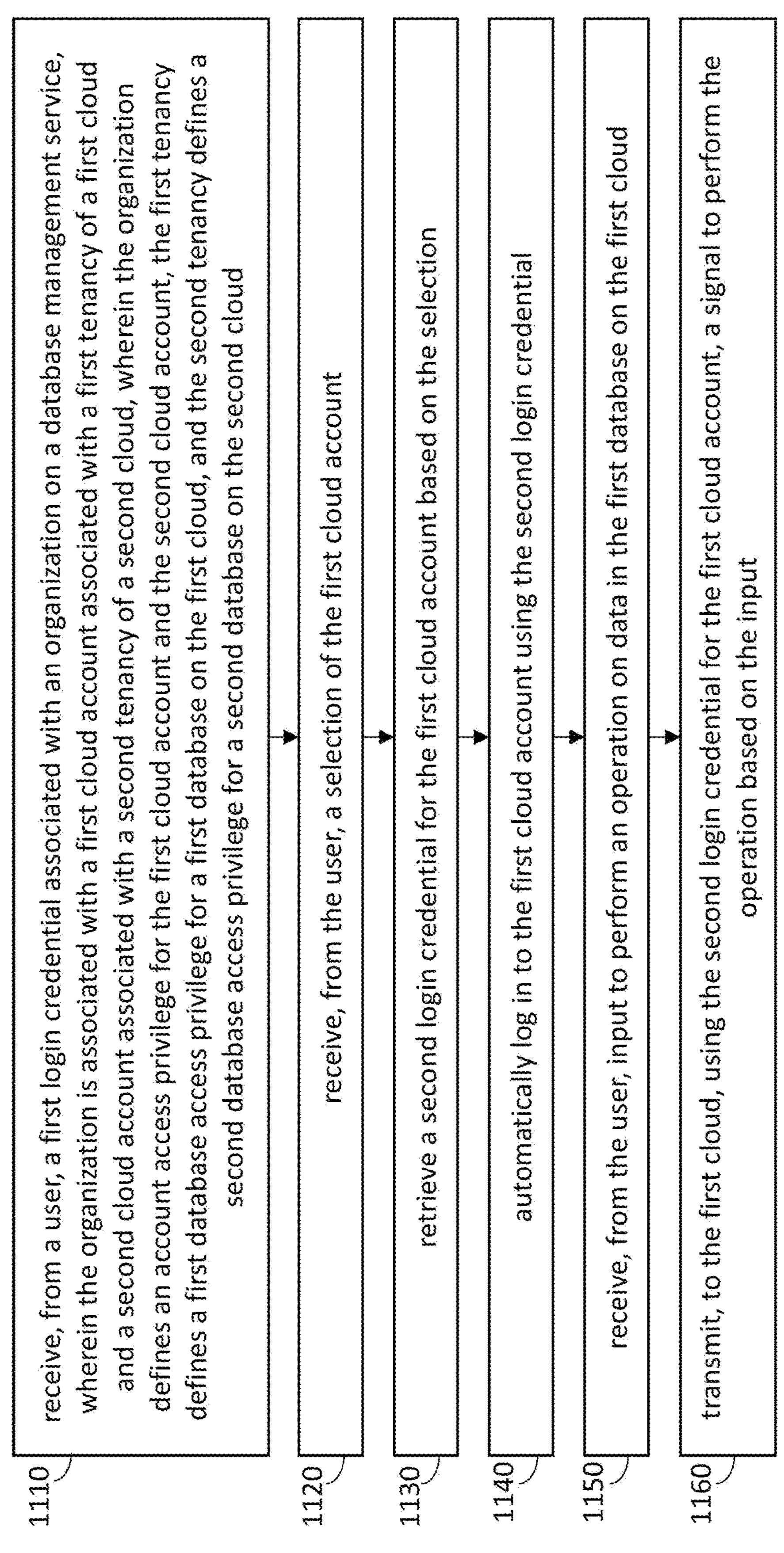
FIG. 11 is an example flowchart illustrating operations for multi-tenant access within a database system, in accordance with some embodiments of the present disclosure.

FIG. 11 is an example flowchart 1100 illustrating operations for multi-tenant access within a database management service, in accordance with some embodiments of the present disclosure. Additional, fewer, or different operations may be performed in the method, depending on the embodiment. Further, the operations may be performed in the order shown, concurrently, or in a different order. The operations of the example flowchart 1100 may be performed by the database tenant management system 220 and/or the database storage system 215 of FIG. 2.

At 1110, the database management service may receive, from a user, a first login credential associated with an organization on the database management service, wherein the organization is associated with a first cloud account associated with a first tenancy of a first cloud and a second cloud account associated with a second tenancy of a second cloud, wherein the organization defines an account access privilege for the first cloud account and the second cloud account, the first tenancy defines a first database access privilege for a first database on the first cloud, and the second tenancy defines a second database access privilege for a second database on the second cloud. In some embodiments, the database management service is configured to manage database operations of the first database on the first cloud corresponding to the first tenancy and manage operations of the second database on the second cloud corresponding to the second tenancy. In some embodiments, the user may be an administrator such as a database administrator, a billing administrator, or a support administrator. The administrator may be authorized to access all tenants and cloud accounts associated with the organization. The administrator may be able to implement organization-wide policies across all of the tenants and cloud accounts such as MFA or federation.

At 1120, the database management service may receive, from the user, a selection of the first cloud account. In some embodiments, the database system may receive, from the user, a selection of the second cloud account and deny access to the user to the second cloud account based on a project associated with the user, wherein the project defines a project access privilege for the first cloud account but not the second cloud account. In some embodiments, the database system may receive, from the user, a selection of the first database corresponding to the first tenancy, grant access to the user to the first database, receive, from the user, a selection of a third database corresponding to the first tenancy, and deny access to the user to the third database based on a user role, wherein the user role grants access to the first database but not the third database. In some embodiments, the database management service may associate the user with the second tenancy, receive, from the user, a selection of the second tenancy, receive, from the user, a request associated with a second tenancy context, and grant access to the user to the second database on the second cloud based on the second tenancy context.

At 1130, the database management service may retrieve a second login credential for the first cloud account based on the selection. The second login credential may be associated with the first cloud account and may be used to log in to the first cloud account.

At 1140, the database management service may automatically log in to the first cloud account using the second login credential. In some embodiments, the database management service may create, on the first cloud, using the second login credential, the first tenancy and provision, on the first cloud, within the first tenancy, the first database on the first cloud. In some embodiments, the database management service may receive, from the user, a subscription request, generate, in response to the subscription request, a third tenancy, and generate a tenant admin role for the third tenancy for the user.

At 1150, the database management service may receive, from the user, input to perform an operation on data in the first database on the first cloud. In some embodiments, the operation may include cloning the first database. In other embodiments, the operation may include editing the data in the first database.

At 1160, the database management service may transmit, to the first cloud, using the second login credential for the first cloud account, a signal to perform the operation based on the input. In some embodiments, the database management service may associate each row of the first database on the first cloud with the first tenancy and associate each row of the second database on the second cloud with the second tenancy. In some embodiments, the database management service may receive a request from the user to view a row from the first database on the first cloud, wherein the request is not associated with the first tenancy and deny the request based on the request not being associated with the first tenancy.

In some embodiments, the database management system may calculate a first billing amount for the organization based on usage information associated with the first tenancy and calculate a second billing amount for the organization based on usage information associated with the second tenancy.

In some embodiments, a database system may include a memory having computer-readable instructions stored thereon and a processor that executes the computer-readable instruction to create a first tenant entity, create a second tenant entity, grant access to a first plurality of databases to the first tenant entity, and grant access to a second plurality of databases to the second tenant entity, where the second tenant entity is isolated from accessing the first plurality of databases and the first tenant entity is isolated from accessing the second plurality of databases.

The database system may further include a second user entity associated with the first tenant entity but not the second tenant entity, the second user entity having privileges to access the first plurality of databases but not the second plurality of databases.

The database system may be configured to deny queries made by the second user entity concerning the second plurality of databases.

The database system may further include a third user entity associated with the second tenant entity but not the first tenant entity, the third user entity having privileges to access the second plurality of databases but not the first plurality of databases.

The database system may be configured such that the first tenant entity and the second tenant entity reside on a shared physical server.

The database system may be configured such that the second user entity has privileges to access a first subset of the first plurality of databases but not a second subset of the first plurality of databases.

The database system may be configured such that the first subset of the first plurality of databases and the second subset of the first plurality of databases depend upon a role of the second user entity.

The database system may be configured such that the role of the second user entity is assigned by the user entity.

The database system of may be configured such that the first tenant entity is associated with a first subset of a plurality of services associated with the database system, and the second tenant entity is associated with a second subset of the plurality of services associated with the database system.

The database system may be configured such that the user entity is associated with a third subset of the plurality of services associated with the database system.

A method may include receiving, at a database service, a first subscription request associated with a first user entity associated with an organization entity on the database service, in response to the received first subscription request, creating a first tenant entity associated with the first user and the organization entity, receiving, at the database service, a second subscription request associated with a second user entity associated with the organization entity, in response to the received second subscription request, creating a second tenant entity associated with the second user entity and the organization entity, wherein the second tenant entity is isolated from the first tenant entity and, in response to receiving, at the database service, a multi-tenant request from the first user entity, granting privileges to the first user entity to access the second tenant entity in addition to the first tenant entity.

The method may further include verifying credentials of the first user entity before granting privileges to the first user entity to access the second tenant entity.

The method may further include receiving, at the database service, a third subscription request associated with a third user entity associated with the organization entity, wherein the third subscription request comprises a request to subscribe to the first tenant entity, in response to the received third subscription request, verifying credentials of the third user entity and granting privileges to the third user entity to access the first tenant entity.

The method may further include receiving, by the database system, from the first user entity, an indication of a role of the third user entity, wherein the role of the third user entity defines a subset of a plurality of databases associated with the first tenant entity which the third user entity has privileges to access.

The method may be performed where the first tenant entity and the second tenant entity are created on a shared physical server.

The method may be performed where the first tenant entity is associated with a first subset of a plurality of services associated with the database system, and the second tenant entity is associated with a second subset of the plurality of services associated with the database system.

The method may be performed where the first user entity is associated with a third subset of the plurality of services associated with the database system and the second user entity is associated with a fourth subset of the plurality of services associated with the database system.

The method may further include prompting the first user entity to log out of the first tenant entity before signing in to the second tenant entity.

The method may further include allowing the first user entity to access the first tenant entity, but not the second tenant entity, when the first user is logged in to the first tenant entity and allowing the first user entity to access the second tenant entity, but not the first tenant entity, when the first user is logged in to the second tenant entity.

The method may further include associating activity of the first user entity on the first tenant entity with a first billing identity associated with the organization entity and associating activity of the first user on the second tenant entity with a second billing identity associated with the organization.

It is to be understood that any examples used herein are simply for purposes of explanation and are not intended to be limiting in any way. It is also to be understood that any examples used herein are simply for purposes of explanation and are not intended to be limiting in any way. Further, although the present disclosure has been discussed with respect to memory usage, in other embodiments, the teachings of the present disclosure may be applied to adjust other resources, such as power, processing capacity, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system comprising:

a memory having computer-readable instructions stored thereon; and a processor that executes the computer-readable instructions to:

receive, from a user, a first login credential associated with an organization on a database management service, wherein a first tenancy of the organization defines a first database access privilege for a first database associated with a first tenant identifier and a third database associated with the same first tenant identifier on a first cloud, and a second tenancy of the organization defines a second database access privilege for a second database on a second cloud;

authenticate the user to the first tenancy using the first login credential to establish a tenant context scoped to the first tenant identifier;

receive, from the user, a selection of a first cloud account;

retrieve a second login credential for the first cloud account based on the selection;

automatically log in to the first cloud account using the second login credential;

receive, from the user, input to perform an operation on data in the first database on the first cloud;

transmit, to the first cloud, using the second login credential for the first cloud account and within the established tenant context, a signal to perform the operation based on the input;

receive, from the user, a selection of the first database corresponding to the first tenancy;

grant access to the user to the first database;

receive, from the user, a selection of a third database corresponding to the first tenancy; and deny access to the user to the third database within the established tenant context and without re-authenticating to a different tenancy based on a user role evaluated after the tenancy authentication, wherein the user role grants access to the first database but not the third database.

2. The system of claim 1, wherein the processor further executes the computer-readable instructions to:

receive, from the user, a selection of a second cloud account; and deny access to the user to the second cloud account based on a project associated with the user, wherein the project defines a project access privilege for the first cloud account but not the second cloud account.

3. The system of claim 1, wherein the database management service is configured to manage database operations of the first database on the first cloud corresponding to the first tenancy and manage operations of the second database on the second cloud corresponding to the second tenancy.

4. The system of claim 1, wherein the processor further executes the computer-readable instructions to:

create, on the first cloud, using the second login credential, the first tenancy; and provision, on the first cloud, within the first tenancy, the first database on the first cloud.

5. The system of claim 1, wherein the processor further executes the computer-readable instructions to:

associate each row of the first database on the first cloud with the first tenancy; and associate each row of the second database on the second cloud with the second tenancy.

6. The system of claim 5, wherein the processor further executes the computer-readable instructions to:

receive a request from the user to view a row from the first database on the first cloud, wherein the request is not associated with the first tenancy; and deny the request based on the request not being associated with the first tenancy.

7. The system of claim 1, wherein the processor further executes the computer-readable instructions to:

calculate a first billing amount for the organization based on usage information associated with the first tenancy; and calculate a second billing amount for the organization based on usage information associated with the second tenancy.

8. The system of claim 1, wherein the processor further executes the computer-readable instructions to:

associate the user with the second tenancy;

receive, from the user, a selection of the second tenancy;

receive, from the user, a request associated with a second tenancy context; and grant access to the user to the second database on the second cloud based on the second tenancy context.

9. The system of claim 1, wherein the processor further executes the computer-readable instructions to:

receive, from the user, a subscription request;

generate, in response to the subscription request, a third tenancy; and generate a tenant admin role for the third tenancy for the user.

10. A non-transitory, computer-readable medium comprising instructions which, when executed by a processor, cause the processor to:

receive, from a user, a first login credential associated with an organization on a database management service, wherein a first tenancy of the organization defines a first database access privilege for a first database associated with a first tenant identifier and a third database associated with the same first tenant identifier on a first cloud, and a second tenancy of the organization defines a second database access privilege for a second database on a second cloud;

authenticate the user to the first tenancy using the first login credential to establish a tenant context scoped to the first tenant identifier;

receive, from the user, a selection of a first cloud account;

retrieve a second login credential for the first cloud account based on the selection;

automatically log in to the first cloud account using the second login credential;

receive, from the user, input to perform an operation on data in the first database on the first cloud;

transmit, to the first cloud, using the second login credential for the first cloud account and within the established tenant context, a signal to perform the operation based on the input;

receive, from the user, a selection of the first database corresponding to the first tenancy;

grant access to the user to the first database;

receive, from the user, a selection of a third database corresponding to the first tenancy; and deny access to the user to the third database within the established tenant context and without re-authenticating to a different tenancy based on a user role evaluated after the tenancy authentication, wherein the user role grants access to the first database but not the third database.

11. The medium of claim 10, wherein the instructions further cause the processor to:

receive, from the user, a selection of a second cloud account; and deny access to the user to the second cloud account based on a project associated with the user, wherein the project defines a project access privilege for the first cloud account but not the second cloud account.

12. The medium of claim 11, wherein the database management service is configured to manage database operations of the first database on the first cloud corresponding to the first tenancy and manage operations of the second database on the second cloud corresponding to the second tenancy.

13. The medium of claim 10, wherein the instructions further cause the processor to:

create, on the first cloud, using the second login credential, the first tenancy; and provision, on the first cloud, within the first tenancy, the first database on the first cloud.

14. The medium of claim 10, wherein the instructions further cause the processor to:

associate each row of the first database on the first cloud with the first tenancy; and associate each row of the second database on the second cloud with the second tenancy.

15. The medium of claim 14, wherein the instructions further cause the processor to:

receive a request from the user to view a row from the first database on the first cloud, wherein the request is not associated with the first tenancy; and deny the request based on the request not being associated with the first tenancy.

16. The medium of claim 10, wherein the instructions further cause the processor to:

calculate a first billing amount for the organization based on usage information associated with the first tenancy; and calculate a second billing amount for the organization based on usage information associated with the second tenancy.

17. The medium of claim 10, wherein the instructions further cause the processor to:

associate the user with the second tenancy;

receive, from the user, a selection of the second tenancy;

receive, from the user, a request associated with a second tenancy context; and grant access to the user to the second database on the second cloud based on the second tenancy context.

18. The medium of claim 10, wherein the instructions further cause the processor to:

receive, from the user, a subscription request;

generate, in response to the subscription request, a third tenancy; and generate a tenant admin role for the third tenancy for the user.

19. A method comprising:

receiving, by a computer, from a user, a first login credential associated with an organization on a database management service, wherein a first tenancy of the organization defines a first database access privilege for a first database associated with a first tenant identifier and a third database associated with the same first tenant identifier on a first cloud, and a second tenancy of the organization defines a second database access privilege for a second database on a second cloud;

authenticating, by a computer, the user to the first tenancy using the first login credential to establish a tenant context scoped to the first tenant identifier;

receiving, by the computer, from the user, a selection of a first cloud account;

retrieving, by the computer, a second login credential for the first cloud account based on the selection;

automatically logging in, by the computer, to the first cloud account using the second login credential;

receiving, by the computer, from the user, input to perform an operation on data in the first database on the first cloud;

transmitting, by the computer, to the first cloud, using the second login credential for the first cloud account and within the established tenant context, a signal to perform the operation based on the input;

receiving, from the user, a selection of the first database corresponding to the first tenancy;

granting access to the user to the first database;

receiving, from the user, a selection of a third database corresponding to the first tenancy; and denying access to the user to the third database within the established tenant context and without re-authenticating to a different tenancy based on a user role evaluated after the tenancy authentication, wherein the user role grants access to the first database but not the third database.

20. The method of claim 19, further comprising:

receiving, by the computer, from the user, a selection of a second cloud account; and deny access to the user to the second cloud account based on a project associated with the user, wherein the project defines a project access privilege for the first cloud account but not the second cloud account.

21. The method of claim 19, wherein the database management service is configured to manage database operations of the first database on the first cloud corresponding to the first tenancy and manage operations of the second database on the second cloud corresponding to the second tenancy.

22. The method of claim 19, further comprising:

creating, by the computer, on the first cloud, using the second login credential, the first tenancy; and provisioning, by the computer, on the first cloud, within the first tenancy, the first database on the first cloud.

23. The system of claim 1, wherein the processor executes the instructions to:

receive, from the user, a selection of a fourth database corresponding to the first tenancy, wherein the user role does not grant access to the fourth database; and grant access to the user to the fourth database based on a project associated with the user, wherein the project defines a project access privilege for the fourth database.

24. The non-transitory, computer-readable medium of claim 10, wherein the instructions cause the processor to:

receive, from the user, a selection of a fourth database corresponding to the first tenancy, wherein the user role does not grant access to the fourth database; and grant access to the user to the fourth database based on a project associated with the user, wherein the project defines a project access privilege for the fourth database.

25. The method of claim 19, further comprising:

receiving, from the user, a selection of a fourth database corresponding to the first tenancy, wherein the user role does not grant access to the fourth database; and granting access to the user to the fourth database based on a project associated with the user, wherein the project defines a project access privilege for the fourth database.

* * * * *